(12) United States Patent  
Vock et al.

(10) Patent No.: US 11,907,966 B2
(45) Date of Patent: Feb. 20, 2024

(54) CUSTOMIZABLE DATA MANAGEMENT SYSTEM

(71) Applicant: Thermodynamic Design, LLC, Potomac, MD (US)

(72) Inventors: Michael Vock, Loveland, OH (US); Pamela Ancona, Danville, CA (US)

(73) Assignee: Thermodynamic Design, LLC, Rockville, MD (US)

(*) Notice: Subject to any disclaimer, the term of this patent is extended or adjusted under 35 U.S.C. 154(b) by 0 days.

(21) Appl. No.: 17/319,977

(22) Filed: May 13, 2021

(65) Prior Publication Data

US 2021/0264464 A1  Aug. 26, 2021

Related U.S. Application Data

(62) Division of application No. 14/645,545, filed on Mar. 12, 2015, now abandoned.

(60) Provisional application No. 61/952,698, filed on Mar. 13, 2014.

(51) Int. Cl.
| | |
|---|---|
| *G06Q 30/0242* | (2023.01) |
| *G06Q 30/0251* | (2023.01) |
| *G06Q 50/00* | (2012.01) |
| *H04L 67/306* | (2022.01) |
| *H04L 67/50* | (2022.01) |

(52) U.S. Cl.
CPC ..... *G06Q 30/0242* (2013.01); *G06Q 30/0269* (2013.01); *G06Q 50/01* (2013.01); *H04L 67/306* (2013.01); *H04L 67/535* (2022.05)

(58) Field of Classification Search
CPC .......... G06Q 30/0242; G06Q 30/0269; G06Q 50/01; G06Q 30/0207–0277; H04L 67/306; H04L 67/22
See application file for complete search history.

(56) References Cited

U.S. PATENT DOCUMENTS

| | | | |
|---|---|---|---|
| 8,712,845 B2 | 4/2014 | Christiansen et al. | |
| 8,787,707 B1 | 7/2014 | Steves et al. | |
| 9,219,736 B1* | 12/2015 | Lewis | H04L 67/53 |
| 10,692,096 B2 | 6/2020 | Christiansen et al. | |
| 2001/0021914 A1 | 9/2001 | Jacobi et al. | |
| 2003/0131021 A1 | 7/2003 | Wight et al. | |
| 2004/0210602 A1 | 10/2004 | Hillis et al. | |
| 2005/0203809 A1 | 9/2005 | Stone et al. | |
| 2007/0005450 A1 | 1/2007 | Krishnamoorthy et al. | |

(Continued)

FOREIGN PATENT DOCUMENTS

| | | |
|---|---|---|
| CN | 101395626 A | 3/2009 |
| CN | 101669108 A | 3/2010 |

(Continued)

OTHER PUBLICATIONS

U.S. Appl. No. 16/660,896, filed Oct. 23, 2019, Christiansen et al.

(Continued)

*Primary Examiner* — Chinyere Mpamugo
(74) *Attorney, Agent, or Firm* — Wolf, Greenfield & Sacks, P.C.

(57) ABSTRACT

The invention relates to methods, systems, and computer-readable media related to a system having a plurality of users, designed to display a user-customized subset of item and/or provider information to the user.

13 Claims, 47 Drawing Sheets

(56) References Cited

U.S. PATENT DOCUMENTS

| | | |
|---|---|---|
| 2007/0288514 A1 | 12/2007 | Reitter et al. |
| 2008/0114807 A1 | 5/2008 | Sembower |
| 2008/0126476 A1 | 5/2008 | Nichlas et al. |
| 2008/0294502 A1 | 11/2008 | Broome |
| 2009/0055285 A1 | 2/2009 | Law et al. |
| 2009/0276453 A1 | 11/2009 | Trout et al. |
| 2009/0276729 A1 | 11/2009 | Cantu-Paz |
| 2010/0004980 A1 | 1/2010 | Bowen |
| 2010/0076844 A1 | 3/2010 | Christiansen et al. |
| 2010/0268606 A1 | 10/2010 | Wu |
| 2010/0332313 A1 | 12/2010 | Miller et al. |
| 2011/0055289 A1 | 3/2011 | Ennis |
| 2011/0087842 A1 | 4/2011 | Lu et al. |
| 2011/0125576 A1 | 5/2011 | Song et al. |
| 2011/0145064 A1 | 6/2011 | Anderson et al. |
| 2011/0191417 A1 | 8/2011 | Rathod |
| 2011/0265011 A1 | 10/2011 | Taylor et al. |
| 2011/0283236 A1 | 11/2011 | Beaumier et al. |
| 2011/0307340 A1 | 12/2011 | Benmbarek |
| 2012/0054115 A1 | 3/2012 | Baird-Smith et al. |
| 2012/0066618 A1 | 3/2012 | Barker et al. |
| 2012/0150598 A1 | 6/2012 | Griggs |
| 2012/0158501 A1 | 6/2012 | Zhang et al. |
| 2012/0254149 A1 | 10/2012 | Ramsay |
| 2012/0278127 A1 | 11/2012 | Kirakosyan et al. |
| 2012/0284036 A1 | 11/2012 | Evans |
| 2012/0323938 A1 | 12/2012 | Skeen et al. |
| 2013/0080900 A1 | 3/2013 | Wilde et al. |
| 2013/0086448 A1 | 4/2013 | Baptist et al. |
| 2013/0096981 A1 | 4/2013 | Evans et al. |
| 2013/0132393 A1 | 5/2013 | Chen et al. |
| 2013/0238444 A1 | 9/2013 | Munaco et al. |
| 2013/0246397 A1 | 9/2013 | Farver et al. |
| 2014/0019187 A1* | 1/2014 | Olsen ............... G06Q 10/06313 705/7.23 |
| 2014/0052485 A1* | 2/2014 | Shidfar ................. G06Q 50/01 705/7.13 |
| 2014/0068399 A1 | 3/2014 | Mori et al. |
| 2014/0129962 A1 | 5/2014 | Lineberger et al. |
| 2014/0149503 A1 | 5/2014 | Bosworth et al. |
| 2014/0153821 A1 | 6/2014 | Masuko et al. |
| 2014/0164089 A1 | 6/2014 | Joa et al. |
| 2014/0207860 A1 | 7/2014 | Wang et al. |
| 2014/0278758 A1 | 9/2014 | Christiansen et al. |
| 2014/0278862 A1 | 9/2014 | Muppala |
| 2014/0279068 A1 | 9/2014 | Systrom et al. |
| 2014/0280575 A1* | 9/2014 | Cowan .................... H04L 67/54 709/204 |
| 2014/0282153 A1 | 9/2014 | Christiansen et al. |
| 2015/0039549 A1 | 2/2015 | Aufmann et al. |
| 2015/0262219 A1 | 9/2015 | Vock et al. |
| 2016/0070449 A1 | 3/2016 | Christiansen et al. |
| 2018/0196807 A1 | 7/2018 | Groom |
| 2020/0184490 A1 | 6/2020 | Christiansen et al. |
| 2020/0234314 A1 | 7/2020 | Christiansen et al. |
| 2023/0169523 A1 | 6/2023 | Christiansen et al. |

FOREIGN PATENT DOCUMENTS

| | | |
|---|---|---|
| CN | 101889293 A | 11/2010 |
| CN | 102317967 A | 1/2012 |
| CN | 102411753 A | 4/2012 |
| CN | 201480028510.8 | 5/2022 |
| EP | 2688031 A1 | 1/2014 |
| EP | 2973317 A1 | 1/2016 |
| EP | 3178023 | 6/2017 |
| EP | 19207537.2 | 5/2022 |
| EP | 20200102.0 | 7/2022 |
| JP | 2012-141680 A | 7/2012 |
| JP | 2014-002562 A | 1/2014 |
| JP | 2014-502747 A | 2/2014 |
| JP | 5431552 B1 | 3/2014 |
| JP | 2014-070504 A | 4/2014 |
| JP | 2014-135026 A | 7/2014 |
| KR | 10-2007-0118165 A | 12/2007 |
| KR | 10-2012-0092457 A | 8/2012 |
| KR | 10-1196314 B1 | 11/2012 |
| KR | 10-2012-0139167 A1 | 12/2012 |
| KR | 10-2013-0009987 A | 1/2013 |
| KR | 10-2013-0011257 A1 | 1/2013 |
| KR | 102157029233 | 3/2022 |
| KR | 102017026802 | 5/2022 |
| RU | 2372656 C2 | 11/2009 |
| WO | WO 2006/104952 A1 | 10/2006 |
| WO | WO 2009/025855 A1 | 2/2009 |
| WO | WO 2010/001406 A1 | 1/2010 |
| WO | WO 2011/163060 A2 | 12/2011 |
| WO | WO 2012/161435 A2 | 11/2012 |
| WO | WO 2013/021888 A1 | 2/2013 |
| WO | WO 2014/152173 A1 | 9/2014 |
| WO | WO 2016/040274 A1 | 3/2016 |

OTHER PUBLICATIONS

U.S. Appl. No. 16/703,612, filed Dec. 4, 2019, Christiansen et al.
U.S. Appl. No. 14/645,545, filed Mar. 12, 2015, Vock et al.
Australian Examination Report dated Aug. 21, 2020 in connection with Australian Application No. 2015315376.
Australian Examination Report dated Feb. 26, 2019 received in Australian Application No. 2014240079.
Australian Examination Report dated Mar. 9, 2021 in connection with Australian Application No. 2020201356.
Australian Examination Report dated May 26, 2021 in connection with Australian Application No. 2020201356.
Australian Examination Report dated Sep. 11, 2020 in connection with Australian Application No. 2020201356.
Canadian Examination Report dated Apr. 6, 2020 in connection with Canadian Application No. 2,906,683.
Canadian Examination Report dated Jan. 6, 2021 in connection with Canadian Application No. 2,906,683.
Chinese Notification of Grant of Invention Patent dated Aug. 21, 2020 in connection with Chinese Application No. 201580052757.8.
Chinese Office Action dated Feb. 3, 2019 received in Chinese Application No. 201480028510.8, together with an English-language translation.
Chinese Office Action dated Sep. 4, 2019 received in Chinese Application No. 201480028510.8, together with an English language translation.
Chinese Rejection Decision dated Jun. 9, 2020 in connection with Chinese Application No. 201480028510.8.
European Communication dated Mar. 23, 2018 received in European Patent Application No. 14767468.3.
European Communication dated Nov. 30, 2018 received in European Application No. 15 84 0719.7.
European Communication dated Oct. 12, 2020 in connection with European Application No. 19207537.2.
European Decision to Refuse dated Apr. 16, 2020 in connection with European Application No. 14767468.3.
European Decision to Refuse dated Oct. 29, 2020 in connection with European Application No. 15840719.7.
European Summons to Attend Oral Proceedings dated Mar. 9, 2020 in connection with European Application No. 15840719.7.
European Summons to Attend Oral Proceedings dated May 31, 2019 received in European Application No. 14 767 468.3.
Extended European Search Report dated Mar. 6, 2020 in connection with European Application No. 19207537.2.
Extended European Search Report for European Application No. 20200102.0 dated Jan. 13, 2021.
Extended Supplementary European Search Report dated Jan. 25, 2018 received in European Patent Application No. 15840719.7.
Extended Supplementary European Search Report dated Jul. 20, 2016 received in European Patent Application No. 14767468.34.
Indian Examination Report dated Feb. 24, 2021 in connection with Indian Application No. 201747011965.
Indian Examination Report dated Sep. 18, 2019 received in Indian Application No. 6142/CHENP/2015, together with an English language translation.

(56) References Cited

OTHER PUBLICATIONS

International Preliminary Report on Patentability Chapter II for International Application No. PCT/US2014/027034 dated Feb. 3, 2015.
International Search Report and Written Opinion dated Aug. 14, 2014 received from related Application No. PCT/US2014/027034.
International Search Report and Written Opinion dated Dec. 24, 2015 in International Application No. PCT/US2015/048860.
Japanese Notice of Reasons for Rejection dated Jan. 30, 2018 received in Japanese Patent Application No. 2016-502314, together with an English language translation.
Japanese Notice of Reasons for Rejection dated Jul. 23, 2019 received in Japanese Patent Application 2017-511841, together with an English-language translation.
Japanese Notice of Reasons for Rejection dated Mar. 2, 2021 in connection with Japanese Application No. 2020-008841.
Japanese Notice of Reasons for Rejection dated May 12, 2020 in connection with Japanese Application No. 2017-511841.
Korean Notice of Allowance dated Jun. 25, 2021 in connection with Korean Application No. 10-2017-7009585.
Korean Notice of Final Rejection dated Apr. 27, 2021 in connection with Korean Application No. 10-2017-7009585.
Korean Office Action dated Aug. 31, 2020 in connection with Korean Application No. 10-2015-7029233.
Korean Office Action dated Dec. 28, 2020 in connection with Korean Application No. 10-2017-7009585.
Korean Office Action dated Nov. 30, 2020 in connection with Korean Application No. 10-2015-7029233.
No Author Listed], An efficient database design for a simple forum using php and mysql. Stack Overflow. Nov. 16, 2013:4 pages, https://stackoverflow.com/questions/20017113/an-efficient-database-design-for-a-simple-forum-using-php-and-mysql/20017137 [last accessed Dec. 16, 2020].
No Author Listed], Association list—Wikipedia, [retrieved from internet on Feb. 21, 2020]. Https://en.wikipedia.org/w/index.php?title=Association_list&oldid=492108771.
No Author Listed], Persistent Object Identifier. Wikipedia. Mar. 19, 2018:1 page. https://en.wikipedia.org/w/index.php?title=Persistent_Object_Identifier&oldid=402510379 [last accessed Dec. 17, 2020].
Ahern et al., Over-Exposed? Privacy Patterns and Consideration in Online and Mobile Photo Sharing. CHI 2007:1-10.
De Meo et al., Improving Recommendation Quality by Merging Collaborative Filtering and Social Relationships. Cornell University Library. Sep. 30, 2011; 6 pages.
De Meo et al., Improving recommendation quality by merging collaborative filtering and social relationships. ArXiv preprint arxiv:1109.6698v1. Sep. 30, 2011:6 pages.
Evans, Ge tn2it live. SlideShare. Sep. 17, 2013:40 pages. https://www2.slideshare.net/bluedakota1/ge-tn2it-live?from_action=save [last accessed Dec. 5, 2020].
Hull et al., Enabling Context-Aware and Privacy-Conscious User DAta Sharing. Proceedings of the 2004 IEEE International Conference on Mobile Data Management. 2004:1-12.
Liu et al., Incorporating social networks and user opinions for collaborative recommendation: Local Trust Network based Method. Context-Aware Movie Recommendation. Sep. 30, 2010; pp. 53-56.
Liu et al., Incorporating social networks and user opinions for collaborative recommendation: local trust network based method. Proceedings of the workshop on context-aware movie recommendation, ACM. Sep. 30, 2010:53-56.

Malone et al., Intelligent Information-Sharing System. Communications of the ACM. 1987;30(5):390-402.
Urban et al., Object Data Models. In: Encyclopedia of Database Systems. Liu et al., Eds. Springer. Sep. 29, 2009:4 pages. https://link.springer.com/referenceworkentry/10.1007%2F978-0-387-39940-9_249 [last accessed Dec. 17, 2020].
Zhao W., E-commerce Mode (the 2nd Edition), pp. 211 219, Fundan University (Mar. 2011).
Zhou X., "Intelligent Communication", pp. 252 254, National Defense Industry (Jan. 2009).
Australian Office Action dated Aug. 19, 2021 in connection with Australian Application No. 2020201356.
Korean Office Action dated Aug. 11, 2021 in connection with Korean Application No. 10-2021-7010713.
Japanese Decision of Grant dated Aug. 3, 2021 in connection with Japanese Application No. 2020-008841.
Indian Examination Report dated Feb. 3, 2022 in connection with Indian Application No. 202048002385.
Office Action dated Oct. 6, 2021 in connection with Canadian Application No. 2,906,683.
Summons to Attend Oral Proceedings dated Nov. 17, 2021 in connection with European Application No. 19207537.2.
Office Action dated Oct. 4, 2021 in connection with Canadian Application No. 2,959,770.
Office Action dated Oct. 27, 2021 in connection with Korean Application No. 10-2021-7026802.
Chinese Reexamination Notification dated May 13, 2022, in connection with Chinese Application No. 201480028510.8.
Communication Pursuant to Article 94(3) EPC dated Jul. 8, 2022, in connection with European Application No. 20200102.0.
Decision to Refuse a European Patent Application dated May 2, 2022, in connection with European Application No. 19207537.2.
Korean Notice of Allowance dated May 17, 2022, in connection with Korean Application No. 1020217026802.
Korean Office Action dated Mar. 30, 2022, in connection with Korean Application No. 10-2015-7029233.
Australian Examination Report dated Jul. 25, 2022, in connection with Australian Application No. 2021203449.
Australian Examination Report dated Oct. 21, 2022, in connection with Australian Application No. 2021221899.
Chinese Reexamination Decision dated Aug. 2, 2022, in connection with Chinese Application No. 201480028510.8.
Office Action dated Oct. 18, 2022, in connection with Japanese Application No. 2021-138484.
Office Action dated Aug. 17, 2022, in connection with Canadian Application No. 2,906,683.
Korean Notice of Allowance dated Sep. 8, 2022, in connection with Korean Application No. 10-2021-7010713.
Australian Examination Report dated Jan. 13, 2023, in connection with Australian Application No. 2021203449.
U.S. Appl. No. 18/076,656, filed Dec. 7, 2022, Christiansen et al.
AU 2021203449, Jan. 13, 2023, Australian Examination Report.
Australian Examination Report dated May 29, 2023, in connection with Australian Application No. 2021203449.
Canadian Office Action dated May 29, 2023, in connection with Canadian Application No. 2959770.
Korean Office Action dated Aug. 21, 2023, in connection with Korean Application No. 10-2022-7040476.
Summons to Attend Oral Proceedings dated Oct. 16, 2023 in connection with European Application No. 20200102.0.
Office Action dated Aug. 9, 2023 in connection with Chinese Application No. 202211362524.6.

* cited by examiner

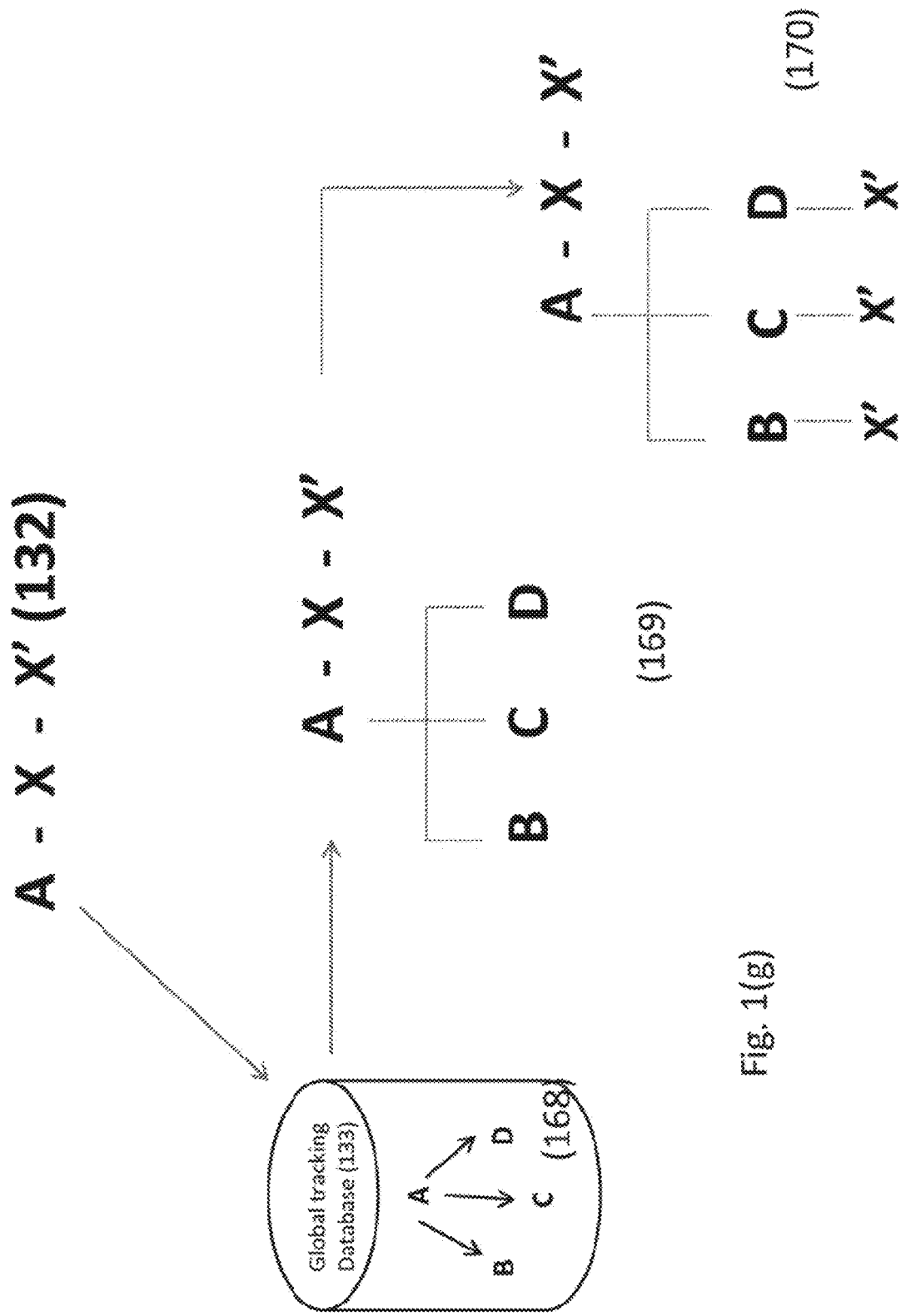

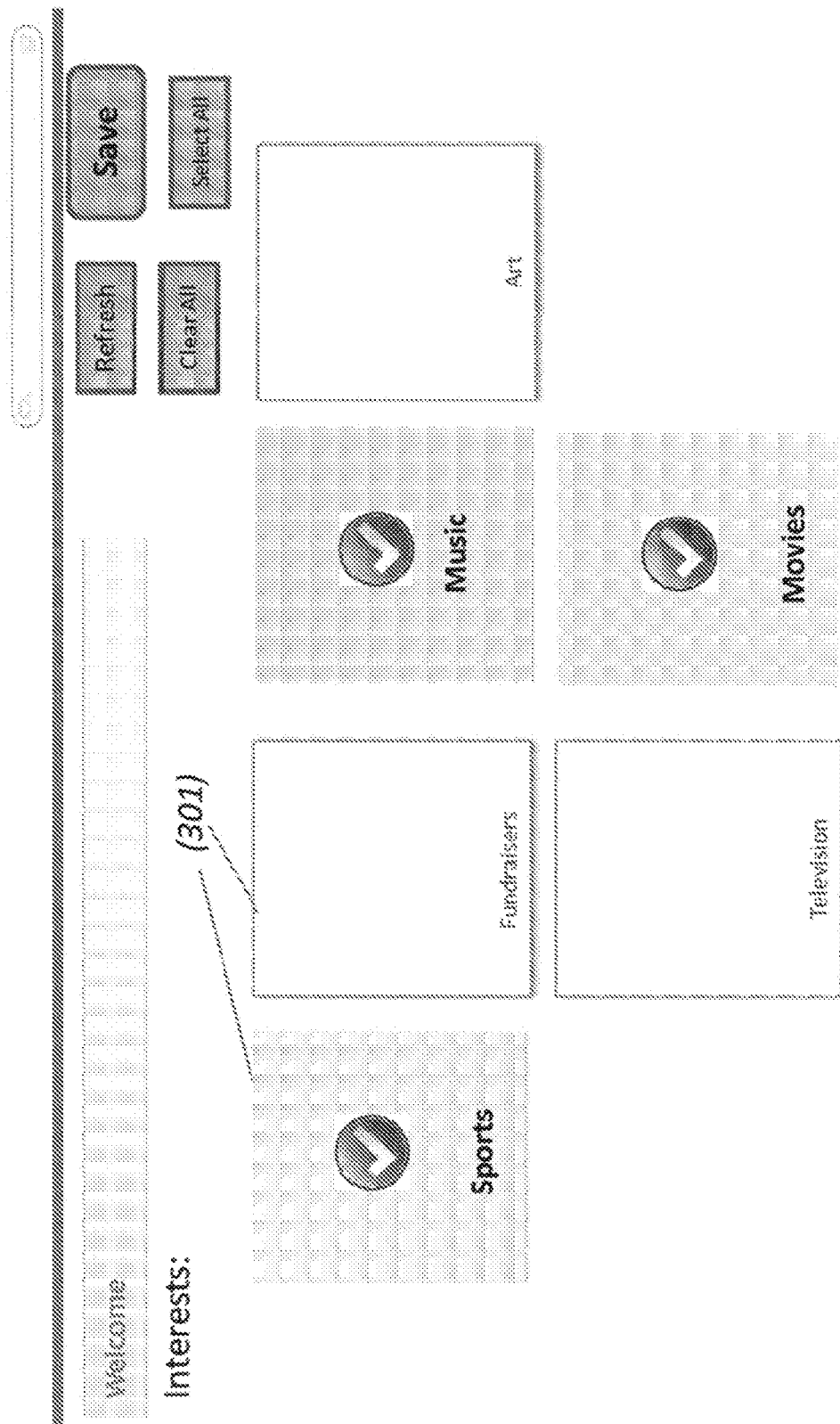

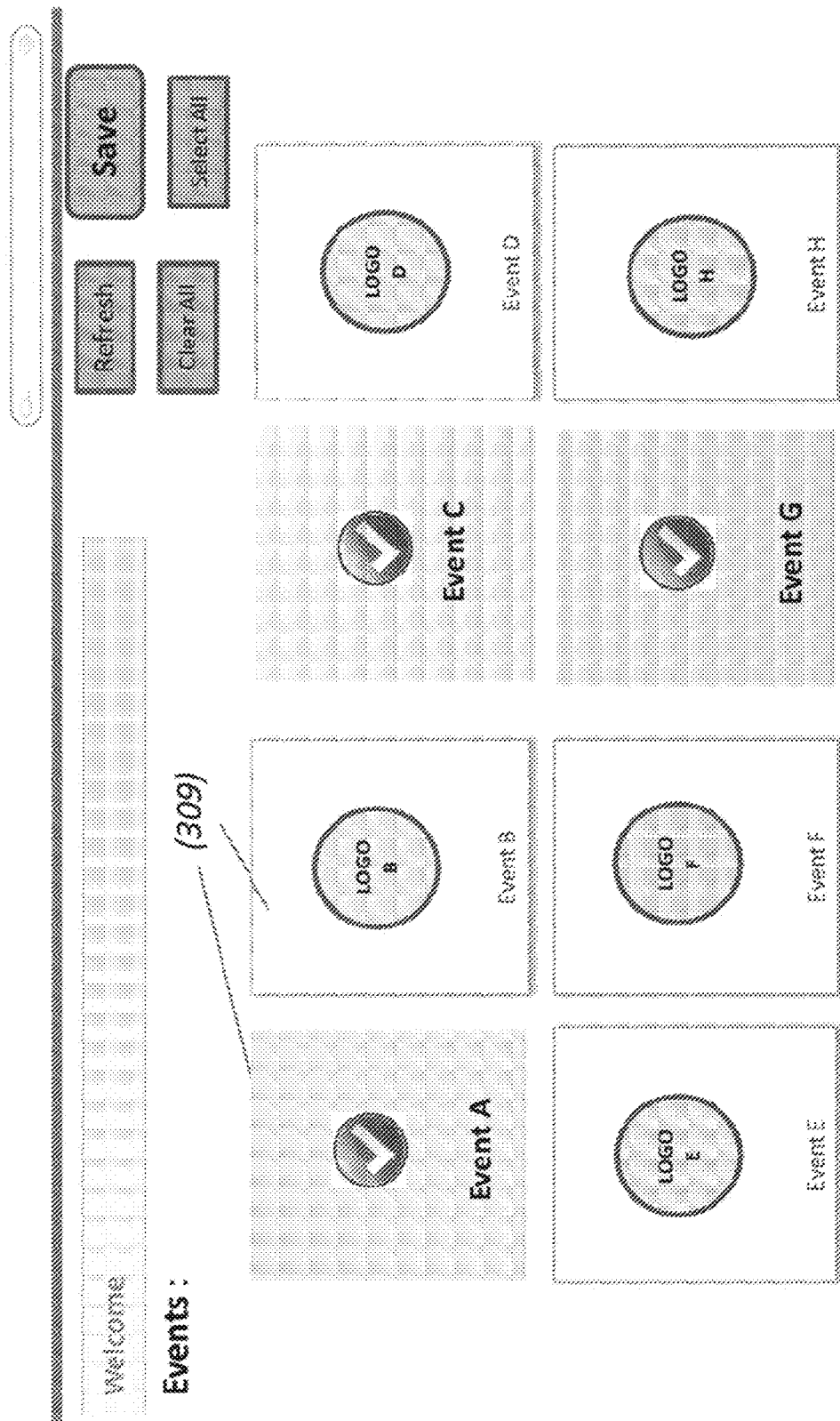

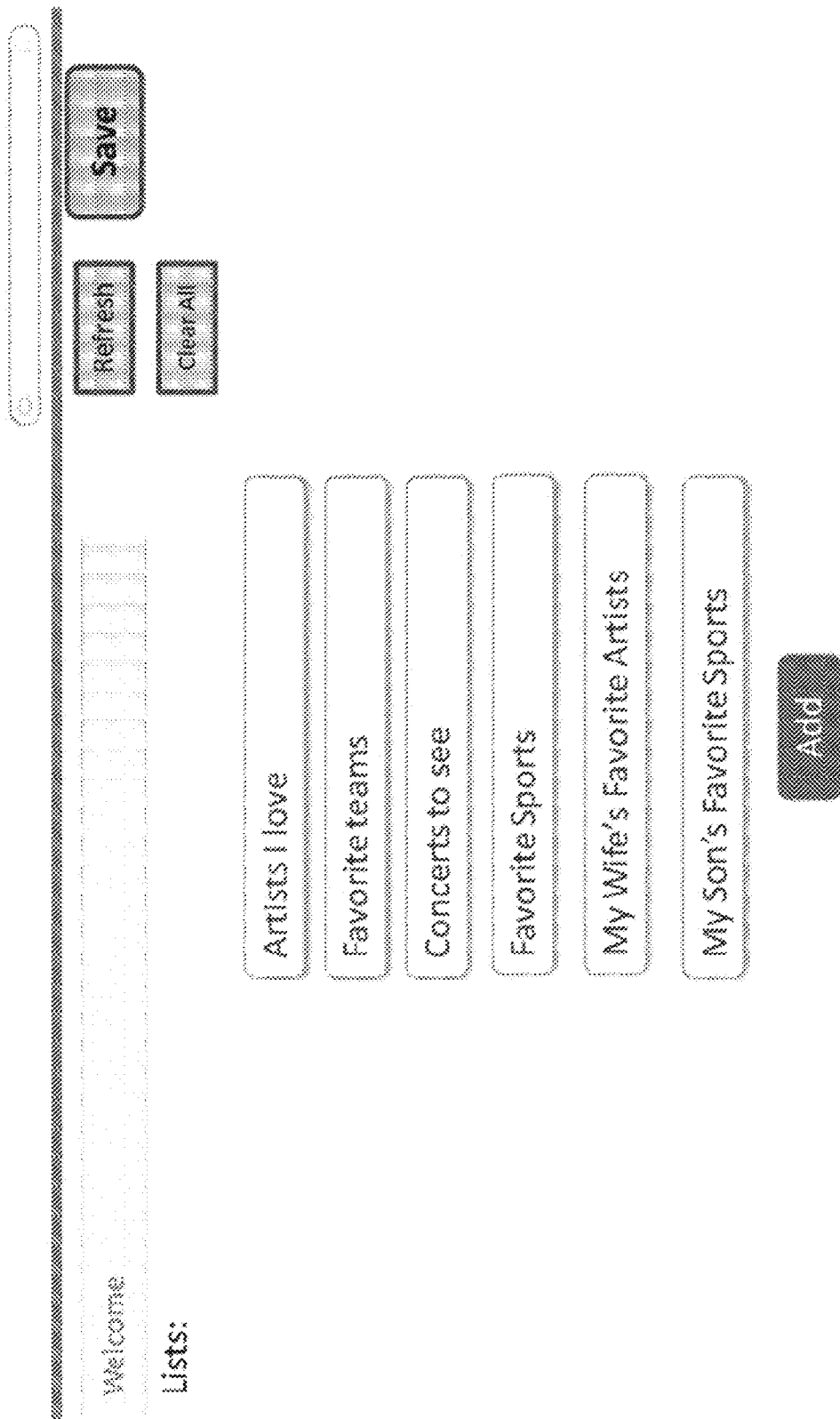

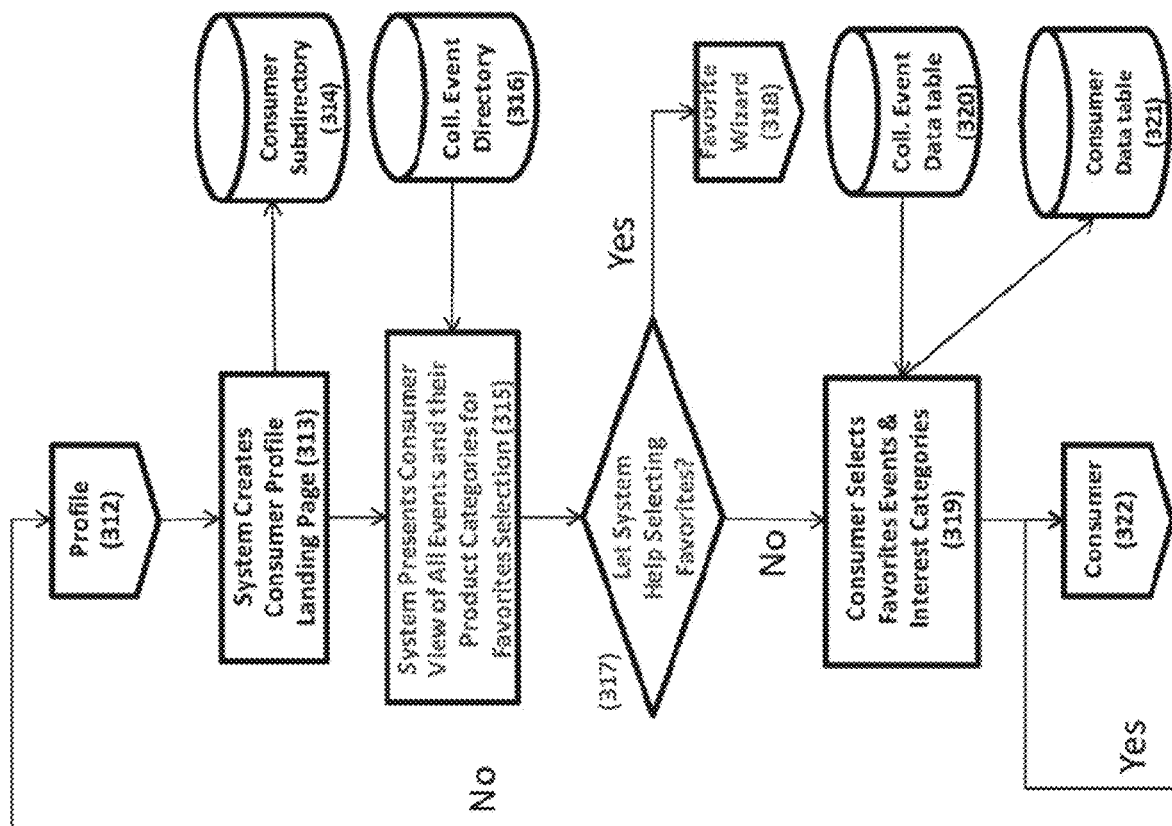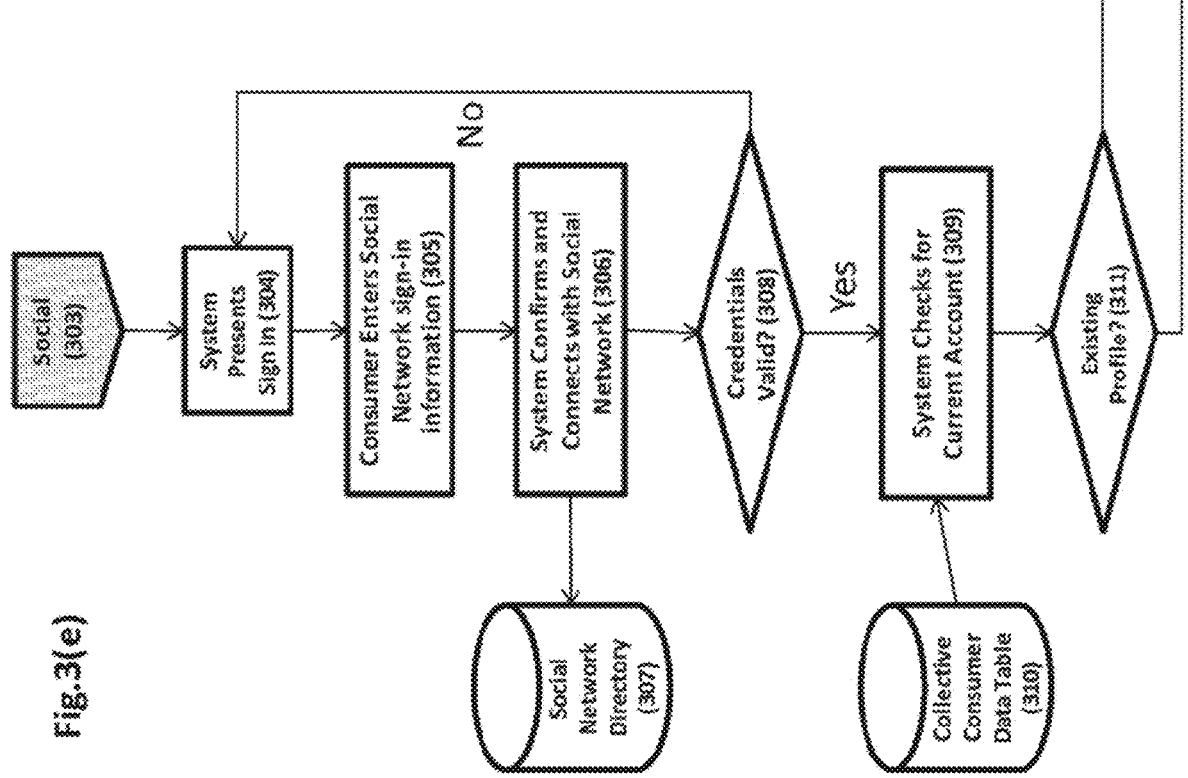
Fig.3(e)

*Your Calendar*

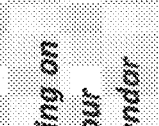

Yankees vs. Red Sox
4-3-13 to 4-3-13
Yankee Stadium
New York, NY USA

April 3

Nats vs. Mets
4-4-13, 7:05 pm
Citifield Stadium
New York, NY USA

April 4

Nothing on your Calendar April 5-10

Can we suggest something you might like?

(413)

April 5-10

The Beatles in Concert
4-2-13 to 4-4-13
ABC Coliseum
Anywhere, CA, USA

April 2

The Eagles in Concert
4-1-13, 8 pm
XYZ Coliseum
Anywhere, MD, USA

Today

Masters Tournament
4-11-13 to 4-14-13
Augusta National Golf Club, Augusta, GA USA April 11

Nirvana in Concert
4-12-13 to 4-12-13
Seattle Coliseum
Seattle, WA, USA

April 12

The Rolling Stones
4-13-13 to 4-16-13
Madison Sq. Garden
New York, NY, USA

April 13

Nothing on your Calendar April 14-Dec. 6

Can we suggest something you might like?
(414)

April 14-Dec.6

ING NEW YORK CITY MARATHON

NYC Marathon
12-7-13
New York, NY, USA

Dec. 7

Fig. 4(b)

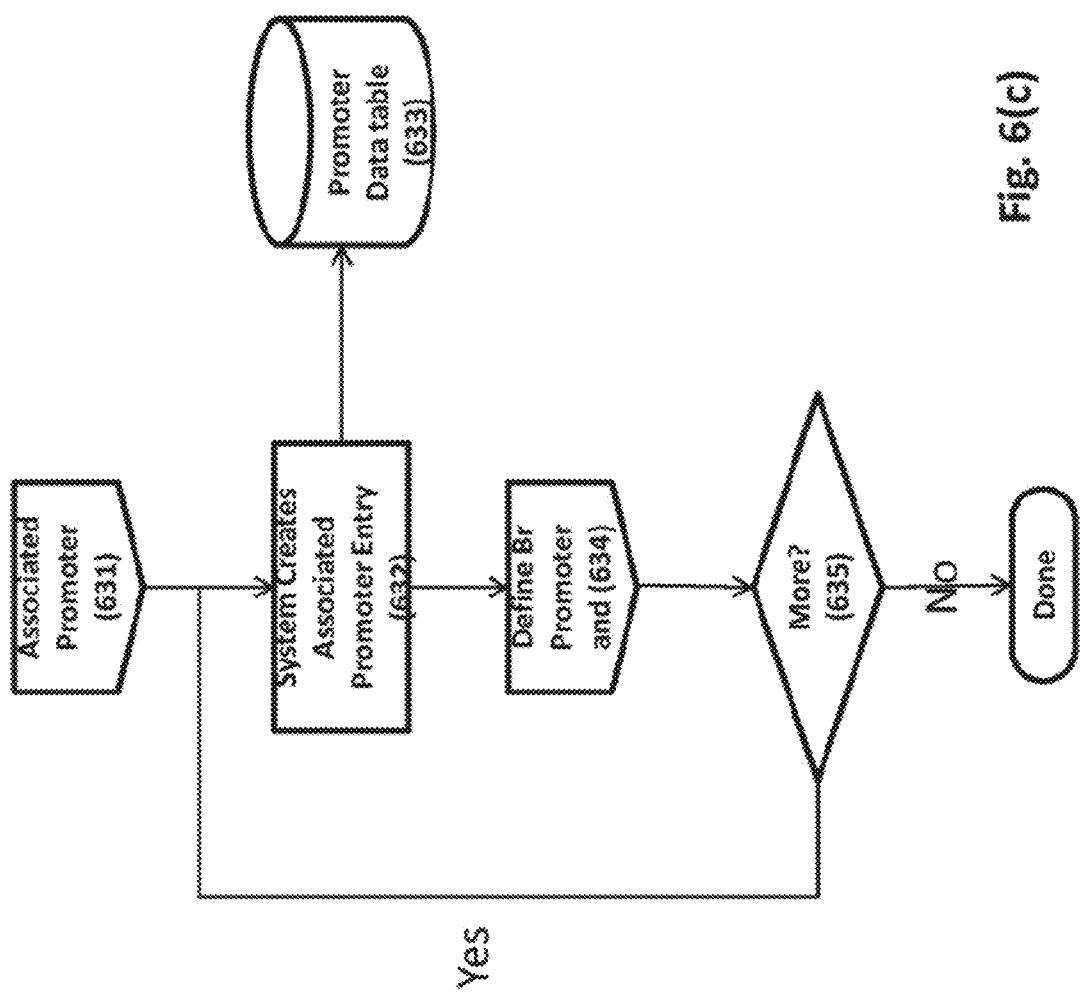

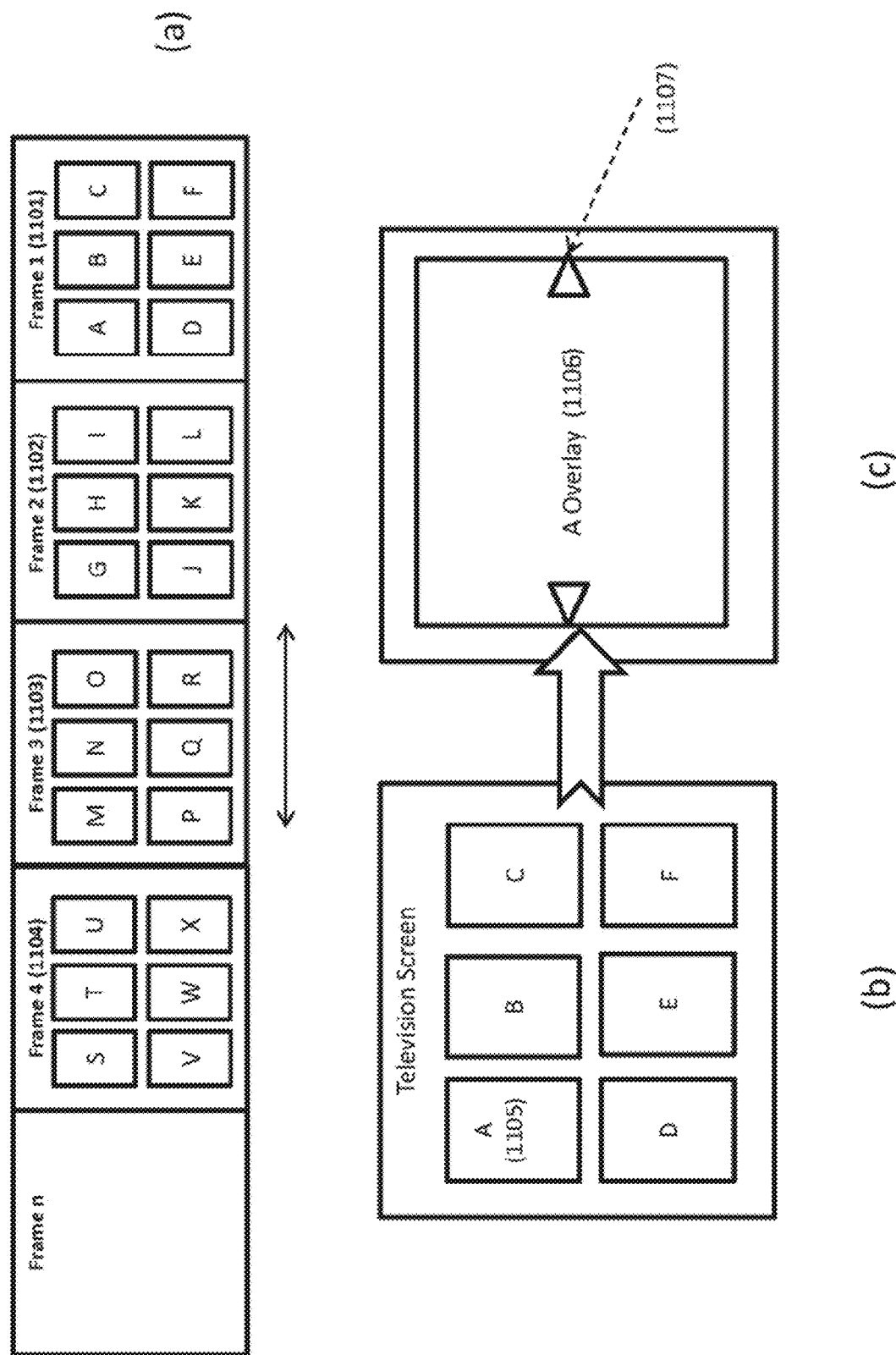

CUSTOMIZABLE DATA MANAGEMENT SYSTEM

CROSS-REFERENCES TO RELATED APPLICATIONS

This application is a divisional of and claims priority under 35 U.S.C. § 121 to co-pending, commonly assigned U.S. patent application Ser. No. 14/645,545, filed Mar. 12, 2015, entitled "Customizable Data Management System," which claims priority under 35 U.S.C. § 119(e) to U.S. Provisional Patent Application Ser. No. 61/952,698, filed on Mar. 13, 2014, entitled "Customizable Data Management System." Reference is also made to U.S. Provisional Patent Application Ser. No. 61/788,116, filed Mar. 15, 2013, entitled "Electronic Catalog System," and U.S. patent application Ser. No. 14/208,825, filed Mar. 13, 2014, entitled "Customizable Data Management System." Each of the documents listed above is incorporated herein by reference in its entirety.

FIELD OF THE INVENTION

The invention relates to a customizable data management system that enables users to personalize their online experience and content providers to collect user information to create a targeted online experience for users.

BACKGROUND OF THE INVENTION

Despite the various sophisticated methods developed by online content providers to enhance the user's online experience, a simple and expedient system that provides users a personalized interface based on the user's individual preferences remains elusive. In particular, there is a substantial need for a system that efficiently selects, manages, and displays data relevant to a user's preferences. Moreover, it is desirable to further enrich the user's online experience by synthesizing a data set that includes information related to an individual user's personal preferences as well as information related to preferences shared by the user and one or more members of that user's online social networking community.

SUMMARY OF THE INVENTION

The present invention contemplates the following specific embodiments. Various modifications, additions and alterations may be made to embodiments described herein by one skilled in the art without departing from the spirit and scope of the invention. Such modifications, additions, and alterations are intended to fall within the scope of the claims.

Embodiments of the present invention are directed to solve technical problems arising in the context of managing vast quantities of data about items available from item providers, such that a user seeking to locate particular items or particular item providers has a simplified experience at his user interface. According to one aspect of the invention, a data structure is established which allows for more efficient data processing of data object representations in the data structure to allow selected and tailored visual representations to be made available at the graphical user interfaces of one or more user.

Another aspect of the invention provides a facility in a system with multiple item providers and multiple users for tracking both item providers and users so that a rich array of tailored visual representations can be provided to one of the users, based on activity by the other users and/or providers.

Therefore, the invention provides embodiment (a): a computer implemented method of selecting data object representations for interaction with a user at a graphical user interface, the method comprising: receiving a data stream from an item provider, the data stream identifying items available from the item provider; storing a data object in a global database with a provider identifier uniquely identifying the item provider; storing for each item in the data stream a data object with an item identifier uniquely identifying the item; detecting a user interaction at a graphical user interface of a user device, the interaction with an item or item provider data object representation, and creating a user data object with a user identifier uniquely identifying the user; creating in a tracking database an association between the user data object and the item and/or item provider data object; and using the tracking database to select a customized data set of data object representations based on the associations in the tracking database, the customized data set being for presentation at the graphical user interface. In one example, each data object of embodiment (a) is stored with an object identifier uniquely identifying that object, and the association between the user data object and the item and/or item provider data object is an association between the object identifiers of those objects. Moreover, the association of embodiment (a) conforms to an association data structure, the association data structure comprising respective fields for those object identifiers. The association can be further between those object identifiers and the user identifier, and optionally, the association data structure comprises a further field for the user identifier. In a further example of embodiment (a), each data object can conform to an object data structure, the object data structure comprising respective fields for at least some of: an object identifier of that object; a user or provider identifier of a creator of that data object; a user, item, or provider identifier of a user, item or provider to which that data object relates; and additional information for said presentation at the graphical user interface. The method of embodiment (a) can further include, subsequent to the item provider creating a new data object associated with the item and/or item provider data object, updating the customized data set to include the new data object. The global database of embodiment (a) can contain a category data object associated with the item and/or item provider data object; and wherein at least one of the selected data objects is also associated with the category data object in the tracking database, that data object being selected for inclusion in the customized set on that basis; and optionally, the method further comprises, subsequent to the item provider creating a new data object associated with the category data object, updating the customized set to include the new data object.

Moreover, the invention provides embodiment (b): a computer system comprising: a plurality of user devices each having a display interface available to a user; a plurality of item providers; a global database of data object representations, each data object comprising a unique data object identifier of that object and a user, item, or provider identifier of a user, item or provider to which that data object relates; computer storage storing: (i) for each item provider, a respective provider data table comprising a unique provider identifier of that provider and one or more item identifiers of items provided by that provider; (ii) for each user, a respective user data table comprising a unique user identifier of that user and one or more item identifiers, provider identifiers, and/or category identifiers for items, providers and/or categories in which that user has expressed a preference; and (iii) a customized set of data tables selected for at least a first user, the customized set selected from the user data tables and provider data tables based on the item and/or the provider identifiers contained in the first users data table; a global tracking database configured responsive to the first user expressing an additional preference for a provider or item by instigating an association instruction at their user device to associate that first user's user identifier with an object identifier of a data object comprising the provider or item identifier of that provider or item; and an information exchange computer configured, responsive to the first user expressing the additional interest in the item or provider, to select one or more additional provider data tables and/or user data tables for inclusion in the first user's customized set to update that set, and to select at least one data object based on the first user's updated set for display to the first user via the display interface of their user device. The global database of embodiment (b) can contain a category data object and the category data object is associated with the data object comprising the provider or item identifier of the provider or item in which the user has expressed a subsequent interest, and wherein the selected data object is also associated with the category data object in the tracking database.

Also provided is embodiment (c): a computer system comprising: a plurality of user devices each having a display interface available to a user; a plurality of item providers; a global database of data objects, each data object comprising a unique object identifier of that object and a user, item, or provider identifier of a user, item or provider to which that object relates, the data object including a user association data object comprising a target user identifier of a target user and a follower user identifier of a user following the target user, wherein the global database is configured responsive to the target user expressing a tracking interest in a data object representation by instigating a tracking instruction at their user device to create a new derivative data object based on that data object; a global tracking database configured responsive to the target user expressing the tracking interest in the data object to store an association between the user identifier of the target user, the object identifier of that data object, and the object identifier of the created derivative data object; and an information exchange computer configured, responsive to the target user expressing the interest in the data object to access the global database and the global tracking database and to display the derivative data object representation to the follower user via the display interface of their user device.

Embodiments (a)-(c) are used to implement various methods described herein, as well as systems and computer readable media designed to practice those methods. For example, the following embodiments ((1)-(18)) relate to how embodiments (a)-(c) can be used:

Embodiment (1): a method of exchanging event information on a system, wherein the system has (i) a plurality of consumer-users including a first consumer-user and one or more additional consumer-users, and (ii) a plurality of events including a first event, wherein the plurality of events are promoted by a plurality of event promoters including a first event promoter, the method comprising acts of: receiving first event information; receiving first event preference information indicating that the first consumer-user has expressed a preference for the first event information; filtering the first event information to create a subset of first event information that is provided to the first consumer-user; displaying to the first user one or more data object representations relating to the subset of the first event information; receiving one or more first user interactions with the one or more data object representations relating to the subset of first event information; displaying to the first event promoter: interaction data relating to the first event and specific to one or more consumer-users; interaction data related to the first event aggregated for a plurality of consumer-users on the system; comparative interaction data from a plurality of customer-users related to the first event relative to one or more other events on the system; or combinations thereof.

Embodiment (1) can further include: receiving additional event information from a plurality of event promoters; receiving additional event preference information indicating that the first consumer-user has expressed a preference for an additional subset of the additional event information; filtering the first event information and the additional event information to create one or more supplemental subsets of additional event information that is provided to the first consumer-user; displaying to the first consumer-user one or more data object representations relating to the one or more supplemental subsets of additional event information; receiving one or more first consumer-user interactions with the one or more data object representations relating to the one or more supplemental subsets of additional event information; and displaying to each of the additional events promoters: (i) interaction data relating to the one or more additional events and specific to the one or more consumer-users expressing a preference for the one or more additional event information; (ii) interaction data related to the one or more additional events aggregated for a plurality of consumer-users on the system; (iii) comparative interaction data from a plurality of customer-users related to the one or more additional events relative to a one or more other events on the system; or (iv) combinations thereof.

Moreover, embodiment (1) also contemplates displaying to the first consumer-user first event information not previously displayed to the first consumer-user on the system.

The displaying step (d) of embodiment (1) can also include displaying to one or more additional consumer-users one or more data object representations relating to the subset of the first event information, wherein the one or more additional consumer-users have a relationship with the first consumer-user.

The interaction data referenced in embodiment (1) comprises the number and/or demographic information related to (i) one or more consumers-users of the plurality of consumer-users on the system, (ii) consumers-users expressing a preference for one or more interest categories, (iii) one of more consumer-users of the plurality of consumer-users on the system expressing a preference for the first event, (iv) all consumer-users of the system, or (v) combinations thereof. Moreover, the one or more first consumer-user interactions with the subset of data object representations includes: viewing one or more data object representations of the subset, expressing a preference for one or more data object representations of the subset, commenting on one or more data object representations in the subset, commenting on one or more derivative data object representations in the subset, indicating an intention to attend an event represented by one or more data object representations of the subset, participating in a dialog regarding one or more data object representations in the subset, offering an opinion regarding one or more data object representations of the subset, providing a rating for one or more data object representations of the subset, clicking through one or more data object representations of the subset to view additional details, clicking through one or more data object representations of the subset to view first event-hosted information, participating in a survey regarding one or more data object representations of the subset, requesting further information from the first event regarding one or more data object representations of the subset, buying a ticket for admission to an event displayed in one or more data object representations of the subset from a third-party retailer/reseller, buying a ticket to admission to an event displayed in one or more data object representations of the subset directly from the first event promoter, buying a ticket to admission to an event displayed in one or more data object representations of the subset from an individual, participating in an auction regarding one or more data object representations of the subset, offering a ticket to admission to an event displayed in one or more data object representations in the subset, requesting to purchase a ticket to admission to an event displayed in one or more data object representations in the subset, requesting that an additional event related to a first event displayed in one or more data object representations in the subset is scheduled by the first event promoter, suggesting to the first event promoter event ideas, improvements, and/or corrections regarding one or more data object representations in the subset, or combinations thereof. Still further, the interaction data can include first event data object representation-consumer clicks, first event data object representation consumer impressions, first event derivative data object representation consumer clicks, first event derivative data object representation-system consumer impressions, total system-consumer clicks, system-consumer clicks per interest category, total system-consumer impressions, system-consumer impressions per interest category, average interest category click through rate, interest category seasonal trend data, average conversion rate, or combinations thereof.

As used in reference to embodiment (1), demographic information comprises gender, ethnicity, age, income, education, home ownership, location, employment status, shopping history, personal interests and/or hobbies, or combinations thereof.

Comparative interaction data, as used in embodiment (1) can include the number and/or demographic information related to (i) one or more consumers-users of the plurality of consumer-users on the system, (ii) consumers-users expressing a preference for one or more interest categories, (iii) one of more consumer-users of the plurality of consumer-users on the system expressing a preference for the first event, (iv) one or more consumer-users on the system expressing a preference for the first event promoter, (v) all consumer-users of the system, or (vi) combinations thereof. Still further, comparative interaction data comprises first event data object representation-consumer clicks, first event data object representation-consumer impressions, first event derivative data object representation consumer clicks, first event derivative data object representation-consumer impressions, total system-consumer clicks, system-consumer clicks per interest category, total system-consumer impressions, system-consumer impressions per interest category, average interest category click through rate, interest category seasonal trend data, average conversion rate, or combinations thereof. In one example of embodiment (1), the comparative interaction data is collected over a defined time interval. Still further, the comparative interaction data can also include event ranking data for the first event in relation to the plurality of events, e.g., event ranking data for the first event in relation to one or more competitor events of the plurality of events.

First event information, as used in reference to embodiment (1) comprises general event information including information related to one or more event trademarks, one or more event logos, one or more event promoter logos, event description, interest categories associated with the event, event media, event purchasing information, retail information for product associated with an event, event promotional information, information related events within the event portfolio, related event description, related event products, or combinations thereof. In this example, event media includes an event-specific video file, an event-specific audio file, or print media. Moreover, event-specific supporting documents and information can comprise one or more literature references, reviews, blog link, press release, forum link, or combinations thereof. Still further, first event information can include first event promotional information including information related to one or more event trademarks, event description information, event media, event purchasing information, event retail information, event promotional information, related first event products, or combinations thereof. As used in this specific example of embodiment (1), event description information comprises an image, one or more event-specific supporting documents and information, one or more event reviews, an event rating, or combinations thereof; event media includes an event-specific video file, an event-specific audio file, or print media; and/or event-specific supporting documents and information comprises one or more literature references, reviews, blog link, press release, forum link, or combinations thereof.

In a specific example of embodiment (1), the first event preference information includes system tracking preference for the first event information and the method further comprises filtering the first event information to create a first supplemental subset of first event information that is provided to the first consumer-user expressing a system tracking preference for the first event information; and displaying to the first consumer user one or more derivative data object representations relating to the first supplemental subset of the first event information, wherein the one or more derivative data objects are associated in the system with the one or more data objects.

The method of embodiment (1) can further include receiving first consumer-user preference information indicating that an additional consumer-user has a system tracking preference for the first consumer-user; filtering the first event information to create a second supplemental subset of first event information that is provided to the additional consumer-user expressing a system tracking preference for the first consumer-user; and displaying to the additional consumer-user one or more data object representations and/or derivative data object representations relating to the second supplemental subset of the first event information. In addition, the method of embodiment (1) can also include receiving first consumer-user preference information indicating that a first event-promoter user has a system tracking preference for the first consumer-user; filtering the first event information to create a third supplemental subset of first event information that is provided to the first event-promoter user expressing a system tracking preference for the first consumer-user; and displaying to the first event-promoter user one or more data object representations and/or derivative data object representations relating to the third supplemental subset of the first event information. In these specific examples of embodiment (1), the system tracking preference can be expressed by following and/or listing a data object representation and/or a derivative data object representation.

The preference referenced in embodiment (1) can be expressed by following, listing, friending, attending, and/or liking a data object representation and/or a derivative data object representation. This preference can be a system tracking preference selected from following, attending, and/or listing a data object representation and/or a derivative data object representation. In one specific example of embodiment (1), the expression of a system tracking preference for a data object by the first consumer-user generates a derivative data object based on the data object, wherein the derivative data object is associated in the system with the data object and the first consumer-user. The expression of a system tracking preference for a data object by a first event-promoter user can generate a derivative data object based on the data object, wherein the derivative data object is associated in the system with the data object and the first event-promoter user. In one example of embodiment (1), a modification to a data object generates a modification to all derivative data objects of the data object, and a modification can include an edit to one or more data object elements, an addition to the data object, deletion of one or more data object elements, the addition of a comment regarding a data object, or combinations thereof.

The system referenced in embodiment (1) can include a first event-promoter user and the method further comprises displaying to the first event-promoter user interaction data related to the plurality of consumer-users expressing a preference for the first event information; displaying to the first event-promoter user the subset of data object representations displayed to the first consumer-user; receiving subset preference information indicating that the first event-promoter user has expressed a preference for one or more data object representations of the subset; and displaying to the first event user interactions with the subset of data object representations displayed to the first consumer-user and the first event-promoter user.

The method of embodiment (1) can also include receiving additional first event information responsive to the first event interaction data and/or the first event comparative interaction data. In this example, the additional first event information comprises event media, event ticket purchasing information, retail information, event promotional information, one or more event-specific supporting documents and information, one or more event reviews, an event rating, event media, or combinations thereof.

Embodiment (1)(a): a subset of first event information created by the method of embodiment (1).

Embodiment (1)(b): a subset of data object representations displayed to the first consumer-user by the method of embodiment (1).

Embodiment (2): a system, comprising: at least one processor, programmed to; receive first event information; receive first event preference information indicating that the first consumer-user has expressed a preference for the first event information; filter the first event information to create a subset of first event information that is provided to the first consumer-user; display to the first consumer-user one or more data object representations relating to the subset of the first event information; receive one or more first consumer-user interactions with the subset of data object representations displayed to the first consumer-user; display to a first event promoter: interaction data relating to the first event and specific to one or more consumer-users; interaction data related to the first event aggregated for a plurality of consumer-users on the system; comparative interaction data from a plurality of customer-users related to the first event relative to a one or more other events on the system; or combinations thereof.

The processor of embodiment (2) is further programmed to receive additional event information from a plurality of events; receive additional event preference information indicating that the first consumer-user has expressed a preference for an additional subset of the additional event information; filter the first event information and the additional event information to create one or more supplemental subsets of additional event information that is provided to the first consumer-user; display to the first consumer-user one or more data object representations relating to the one or more supplemental subsets of additional event information; receive one or more first consumer-user interactions with the one or more data object representations relating to the one or more supplemental subsets of additional event information; and display to each of the additional events: (i) interaction data relating to the one or more additional events and specific to the one or more consumer-users expressing a preference for the one or more additional event information; (ii) interaction data related to the one or more additional events aggregated for a plurality of consumer-users on the system; (iii) comparative interaction data from a plurality of customer-users related to the one or more additional events relative to a one or more other events on the system; or (iv) combinations thereof. Moreover, the processor can also be programmed to display to the first consumer-user first event information not previously displayed to the first consumer-user on the system. The processor can also be programmed to display, to one or more additional consumer-users, the one or more data objects relating to the subset of the first event information, wherein the one or more additional consumer-users have a relationship with the first consumer-user.

The interaction data referenced in embodiment (2) comprises the number and/or demographic information related to (i) one or more consumers-users of the plurality of consumer-users on the system, (ii) consumers-users expressing a preference for one or more interest categories, (iii) one of more consumer-users of the plurality of consumer-users on the system expressing a preference for the first event, (iv) one or more consumer-users on the system expressing a preference for the first event, (v) all consumer-users of the system, or (vi) combinations thereof. First consumer-user interactions with the subset of data object representations includes: viewing one or more data object representations of the subset, expressing a preference for one or more data object representations of the subset, commenting on one or more data object representations in the subset, commenting on one or more derivative data object representations in the subset, participating in a dialog regarding one or more data object representations in the subset, offering an opinion regarding one or more data object representations of the subset, providing a rating for one or more data object representations of the subset, clicking through one or more data object representations of the subset to view additional details, clicking through one or more data object of the subset to view first event-hosted information, participating in a survey regarding one or more data object representations of the subset, requesting further information from the first event regarding one or more data object representations of the subset, buying a event displayed in one or more data object representations of the subset from a third-party retailer/reseller, buying a event displayed in one or more data object representations of the subset directly from the first event, buying a event displayed in one or more data object representations of the subset from an individual, participating in an auction regarding one or more data object representations of the subset, offering a event displayed in one or more data object representations in the subset for free, loan, sale, lease, and/or rental, requesting to purchase a event displayed in one or more data object representations in the subset, requesting that a discontinued event displayed in one or more data object representations in the subset is re-introduced by the first event and/or an authorized retailer/reseller thereof, suggesting to the first event product ideas, improvements, and/or corrections regarding one or more data object representations in the subset, or combinations thereof. Moreover, the interaction data includes first event data object representation-consumer clicks, first event data object representation consumer impressions, first event derivative data object representation consumer clicks, first event derivative data object representation-system consumer impressions, total system-consumer clicks, system-consumer clicks per interest category, total system-consumer impressions, system-consumer impressions per interest category, average interest category click through rate, interest category seasonal trend data, average conversion rate, or combinations thereof. In this example, demographic information comprises gender, ethnicity, age, income, education, home ownership, location, employment status, shopping history, personal interests and/or hobbies, or combinations thereof. Still further, comparative interaction data for the first event relative to the plurality of events on the system and/or a subset of the plurality of events on the system comprises the number and/or demographic information related to (i) one or more consumers-users of the plurality of consumer-users on the system, (ii) consumers-users expressing a preference for one or more interest categories, (iii) one of more consumer-users of the plurality of consumer-users on the system expressing a preference for the first event, (iv) one or more consumer-users on the system expressing a preference for the first event, (v) all consumer-users of the system, or (vi) combinations thereof. Moreover, comparative interaction data comprises first event data object representation-consumer clicks, first event data object representation-consumer impressions, first event derivative data object representation consumer clicks, first event derivative data object representation-consumer impressions, total system-consumer clicks, system-consumer clicks per interest category, total system-consumer impressions, system-consumer impressions per interest category, average interest category click through rate, interest category seasonal trend data, average conversion rate, or combinations thereof. In this example, demographic information comprises gender, ethnicity, age, income, education, home ownership, location, employment status, shopping history, personal interests and/or hobbies, or combinations thereof; and/or comparative interaction data can be collected over a defined time interval, e.g., a time period in which the first event and/or a first event competitor has participated in the system. Comparative interaction data can further include event ranking data for the first event in relation to the plurality of events, e.g., event ranking data for the first event in relation to one or more competitor events of the plurality of events.

As used in reference to embodiment (2), first event information comprises general event information including information related to one or more event trademarks, one or more event logos, one or more event logos, event description, interest categories associated with event, event media, event purchasing information, retail information, event promotional information, information related events within the event portfolio, related event description, related event products, or combinations thereof. As used in this example, event description information comprises an event image, one or more event-specific supporting documents and information, one or more event reviews, an event rating, or combinations thereof; and/or event media includes a event-specific video file, a event-specific audio file, or print media; and/or event-specific supporting documents and information comprises one or more literature references, reviews, blog link, press release, forum link, or combinations thereof.

First event information, as used in reference to embodiment (2) comprises first event information including information related to one or more event trademarks, event description information, event media, event purchasing information, event retail information, event promotional information, related first event products, or combinations thereof. Event description information comprises an item image, one or more item-specific supporting documents and information, one or more event reviews, a event rating, or combinations thereof; event media includes a event-specific video file, a event-specific audio file, or print media; event-specific supporting documents and information comprises one or more literature references, reviews, blog link, press release, forum link, or combinations thereof.

First event preference information as used in embodiment (2) includes system tracking preference for the first event information and the processor is further programmed to filter the first event information to create a first supplemental subset of first event information that is provided to the first consumer-user expressing a system tracking preference for the first event information; and display to the first consumer user one or more derivative data object representations relating to the first supplemental subset of the first event information, wherein the one or more derivative data objects are associated in the system with the one or more data objects.

The processor of embodiment (2) can be further programmed to receive first consumer-user preference information indicating that an additional consumer-user has a system tracking preference for the first consumer-user; filter the first event information to create a second supplemental subset of first event information that is provided to the additional consumer-user expressing a system tracking preference for the first consumer-user; and display to the additional consumer-user one or more data object representations and/or derivative data object representations relating to the second supplemental subset of the first event information. Moreover, the processor can be further programmed to receive first consumer-user preference information indicating that a first event-promoter user has a system tracking preference for the first consumer-user; filter the first event information to create a third supplemental subset of first event information that is provided to the first event-promoter user expressing a system tracking preference for the first consumer-user; and display to the first event-promoter user one or more data object representations and/or derivative data object representations relating to the third supplemental subset of the first event information. In this embodiment, a system tracking preference can be expressed by following and/or listing a data object representation and/or a derivative data object representation. And in a further example of embodiment (2), the processor is further programmed to receive additional event preference information indicating that an additional event of the plurality of events has a preference for the first consumer-user; and display to the additional event one or more data object representations relating to the subset of the first event information. In these examples of embodiment (2), the preference is expressed as a following, listing friending, and/or liking a data object representation and/or a derivative data object representation, and for example, the preference is a system tracking preference selected from following and/or listing a data object representation and/or a derivative data object representation. The processor of embodiment (2) can be further programmed to generate a derivative data object in response to the expression of a system tracking preference for a data object representation by the first consumer-user, and associate the derivative data object in the system with the data object and the first consumer-user. Moreover, the processor can be further programmed to generate a derivative data object in response to the expression of a system tracking preference for a data object representation by a first event-promoter user, and associate the derivative data object in the system with the data object and the first event-promoter user.

The system of embodiment (2) further includes a first event-promoter user and the processor is further programmed to display to the first event-promoter user interaction data related to the plurality of consumer-users expressing a preference for the first event information; display to the first event-promoter user the subset of data object representations displayed to the first consumer-user; receive subset preference information indicating that the first event-promoter user has expressed a preference for one or more data object representations of the subset; and display to the first event user interactions with the subset of data object representations displayed to the first consumer-user and the first event-promoter user. Moreover, the processor is further programmed to receive additional first event information responsive to the first event interaction data and/or the first event comparative interaction data. The additional first event information comprises event media, event purchasing information, retail information, event promotional information, one or more event-specific supporting documents and information, one or more event reviews, a event rating, event media, event purchasing information, event retail information, event promotional information, one or more item-specific supporting documents and information, one or more event reviews, a event rating, or combinations thereof.

Embodiment (2)(a): a subset of first event information created by the system of embodiment (2).

Embodiment (2)(b): a subset of data object representations displayed to the first consumer-user by the system of embodiment (2).

Embodiment (3): at least one computer-readable storage medium having instructions recorded thereon which, when executed by at least one computer, perform a method of exchanging event information on a system, wherein the system has (i) a plurality of consumer-users including a first consumer-user, and (ii) a plurality of events including a first event, the method comprising acts of: receiving first event information; receiving first event preference information indicating that the first consumer-user has expressed a preference for the first event information; filtering the first event information to create a subset of first event information that is provided to the first consumer-user; displaying to the first consumer-user one or more data object representations relating to the subset of the first event information; receiving one or more first consumer-user interactions with the one or more data object representations relating to the subset of first event information; displaying to the first event: interaction data relating to the first event and specific to one or more consumer-users; interaction data related to the first event aggregated for a plurality of consumer-users on the system; comparative interaction data from a plurality of customer-users related to the first event relative to a one or more other events on the system; or combinations thereof.

The method referenced in embodiment (3) can also include: receiving additional event information from a plurality of events; receiving additional event preference information indicating that the first consumer-user has expressed a preference for an additional subset of the additional event information; filtering the first event information and the additional event information to create one or more supplemental subsets of additional event information that is provided to the first consumer-user; displaying to the first consumer-user one or more data object representations relating to the one or more supplemental subsets of additional event information; receiving one or more first consumer-user interactions with the one or more data object representations relating to the one or more supplemental subsets of additional event information; and displaying to each of the additional events: (i) interaction data relating to the one or more additional events and specific to the one or more consumer-users expressing a preference for the one or more additional event information; (ii) interaction data related to the one or more additional events aggregated for a plurality of consumer-users on the system; (iii) comparative interaction data from a plurality of customer-users related to the one or more additional events relative to a one or more other events on the system; or (iv) combinations thereof. Still further, the method can also comprise displaying to the first consumer-user first event information not previously displayed to the first consumer-user on the system.

The displaying step (d) of embodiment (3) can further comprise displaying to one or more additional consumer-users one or more data object representations relating to the subset of the first event information, wherein the one or more additional consumer-users have a relationship with the first consumer-user.

The interaction data referenced in embodiment (3) can comprise the number and/or demographic information related to (i) one or more consumers-users of the plurality of consumer-users on the system, (ii) consumers-users expressing a preference for one or more interest categories, (iii) one of more consumer-users of the plurality of consumer-users on the system expressing a preference for the first event, (iv) one or more consumer-users on the system expressing a preference for the first event, (v) all consumer-users of the system, or (vi) combinations thereof. The one or more first consumer-user interactions with the subset of data object representations includes: viewing one or more data object representations of the subset, expressing a preference for one or more data object representations of the subset, commenting on one or more data object representations in the subset, commenting on one or more derivative data object representations in the subset, participating in a dialog regarding one or more data object representations in the subset, offering an opinion regarding one or more data object representations of the subset, providing a rating for one or more data object representations of the subset, clicking through one or more data object representations of the subset to view additional details, clicking through one or more data object representations of the subset to view first event-hosted information, participating in a survey regarding one or more data object representations of the subset, requesting further information from the first event regarding one or more data object representations of the subset, buying a event displayed in one or more data object representations of the subset from a third-party retailer/reseller, buying a event displayed in one or more data object representations of the subset directly from the first event, buying a event displayed in one or more data object representations of the subset from an individual, participating in an auction regarding one or more data object representations of the subset, offering a event displayed in one or more data object representations in the subset for free, loan, sale, lease, and/or rental, requesting to purchase a event displayed in one or more data object representations in the subset, requesting that a discontinued event displayed in one or more data object representations in the subset is re-introduced by the first event and/or an authorized retailer/reseller thereof, suggesting to the first event product ideas, improvements, and/or corrections regarding one or more data object representations in the subset, or combinations thereof.

The interaction data referenced in embodiment (3) includes first event data object representation-consumer clicks, first event data object representation consumer impressions, first event derivative data object representation consumer clicks, first event derivative data object representation-system consumer impressions, total system-consumer clicks, system-consumer clicks per interest category, total system-consumer impressions, system-consumer impressions per interest category, average interest category click through rate, interest category seasonal trend data, average conversion rate, or combinations thereof. As used in reference to embodiment (3), demographic information comprises gender, ethnicity, age, income, education, home ownership, location, employment status, shopping history, personal interests and/or hobbies, or combinations thereof.

The comparative interaction data for the first event relative to the plurality of events on the system and/or a subset of the plurality of events on the system referenced in embodiment (3) comprises the number and/or demographic information related to (i) one or more consumers-users of the plurality of consumer-users on the system, (ii) consumers-users expressing a preference for one or more interest categories, (iii) one of more consumer-users of the plurality of consumer-users on the system expressing a preference for the first event, (iv) one or more consumer-users on the system expressing a preference for the first event, (v) all consumer-users of the system, or (vi) combinations thereof.

As used in embodiment (3), comparative interaction data comprises first event data object representation-consumer clicks, first event data object representation-consumer impressions, first event derivative data object representation consumer clicks, first event derivative data object representation-consumer impressions, total system-consumer clicks, system-consumer clicks per interest category, total system-consumer impressions, system-consumer impressions per interest category, average interest category click through rate, interest category seasonal trend data, average conversion rate, or combinations thereof. In one example of embodiment (3), the comparative interaction data is collected over a defined time interval, e.g., a time period in which the first event and/or a first event competitor has participated in the system. Moreover, comparative interaction data can also include event ranking data for the first event in relation to the plurality of events, e.g., event ranking data for the first event in relation to one or more competitor events of the plurality of events.

The first event information referenced in embodiment (1) comprises general event information including information related to one or more event trademarks, one or more event logos, one or more event logos, event description, interest categories associated with event, event media, event purchasing information, retail information, event promotional information, information related events within the event portfolio, related event description, related event products, or combinations thereof. Event description information comprises an event image, one or more event-specific supporting documents and information, one or more event reviews, an event rating, or combinations thereof. Event media includes an event-specific video file, an event-specific audio file, or print media. Event-specific supporting documents and information comprises one or more literature references, reviews, blog link, press release, forum link, or combinations thereof.

First event preference information as used in reference to embodiment (3) includes system tracking preference for the first event information and the method further comprises filtering the first event information to create a first supplemental subset of first event information that is provided to the first consumer-user expressing a system tracking preference for the first event information; and displaying to the first consumer user one or more derivative data object representations relating to the first supplemental subset of the first event information, wherein the one or more derivative data objects are associated in the system with the one or more data objects.

The method referenced in embodiment (3) can further comprise receiving first consumer-user preference information indicating that an additional consumer-user has a system tracking preference for the first consumer-user; filtering the first event information to create a second supplemental subset of first event information that is provided to the additional consumer-user expressing a system tracking preference for the first consumer-user; and displaying to the additional consumer-user one or more data object representations and/or derivative data object representations relating to the second supplemental subset of the first event information. Moreover, the method can also include receiving first consumer-user preference information indicating that a first event-promoter user has a system tracking preference for the first consumer-user; filtering the first event information to create a third supplemental subset of first event information that is provided to the first event-promoter user expressing a system tracking preference for the first consumer-user; and displaying to the first event-promoter user one or more data object representations and/or derivative data object representations relating to the third supplemental subset of the first event information.

A system tracking preference, as used in reference to embodiment (3), is expressed by following and/or listing a data object representation and/or a derivative data object representation.

Still further, the method referenced in embodiment (3) can also include receiving additional event preference information indicating that an additional event of the plurality of events has a preference for the first consumer-user; and displaying to the additional event one or more data object representations relating to the subset of the first event information. This preference can be expressed as a following, listing, friending, and/or liking a data object representation and/or a derivative data object representation. In a specific example of embodiment (3), the preference is a system tracking preference selected from following and/or listing a data object representation and/or a derivative data object representation. In one example, the expression of a system tracking preference for a data object representation by the first consumer-user generates a derivative data object based on the data object, wherein the derivative data object is associated in the system with the data object, the first consumer-user, and the one or more additional consumer-users having a relationship with the first consumer-user. For example, the expression of a system tracking preference for a data object representation by a first event-promoter user generates a derivative data object based on the data object, wherein the derivative data object is associated in the system with the data object, a first event-promoter user, and one or more additional consumer-users and/or event-promoter users having a relationship with the first event-promoter user. In a particular example of embodiment (3), a modification to a data object generates a modification to all derivative data object representations of the data object. Moreover, the modification can include an edit to one or more data object elements, an addition to the data object, deletion of one or more data object elements, the addition of a comment regarding a data object, or combinations thereof.

The system referenced in embodiment (3) can include a first event-promoter user and the method further comprises displaying to the first event-promoter user interaction data related to the plurality of consumer-users expressing a preference for the first event information; displaying to the first event-promoter user the subset of data object representations displayed to the first consumer-user; receiving subset preference information indicating that the first event-promoter user has expressed a preference for one or more data object representations of the subset; and displaying to the first event user interactions with the subset of data object representations displayed to the first consumer-user and the first event-promoter user.

The method referenced in embodiment (3) can include receiving additional first event information relating to (a) the general first event information and/or the first event event; and (b) responsive to the first event interaction data and/or the first event comparative interaction data. The additional first event information comprises event media, event purchasing information, retail information, event promotional information, one or more event-specific supporting documents and information, one or more event reviews, a event rating, event media, event purchasing information, event retail information, event promotional information, one or more item-specific supporting documents and information, one or more event review s, a event rating, or combinations thereof.

Embodiment (3)(a): a subset of first event information created by the at least one computer readable storage medium of embodiment (3).

Embodiment (3)(b): a subset of data object representations displayed to the first consumer-user by the at least one computer readable storage medium of embodiment (3).

Embodiment (4): a method of exchanging information on a system having a plurality of consumer-users including a first consumer-user, the method comprising acts of: receiving information indicating that a first consumer-user has a preference for a event and/or event; receiving item and/or event information, provided by at least some of the plurality of consumer-users and/or the event relating to the event and/or event; filtering the item and/or event information to create a subset of the item and/or event information that is provided to the first consumer-user; and displaying to the first consumer user one or more data object representations relating to the subset of the item and/or event information.

The method referenced in embodiment (4) can also include receiving additional event information from a plurality of events; receiving additional event preference information indicating that the first consumer-user has expressed a preference for an additional subset of the additional event information; filtering the first event information and the additional event information to create one or more supplemental subsets of additional event information that is provided to the first consumer-user; displaying to the first consumer-user one or more data object representations relating to the one or more supplemental subsets of additional event information; receiving one or more first consumer-user interactions with the one or more data object representations relating to the one or more supplemental subsets of additional event information; and displaying to each of the additional events: (i) interaction data relating to the one or more additional events and specific to the one or more consumer-users expressing a preference for the one or more additional event information; (ii) interaction data related to the one or more additional events aggregated for a plurality of consumer-users on the system; (iii) comparative interaction data from a plurality of customer-users related to the one or more additional events relative to a one or more other events on the system; or (iv) combinations thereof.

The method of embodiment (4) can also include displaying to the first consumer-user first event information not previously displayed to the first consumer-user on the system.

Moreover, the method of embodiment (4) can include a displaying step (d) further comprises displaying to one or more additional consumer-users one or more data object representations relating to the subset of the first event information, wherein the one or more additional consumer-users have a relationship with the first consumer-user. Still further, the method can also include receiving additional information relating to the event and/or event; filtering the additional item and/or event information to create an additional subset of the additional item and/or event information that is provided to consumer-users included in the group of consumer-users having an interest in the event and/or event; and displaying to the first consumer-user one or more derivative data object representations relating to the additional subset of additional item and/or event information. The displaying step of embodiment (4) can include displaying the one or more data object representations in an order based at least in part on an order in which item and/or event information is received from consumer-users in the group of consumer-users having a relationship with the first consumer-user. In addition or alternatively, the displaying step can also include displaying the one or more data object representations in an order based at least in part on an order in which information indicating that the first consumer-user has an interest in a corresponding one or more events and/or events is received. Still further, the displaying step can include displaying a separate data object representation for each event and/or event selected by the first consumer-user.

Embodiment (4)(a): a subset of first event information created by the method of embodiment (4).

Embodiment (4)(b): a subset of data object representations displayed to the first consumer-user by the method of embodiment (4).

Embodiment (5): a system, comprising at least one processor, programmed to: receive information indicating that the first consumer-user has an interest in a event and/or event; receive item and/or event information, provided by at least some of the plurality of consumer-users, relating to the event and/or event; filter the item and/or event information to create a subset of the item and/or event information that is provided by the first consumer-user; and display to the first consumer-user one or more data object representations relating to the subset of the item and/or event information.

The processor referenced in embodiment (5) is further programmed to receive additional event information from a plurality of events; receive additional event preference information indicating that the first consumer-user has expressed a preference for an additional subset of the additional event information; filter the first event information and the additional event information to create one or more supplemental subsets of additional event information that is provided to the first consumer-user; display to the first consumer-user one or more data object representations relating to the one or more supplemental subsets of additional event information; receive one or more first consumer-user interactions with the one or more data object representations relating to the one or more supplemental subsets of additional event information; and display to each of the additional events: (i) interaction data relating to the one or more additional events and specific to the one or more consumer-users expressing a preference for the one or more additional event information; (ii) interaction data related to the one or more additional events aggregated for a plurality of consumer-users on the system; (iii) comparative interaction data from a plurality of customer-users related to the one or more additional events relative to a one or more other events on the system; or (iv) combinations thereof. Moreover, the processor is further programmed to display to the first consumer-user first event information not previously displayed to the first consumer-user on the system.

Additionally, the processor referenced in embodiment (5) is further programmed to display, to one or more additional consumer-users, one or more data object representations relating to the subset of the first event information, wherein the one or more additional consumer-users have a relationship with the first consumer-user; and/or it is also optionally further programmed to receive additional information relating to the event and/or event provided by at least some of the plurality of consumer-users relating to the event and/or event; filter the additional item and/or event information to create an additional subset of the additional item and/or event information that is provided to consumer-users included in the group of consumer-users having a relationship with the first consumer-user; and display to the first consumer-user one or more derivative data object representations relating to the additional subset of additional item and/or event information.

The one or more derivative data object representations referenced in embodiment (5) can be associated in the system with the one or more data object representations. The at least one processor can be programmed to display the one or more data object representations in an order which is based at least in part on an order in which item information is received from consumer-users in the group of consumer-users having a relationship with the first consumer-user; and/or the at least one processor is programmed to display the one or more data object representations in an order which is based at least in part on an order in which information indicating that the first consumer-user has an interest in a corresponding one or more events is received; and/or the at least one processor is programmed to display a separate data object representation for each event selected by the first consumer-user.

Embodiment (5)(a): a subset of first event information created by the system of embodiment (5).

Embodiment (5)(b): a subset of data object representations displayed to the first consumer-user by the system of embodiment (5).

Embodiment (6): at least one computer-readable storage medium having instructions recorded thereon which, when executed by at least one computer, perform a method for use in a system having a plurality of consumer-users including a first consumer-user, the method comprising acts of: receiving information indicating that a first consumer-user has a preference for a event and/or event; receiving item and/or event information, provided by at least some of the plurality of consumer-users and/or the event relating to the event and/or event; filtering the item and/or event information to create a subset of the item and/or event information that is provided to the first consumer-user; and displaying to the first consumer user one or more data object representations relating to the subset of the item and/or event information.

The method referenced in embodiment (6) can further comprise: receiving additional event information from a plurality of events; receiving additional event preference information indicating that the first consumer-user has expressed a preference for an additional subset of the additional event information; filtering the first event information and the additional event information to create one or more supplemental subsets of additional event information that is provided to the first consumer-user; displaying to the first consumer-user one or more data object representations relating to the one or more supplemental subsets of additional event information; receiving one or more first consumer-user interactions with the one or more data object representations relating to the one or more supplemental subsets of additional event information; and displaying to each of the additional events: (i) interaction data relating to the one or more additional events and specific to the one or more consumer-users expressing a preference for the one or more additional event information; (ii) interaction data related to the one or more additional events aggregated for a plurality of consumer-users on the system; (iii) comparative interaction data from a plurality of customer-users related to the one or more additional events relative to a one or more other events on the system; or (iv) combinations thereof.

The method referenced in embodiment (6) can further comprise displaying to the first consumer-user first event information not previously displayed to the first consumer-user on the system.

The displaying step referenced in embodiment (6) can further comprise displaying to one or more additional consumer-users one or more data object representations relating to the subset of the first event information, wherein the one or more additional consumer-users have a relationship with the first consumer-user. The method referenced in embodiment (6) can also include receiving additional information relating to the event and/or event provided by at least some of the plurality of consumer-users relating to the event and/or event; filtering the additional item and/or event information to create an additional subset of the additional item and/or event information that is provided to consumer-users included in the group of consumer-users having a relationship with the first consumer-user; and displaying to the first consumer-user one or more derivative data object representations relating to the subset of additional item and/or event information.

The displaying step of embodiment (6) can include displaying the one or more data object representations in an order based at least in part on an order in which item information is received from consumer-users in the group of users having a relationship with the first consumer-users; and/or the displaying step can include displaying the one or more data object representations in an order based at least in part on an order in which information indicating that the first consumer-user has an interest in a corresponding one or more events is received; and/or the displaying step can include displaying a separate data object representation for each event selected by the first consumer-user.

Embodiment (6)(a): a subset of first event information created by the at least one computer-readable storage medium of embodiment (6).

Embodiment (6)(b): a subset of data object representations displayed to the first consumer-user by the at least one computer-readable storage medium of embodiment (6).

Embodiment (7): a method of exchanging information on a system between a first event and a first consumer-user, the system comprising (a) a plurality of consumer-users including the first consumer-user, and (b) a plurality of events including the first event, wherein the system is configured to receive, filter, and/or display information related to the first consumer-user, the first event, the plurality of consumer-users, the plurality of events, a event, interaction data, comparative interaction data and combinations thereof; the method comprising acts of: viewing, by the first event, interaction data related to the plurality of consumer-users expressing a preference for first event information; and providing additional first event information responsive to the first event interaction data.

Embodiment (7) can further include viewing, by the first event, event comparative interaction data for the first event relative to the plurality of events on the system and/or a subset of the plurality of events on the system; and providing additional first event information relating to (i) the general first event information and/or the first event; and (ii) responsive to the first event interaction data and/or the first event comparative interaction data. Moreover, prior to the viewing step, the method can further include providing, by the first event, first event information relating to general first event information and/or the first event.

The interaction data referenced in embodiment (7) comprises the number and/or demographic information related to (i) one or more consumers-users of the plurality of consumer-users on the system, (ii) consumers-users expressing a preference for one or more interest categories, (iii) one of more consumer-users of the plurality of consumer-users on the system expressing a preference for the first event, (iv) one or more consumer-users on the system expressing a preference for the first event, (v) all consumer-users of the system, or (vi) combinations thereof.

As referenced in embodiment (7), the one or more first consumer-user interactions with the subset of data object representations includes: viewing one or more data object representations of the subset, expressing a preference for one or more data object representations of the subset, commenting on one or more data object representations in the subset, commenting on one or more derivative data object representations in the subset, participating in a dialog regarding one or more data object representations in the subset, offering an opinion regarding one or more data object representations of the subset, providing a rating for one or more data object representations of the subset, clicking through one or more data object representations of the subset to view additional details, clicking through one or more data object of the subset to view first event-hosted information, participating in a survey regarding one or more data object representations of the subset, requesting further information from the first event regarding one or more data object representations of the subset, buying a event displayed in one or more data object representations of the subset from a third-party retailer/reseller, buying a event displayed in one or more data object representations of the subset directly from the first event, buying a event displayed in one or more data object representations of the subset from an individual, participating in an auction regarding one or more data object representations of the subset, offering a event displayed in one or more data object representations in the subset for free, loan, sale, lease, and/or rental, requesting to purchase a event displayed in one or more data object representations in the subset, requesting that a discontinued event displayed in one or more data object representations in the subset is re-introduced by the first event and/or an authorized retailer/reseller thereof, suggesting to the first event product ideas, improvements, and/or corrections regarding one or more data object representations in the subset, or combinations thereof.

The interaction data of embodiment (7) includes first event data object-consumer clicks, first event data object consumer impressions, first event derivative data object consumer clicks, first event derivative data object-system consumer impressions, total system-consumer clicks, system-consumer clicks per interest category, total system-consumer impressions, system-consumer impressions per interest category, average interest category click through rate, interest category seasonal trend data, average conversion rate, or combinations thereof.

As used in reference to embodiment (7), demographic information comprises gender, ethnicity, age, income, education, home ownership, location, employment status, shopping history, personal interests and/or hobbies, or combinations thereof.

As used in reference to embodiment (7), comparative interaction data for the first event relative to the plurality of events on the system and/or a subset of the plurality of events on the system comprises the number and/or demographic information related to (i) one or more consumers-users of the plurality of consumer-users on the system, (ii) consumers-users expressing a preference for one or more interest categories, (iii) one of more consumer-users of the plurality of consumer-users on the system expressing a preference for the first event, (iv) one or more consumer-users on the system expressing a preference for the first event, (v) all consumer-users of the system, or (vi) combinations thereof. Moreover, comparative interaction data comprises first event data object-consumer clicks, first event data object-consumer impressions, first event derivative data object consumer clicks, first event derivative data object-consumer impressions, total system-consumer clicks, system-consumer clicks per interest category, total system-consumer impressions, system-consumer impressions per interest category, average interest category click through rate, interest category seasonal trend data, average conversion rate, or combinations thereof. In a specific example, the comparative interaction data is collected over a defined time interval, e.g., a time period in which the first event and/or a first event competitor has participated in the system. Moreover, the comparative interaction data can include event ranking data for the first event in relation to the plurality of events, e.g., event ranking data for the first event in relation to one or more competitor events of the plurality of events.

The first event information referenced in embodiment (7) comprises general event information including information related to one or more event trademarks, one or more event logos, one or more event logos, event description, interest categories associated with event, event media, event purchasing information, retail information, event promotional information, information related events within the event portfolio, related event description, related event products, or combinations thereof. The event description information comprises an event image, one or more event-specific supporting documents and information, one or more event reviews, an event rating, or combinations thereof. Event media includes an event-specific video file, an event-specific audio file, or print media. Event-specific supporting documents and information comprises one or more literature references, reviews, blog link, press release, forum link, or combinations thereof.

First event information can also include first event information including information related to one or more event trademarks, event description information, event media, event purchasing information, event retail information, event promotional information, related first event products, or combinations thereof. The event description information comprises an event image, one or more event-specific supporting documents and information, one or more event reviews, an event rating, or combinations thereof. Event media includes an event-specific video file, an event-specific audio file, or print media. Event-specific supporting documents and information comprises one or more literature references, reviews, blog link, press release, forum link, or combinations thereof.

As used in embodiment (7), a preference can be expressed as a following, friending, and/or liking a data object representation and/or a derivative data object representation. In a specific example, the preference is a system tracking preference selected from following and/or listing a data object representation and/or a derivative data object representation. The expression of a system tracking preference for a data object representation by the first consumer-user can generate a derivative data object based on the data object, wherein the derivative data object is associated in the system with the data object, the first consumer-user, and the one or more additional consumer-users having a relationship with the first consumer-user. Moreover, the expression of a system tracking preference for a data object representation by a first event-promoter user can generate a derivative data object based on the data object, wherein the derivative data object is associated in the system with the data object, a first event-promoter user, and one or more additional consumer-users and/or event-promoter users having a relationship with the first event-promoter user. In a particular example of embodiment (7), a modification to a data object generates a modification to all derivative data objects of the data object. For example, the modification includes an edit to one or more data object elements, an addition to the data object, deletion of one or more data object elements, the addition of a comment regarding a data object, or combinations thereof.

Still further, additional first event information, as used in embodiment (7), comprises event media, event purchasing information, retail information, event promotional information, one or more event-specific supporting documents and information, one or more event reviews, a event rating, event media, event purchasing information, event retail information, event promotional information, one or more item-specific supporting documents and information, one or more event reviews, a event rating, or combinations thereof.

Embodiment (8): a method of exchanging information on a system between a first event and a first consumer-user, the system comprising (a) a plurality of consumer-users including the first consumer-user, and (b) a plurality of events including the first event, wherein the system is configured to receive, filter, and/or display information related to the first consumer-user, the first event, the plurality of consumer-users, the plurality of events, a event, interaction data, comparative interaction data and combinations thereof; the method comprising acts of: viewing, by the first consumer-user, first event information; expressing a preference for the first event information; and viewing, by the first consumer-user, a subset of first event information that is provided by the system to the first consumer-user.

As used in embodiment (8), the first event information comprises general event information including information related to one or more event trademarks, one or more event logos, one or more event logos, event description, interest categories associated with event, event media, event purchasing information, retail information, event promotional information, information related events within the event portfolio, related event description, related event products, or combinations thereof. The event description information comprises an event image, one or more event-specific supporting documents and information, one or more event reviews, an event rating, or combinations thereof. Event media includes an event-specific video file, an event-specific audio file, or print media. Event-specific supporting documents and information comprises one or more literature references, reviews, blog link, press release, forum link, or combinations thereof.

A preference, as used in embodiment (8), can be expressed as a following, friending, and/or liking a data object representation and/or a derivative data object representation. In a specific example of embodiment (8), the preference is a system tracking preference selected from following and/or listing a data object representation and/or a derivative data object representation.

Embodiment (9): a method of exchanging information on a system between a first consumer-user and one or more additional consumer-users, the system comprising (a) a plurality of consumer-users including the first consumer-user and the one or more additional consumer-users, wherein the first and one or more additional consumer-users are connected in the system, and (b) a plurality of events including the first event, wherein the system is configured to receive, filter, and/or display information related to the first consumer-user, the first event, the plurality of consumer-users, the plurality of events, a event, interaction data, comparative interaction data and combinations thereof; the method comprising acts of: viewing, by the first consumer-user, a subset of first event information that is provided by the system to the first consumer-user and the one or more additional consumer-users; and viewing, by the first consumer-user, an interaction with the subset of first event information comprising: (i) a preference expressed by the first consumer-user and/or the one or more additional consumer-users, wherein the preference is for one or more members of the subset of first event information; (ii) a comment provided by the first consumer-user and/or the one or more additional consumer-users, wherein the comment relates to one or more members of the subset of first event information, wherein the comment is provided by the first consumer-user and/or the one or more additional consumer-users; or (iii) combinations thereof.

As used in reference to embodiment (9), the interaction with the subset includes: viewing one or more data object representations of the subset, expressing a preference for one or more data object representations of the subset, commenting on one or more data object representations in the subset, commenting on one or more derivative data object representations in the subset, participating in a dialog regarding one or more data object representations in the subset, offering an opinion regarding one or more data object representations of the subset, providing a rating for one or more data object representations of the subset, clicking through one or more data object representations of the subset to view additional details, clicking through one or more data object representation of the subset to view first event-hosted information, participating in a survey regarding one or more data object representations of the subset, requesting further information from the first event regarding one or more data object representations of the subset, buying a event displayed in one or more data object representations of the subset from a third-party retailer/reseller, buying a event displayed in one or more data object representations of the subset directly from the first event, buying a event displayed in one or more data object representations of the subset from an individual, participating in an auction regarding one or more data object representations of the subset, offering a event displayed in one or more data object representations in the subset for free, loan, sale, lease, and/or rental, requesting to purchase a event displayed in one or more data object representations in the subset, requesting that a discontinued event displayed in one or more data object representations in the subset is re-introduced by the first event and/or an authorized retailer/reseller thereof, suggesting to the first event product ideas, improvements, and/or corrections regarding one or more data objects in the subset, or combinations thereof.

Moreover, the first event information referenced in embodiment (9) comprises general event information including information related to one or more event trademarks, one or more event logos, one or more event logos, event description, interest categories associated with event, event media, event purchasing information, retail information, event promotional information, information related events within the event portfolio, related event description, related event products, or combinations thereof. The event description information comprises an event image, one or more event-specific supporting documents and information, one or more event reviews, an event rating, or combinations thereof. Event media includes an event-specific video file, an event-specific audio file, or print media. Event-specific supporting documents and information comprises one or more literature references, reviews, blog link, press release, forum link, or combinations thereof.

Embodiment (10): a method of exchanging event information on a system, wherein the system has (i) a plurality of consumer-users including a first consumer-user and one or more additional consumer-users, and (ii) a plurality of events including a first event, the method comprising acts of: receiving first event information; receiving first event preference information indicating that the first consumer-user has expressed a preference for the first event information; filtering the first event information to create a subset of first event information that is provided to the first consumer-user, wherein the subset comprises first event information not previously displayed to the first consumer-user on the system; displaying to the first consumer-user one or more data object representations relating to the subset of the first event information; receiving one or more first consumer-user interactions with the one or more data object representations relating to the subset of first event information; displaying to the first event: interaction data relating to the first event and specific to one or more consumer-users; interaction data related to the first event aggregated for a plurality of consumer-users on the system; comparative interaction data from a plurality of customer-users related to the first event relative to a one or more other events on the system; or combinations thereof.

The method of embodiment (10) can also include: receiving additional event information from a plurality of events; receiving additional event preference information indicating that the first consumer-user has expressed a preference for an additional subset of the additional event information; filtering the first event information and the additional event information to create one or more supplemental subsets of additional event information that is provided to the first consumer-user; displaying to the first consumer-user one or more data object representations relating to the one or more supplemental subsets of additional event information; receiving one or more first consumer-user interactions with the one or more data object representations relating to the one or more supplemental subsets of additional event information; and displaying to each of the additional events: (i) interaction data relating to the one or more additional events and specific to the one or more consumer-users expressing a preference for the one or more additional event information; (ii) interaction data related to the one or more additional events aggregated for a plurality of consumer-users on the system; (iii) comparative interaction data from a plurality of customer-users related to the one or more additional events relative to a one or more other events on the system; or (iv) combinations thereof. Still further, embodiment (10) can further include displaying to the first consumer-user first event information not previously displayed to the first consumer-user on the system.

The displaying step of embodiment (10) can also include displaying to one or more additional consumer-users one or more data object representations relating to the subset of the first event information, wherein the one or more additional consumer-users have a relationship with the first consumer-user.

The interaction data referenced in embodiment (10) comprises the number and/or demographic information related to (i) one or more consumers-users of the plurality of consumer-users on the system, (ii) consumers-users expressing a preference for one or more interest categories, (iii) one of more consumer-users of the plurality of consumer-users on the system expressing a preference for the first event, (iv) one or more consumer-users on the system expressing a preference for the first event, (v) all consumer-users of the system, or (vi) combinations thereof.

As used in reference to embodiment (10), the one or more first consumer-user interactions with the subset of data object representations includes: viewing one or more data object representations of the subset, expressing a preference for one or more data object representations of the subset, commenting on one or more data object representations in the subset, commenting on one or more derivative data object representations in the subset, participating in a dialog regarding one or more data object representations in the subset, offering an opinion regarding one or more data object representations of the subset, providing a rating for one or more data object representations of the subset, clicking through one or more data object representations of the subset to view additional details, clicking through one or more data object of the subset to view first event-hosted information, participating in a survey regarding one or more data object representations of the subset, requesting further information from the first event regarding one or more data object representations of the subset, buying a event displayed in one or more data object representations of the subset from a third-party retailer/reseller, buying a event displayed in one or more data object representations of the subset directly from the first event, buying a event displayed in one or more data object representations of the subset from an individual, participating in an auction regarding one or more data object representations of the subset, offering a event displayed in one or more data object representations in the subset for free, loan, sale, lease, and/or rental, requesting to purchase a event displayed in one or more data object representations in the subset, requesting that a discontinued event displayed in one or more data object representations in the subset is re-introduced by the first event and/or an authorized retailer/reseller thereof, suggesting to the first event product ideas, improvements, and/or corrections regarding one or more data objects in the subset, or combinations thereof. Still further, the interaction data includes first event data object representation-consumer clicks, first event data object representation consumer impressions, first event derivative data object representation consumer clicks, first event derivative data object representation-system consumer impressions, total system-consumer clicks, system-consumer clicks per interest category, total system-consumer impressions, system-consumer impressions per interest category, average interest category click through rate, interest category seasonal trend data, average conversion rate, or combinations thereof.

As used in reference to embodiment (10), demographic information comprises gender, ethnicity, age, income, education, home ownership, location, employment status, shopping history, personal interests and/or hobbies, or combinations thereof.

Moreover, as used in reference to embodiment (10), comparative interaction data comprises the number and/or demographic information related to (i) one or more consumers-users of the plurality of consumer-users on the system, (ii) consumers-users expressing a preference for one or more interest categories, (iii) one of more consumer-users of the plurality of consumer-users on the system expressing a preference for the first event, (iv) one or more consumer-users on the system expressing a preference for the first event, (v) all consumer-users of the system, or (vi) combinations thereof. Comparative interaction data can include first event data object representation-consumer clicks, first event data object representation-consumer impressions, first event derivative data object representation consumer clicks, first event derivative data object representation-consumer impressions, total system-consumer clicks, system-consumer clicks per interest category, total system-consumer impressions, system-consumer impressions per interest category, average interest category click through rate, interest category seasonal trend data, average conversion rate, or combinations thereof. In a specific example, the comparative interaction data can be collected over a defined time interval, e.g., a time period in which the first event and/or a first event competitor has participated in the system. Moreover, the comparative interaction data can further include event ranking data for the first event in relation to the plurality of events, e.g., event ranking data for the first event in relation to one or more competitor events of the plurality of events.

As used in reference to embodiment (10), first event information comprises general event information including information related to one or more event trademarks, one or more event logos, one or more event logos, event description, interest categories associated with event, event media, event purchasing information, retail information, event promotional information, information related events within the event portfolio, related event description, related event products, or combinations thereof. The event description information comprises an event image, one or more event-specific supporting documents and information, one or more event reviews, an event rating, or combinations thereof. Event media includes an event-specific video file, an event-specific audio file, or print media. Event-specific supporting documents and information comprises one or more literature references, reviews, blog link, press release, forum link, or combinations thereof.

The first event preference information referenced in embodiment (10) includes system tracking preference for the first event information and the method further comprises filtering the first event information to create a first supplemental subset of first event information that is provided to the first consumer-user expressing a system tracking preference for the first event information; and displaying to the first consumer user one or more derivative data object representations relating to the first supplemental subset of the first event information, wherein the one or more derivative data objects are associated in the system with the one or more data objects.

The method of embodiment (10) can also include receiving first consumer-user preference information indicating that an additional consumer-user has a system tracking preference for the first consumer-user; filtering the first event information to create a second supplemental subset of first event information that is provided to the additional consumer-user expressing a system tracking preference for the first consumer-user; and displaying to the additional consumer-user one or more data object representations and/or derivative data object representations relating to the second supplemental subset of the first event information. The method can additionally include receiving first consumer-user preference information indicating that a first event-promoter user has a system tracking preference for the first consumer-user; filtering the first event information to create a third supplemental subset of first event information that is provided to the first event-promoter user expressing a system tracking preference for the first consumer-user; and displaying to the first event-promoter user one or more data object representations and/or derivative data object representations relating to the third supplemental subset of the first event information. As used in embodiment (10), a system tracking preference is expressed by following and/or listing a data object representation and/or a derivative data object representation.

Embodiment (10) can further include receiving additional event preference information indicating that an additional event of the plurality of events has a preference for the first consumer-user; and displaying to the additional event one or more data object representations relating to the subset of the first event information.

A preference, as used in embodiment (10) can be expressed as a following, listing, friending, and/or liking a data object representation and/or a derivative data object representation. In one specific example, the preference is a system tracking preference selected from following and/or listing a data object representation and/or a derivative data object representation. In a particular example of embodiment (10), the expression of a system tracking preference for a data object representation by the first consumer-user generates a derivative data object based on the data object, wherein the derivative data object is associated in the system with the data object and the first consumer-user. Moreover, in another example, the expression of a system tracking preference for a data object representation by a first event-promoter user generates a derivative data object based on the data object, wherein the derivative data object is associated in the system with the data object and the first event-promoter user.

As used in reference to embodiment (10), a modification to a data object generates a modification to all derivative data object representations of the data object. The modification can include an edit to one or more data object elements, an addition to the data object, deletion of one or more data object elements, the addition of a comment regarding a data object, or combinations thereof.

The system referenced in embodiment (10) can include a first event-promoter user and the method further comprises displaying to the first event-promoter user interaction data related to the plurality of consumer-users expressing a preference for the first event information; displaying to the first event-promoter user the subset of data object representations displayed to the first consumer-user; receiving subset preference information indicating that the first event-promoter user has expressed a preference for one or more data object representations of the subset; and displaying to the first event user interactions with the subset of data object representations displayed to the first consumer-user and the first event-promoter user. The method can also include receiving additional first event information responsive to the first event interaction data and/or the first event comparative interaction data. The additional first event information comprises event media, event purchasing information, retail information, event promotional information, one or more event-specific supporting documents and information, one or more event reviews, a event rating, event media, event purchasing information, event retail information, event promotional information, one or more item-specific supporting documents and information, one or more event reviews, a event rating, or combinations thereof.

Embodiment (10)(a): a subset of first event information created by the method of embodiment (10).

Embodiment (10)(b): a subset of data object representations displayed to the first consumer-user by the method of embodiment (10).

Embodiment (10)(c): a system comprising a processor programmed to practice the method of embodiment (10).

Embodiment (10)(d): at least one computer-readable storage medium having instructions recorded thereon which, when executed by at least one computer, perform a method of embodiment (10).

Embodiment (11): a method of any one of the preceding embodiments wherein said subset identifies the first event information not previously displayed to the first consumer-user.

Embodiment (12): a system of any one of the preceding embodiments wherein said subset identifies the first event information not previously displayed to the first consumer-user.

Embodiment (13): at least one computer readable medium of any one of the preceding embodiments wherein said subset identifies the first event information not previously displayed to the first consumer-user.

Embodiment (14): a method of any one of the preceding embodiments, wherein the one or more data object representations of the subset are displayed by the system in a calendar format.

Embodiment (15): a system of any one of the preceding embodiments wherein the system is programmed to display to the first consumer-user the one or more data object representations relating to the subset in a calendar format.

Embodiment (16): at least one computer-readable storage medium of any one of the preceding embodiments, wherein the method comprises acts of displaying to the first consumer-user the one or more data object representations relating to the subset in a calendar format.

Embodiment (17): a method of any one of the preceding embodiments wherein the subset is provided by the system to the first consumer-user in a calendar format.

Embodiment (18): a method of any one of the preceding embodiments wherein the subset is provided by the system to the first consumer-user in a calendar format.

Embodiment (19): a method of exchanging information on a system between a first consumer-user and one or more additional consumer-users, the system comprising (a) a plurality of consumer-users including the first consumer-user and the one or more additional consumer-users, wherein the first and one or more additional consumer-users are connected in the system, and (b) a plurality of events including a first event, wherein the system is configured to receive, filter, and/or display information related to the first consumer-user, the first event, the plurality of consumer-users, the plurality of events, interaction data, comparative interaction data and combinations thereof; the method comprising acts of:

a. Viewing, by the first consumer-user, a subset of first event information that is provided by the system to the first consumer-user and the one or more additional consumer-users; and b. Viewing, by the first consumer-user, an interaction with the subset of first event information comprising a conversation initiated by the first consumer-user and/or the one or more additional consumer-users, wherein the conversation relates to one or more members of the subset of first event information.

The conversation displayed in embodiment (19) can be displayed by the system to the first consumer-user and one or more additional consumer-users in a conversation data object. Moreover, the method of embodiment (19) can further include viewing, by the first consumer-user and/or the one or more additional consumer-users a modified conversation based on the conversation initiated in step (b), and optionally, the modified conversation is displayed by the system to the first consumer-user and one or more additional consumer-users in a modified conversation data object.

BRIEF DESCRIPTION OF DRAWINGS

The accompanying drawings are provided to illustrate rather than limit the scope of the invention.

FIG. 1(g) is a schematic illustration of an association between a user, A, data object X, derivative data object X', and the followers of user A, users B, C, and D.

FIG. 3(a) is one example of a consumer-user profile creation screen that can be used on the system. FIG. 3(b) shows one embodiment of an event promoter-de-selection screen that can be used to create a profile on the system. FIG. 3(c) shows one or more lists that can be created by the consumer-user during profile set-up on the system.

FIGS. 3(d)-(f) schematically illustrate the profile creation process on the system.

FIGS. 4(a)-(g) illustrate several embodiments of a consumer-user's landing page on the system.

FIGS. 6(a)-(f) is a schematic illustration of the process used to create an event promoter profile.

FIGS. 11(a)-(c) and 12(a)-(d) illustrate the display of a set of data object representations on a television screen.

DETAILED DESCRIPTION OF THE INVENTION

Figure 1A:
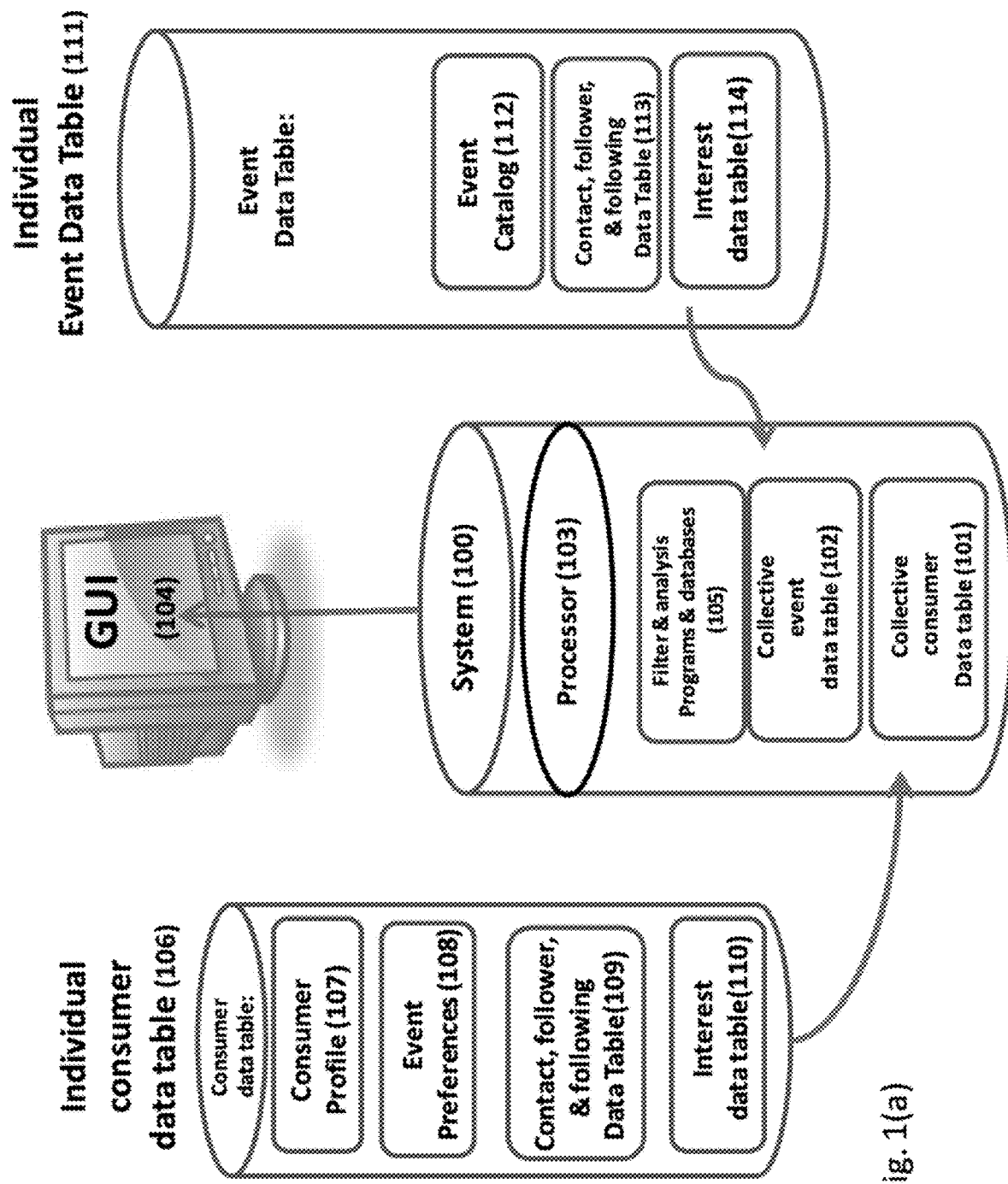
FIG. 1(a) is a schematic representation of the system, including a processor, filter and analysis programs, collective event promoter data table, and a collective consumer data table, wherein the collective event promoter data table draws information from an individual event promoter data table, and likewise, the collective consumer data table draws information from an individual consumer data table.

Descriptions in certain embodiments for practicing aspects of the invention will be discussed below. The examples should not be considered limiting, but are intended to illustrate certain inventive aspects. It will be useful to appreciate, in reading the detailed description, that certain words or terms have defined meanings unless another meaning is apparent.

The invention provides an online community that offers the user a way to stay abreast of events, especially new events, from their favorite providers without having to independently research the providers and events in which they have interest. The system allows users to form a personal relationship with the providers they are interested in and share the experience with followers, e.g., via an online social networking system, as well as other users of the system. The system focuses on provider loyalty to offer a unique online experience for users and a novel tool for providers that gathers information about users interested in their products and/or services. The system uses a "push modality" to present to users provider and item information in which they have expressed interest while also providing valuable opportunities for providers to interact with users interested in their products and/or services.

The system aggregates events submitted by numerous providers and presents them to users in a customizable user graphical user interface ("GUI"). Users of the system do not have to search for events (although the system includes, e.g., key-word and/or Boolean search functionality). Rather, new or existing events are periodically pushed to users based on their events and/or provider preferences without prompting from the user. In addition to enabling the user to follow providers they like, the system also allows users to discover new providers and events in which they might have an interest.

In addition, users can set up a network of contacts (or import or link their user page on the system to any of a number of social networking sites, including but not limited to, Facebook, Twitter, MySpace, Friendster, YouTube, Linkedin, etc.) with whom they can share their favorite providers, interests, events, promotions, etc., and/or with whom they interact regarding an event, provider, contemplated purchase, etc. Users can be notified of their contacts' activities on the system via the user interface or via one or more social networking sites, such as when they express an interest in a provider or event, e.g., by following an event or provider, liking an event or provider, etc. In one embodiment, a user can create lists of data object representations representing events or providers wherein the events or providers listed are related to a user-defined theme, activity, etc.

Still further, the system provides a mechanism for providers to communicate with existing and potential users. Providers can share any information that is pertinent to a user that has shown interest in a given provider by, e.g., following the provider or an event offered by that provider. The ability to push item pre-release announcements, special promotions, incentives to participate in provider/event surveys and focus groups, etc. to such a targeted group of users is extremely valuable to the provider.

Definitions

"Computer" or "computer system" as used herein shall mean one or more computing devices, regardless of the number and location of processing elements. For example and without limitation, the term computer or computer system includes personal computers, desktop computers, tablet computers, computer networks, personal digital assistants (PDAs), mobile phones (whether smart phones, PDA phones or digital cell phones), web TV, portable e-mail devices, game consoles, media players, home theater computer systems, global positioning systems (GPS), and so forth. In addition, a computer system can provide access to two or more consumer-users at different computers in the same or different locations, in direct or indirect contact with a server(s) and/or each other via a network (for example, the global internet and its World Wide Web).

A "user" as used herein is an individual who has a preference for an item, provider, brand, event, service, artist, group of artists, sports figure, team, and/or event promoter listed in the system described herein. In a specific embodiment, a user has a preference for an event, artist, group of artists, sports figure, team, or event promoter listed in the system, and in this context, a user can be referred to as a "consumer" or "consumer-user." The terms "consumer" and "consumer-user" are used alternatively herein. A "provider" is an individual, artist, group of artists, team, organization, or entity that provides or promotes an item, event, and/or service on the system. For example, a provider can be a rock group, e.g., the Beatles, a sports team, e.g., the Yankees, a concert or concert tour promoter promoting events featuring one or more rock groups, or a ticket reseller promoting ticket sales for events, etc. In a specific embodiment, a provider is an event provider or promoter, e.g., a provider of one or more events or categories of events. An event provider or promoter can also be an event ticket reseller. For example, a provider can be a rock group, e.g., the Beatles, a sports team, e.g., the Yankees, a concert or concert tour promoter promoting events featuring one or more rock groups, or a ticket reseller promoting ticket sales for events, etc. A "consumer-user" is distinguishable from an "event promoter-user," e.g., an individual or group of individuals authorized by an event promoter to access and/or modify event promoter information in an event promoter data table. A consumer-user can be a private individual, whereas a brand-user can be a volunteer, employee, or contractor working on behalf of a provider, e.g., a company, merchant, retailer, reseller, event-planner, service provider, etc., whereas an event promoter-user can also be an artist, sports figure, or a representative working on behalf of an artist, group of artists, sports figure, or team.

"Database" as used herein refers to any organized data structure or structures used for storing, retrieving, and manipulating information having a predefined meaning.

Without limitation, a database can be a flat file structure, a relational structure, or any other form of information storage. A database may include one or more data tables, wherein the one or more data tables include data relevant to events, event promoters, users and other general system data. Data tables can be subdivided to uniquely identify a particular provider, event promoter, consumer-user, etc.

"Data object" as used herein refers to a database including data related to a promoter, event, event promoter, list, individual, category, interest, etc., wherein the data is displayed by the system in a selectable common visual representation of that promoter, event, event promoter, list, individual, category, interest, etc. A data object can be created by a user and/or provider and displayed by the system in the user GUI and/or the provider GUI. In one embodiment, the data associated with each data object on the system, regardless of origin, is displayed by the system in a common visual representation, referred to herein as a data object representation, that comprises one or more of the following elements: standardized or customized layout, color scheme, typeface, and organization of elements of the data object representation, e.g., title, description, image/media, and optional commentary fields. For example, the data object representation can be displayed as a tile, board, icon, etc., and in a specific embodiment, the data object representation includes a standardized layout, including a title, item image and/or provider logo or trademark, optionally price, and commentary fields, such that in this specific embodiment, each data object representation on the system comprises the same standardized layout. Each data object representation is selectable in that a data object representation can be selected by a user of the system to view a more detailed visual representation of the promoter, event, event promoter, list, individual, category, interest, etc. including additional fields/information related to that promoter, event, event promoter, list, individual, category, interest, etc. Each data object representation is also selectable in that data object representations include one or more icons that a user can select to interact with a data object representation, e.g., following, liking, listing, conversing, friending, etc. Therefore, the data object representation is a portal for the user to access and interact with the data available in the data object (i.e., the database) related to the promoter, event, event promoter, list, individual, category, interest, etc., represented by that data object representation. As used herein, a user views and/or interacts with a data object representation.

In a preferred embodiment, each data object relating to an event or provider includes a commentary field that includes comments about that event or provider supplied by a consumer-user, one or more followers of that consumer-user of the system, as well as provider and/or event-promoter-users affiliated with that event or provider. Therefore, each data object displayed in a consumer-user's GUI or a provider GUI is customized by the system for that consumer-user or event promoter-user based on their profile settings and preferences, and includes comments provided by that consumer-user, an event promoter-user, followers of that consumer-user and/or event promoter-user, and/or those followed by that consumer-user and/or event promoter-user. The system is configured to preferentially display those data object representations that relate to a consumer-user's preferences e.g., data object representations that relate to an event, provider, or individual that a consumer-user follows on the system are displayed in the consumer-user's GUI (other data object representations relating to events, event promoters, or individuals not followed by the consumer-user are nevertheless visible on the system to the consumer-user, but the consumer-user's GUI is configured to automatically display data object representations in which the consumer-user has expressed a preference). An unrelated consumer-user of the system can modify a data object in which the first consumer-user has a preference but because the first consumer-user does not follow the unrelated consumer that modified data object is not displayed in the first consumer-user's GUI.

An event, as used herein, refers to a social occasion, activity, or gathering involving two or more individuals. An event can include but is not limited to a sporting competition, bout, contest, game, match, meet, tournament, performance, movie, television program, concert, benefit, fundraiser, ball, dance, celebration, party, symposium, ceremony, convention, happening, festival, media event, and/or corporate or business function. An event may feature an artist, group of artists, sports figure, team, etc. An event promoter is an individual, group, organization, or company in the business of producing, advertising, marketing and/or promoting events. An event promoter can also be an artist or group of artists (e.g., performing artists) who produces, advertises, markets, and/or promotes performances of that artist or group of artists or on behalf of that artist or group of artists.

A provider or user can provide "provider information" regarding an item or provider. In a specific embodiment, if the provider is an event promoter, a provider or user can provide "event promoter information" regarding an item or event promoter. Event promoter information includes general event promoter information and event information. General event promoter information includes information about the event promoter that is not specifically related to a distinct event, including but not limited to information related to one or more event promoter trademarks, one or more event promoter logos, one or more event logos, event promoter description, interest categories associated with an event promoter, event promoter media, event promoter ticket purchasing information, ticket retail information, event promoter promotional information, information related events within the event promoter portfolio, related event promoter description, related event promoter products, or combinations thereof. Event information pertains to a specific event, including but not limited to, information related to an artist, group of artists, sports figure, or team that will be featured at a specific event, information related to one or more event, artist, group, sports figure, or team trademarks, event description information, event media, event ticket purchasing information, retail information for products associated with the event, artist, group of artists, sports figure, or team, event promotional information and/or promotional products associated with an event, artist, group of artists, sports figure, or team, or combinations thereof.

A graphical user-interface ("GUI") is a type of user-interface that allows a user to interact with an electronic device using images and/or text commands. A GUI allows a user to manipulate graphical icons, visual indicators and/or text-based interfaces. Actions are performed by direct manipulation of graphical or text elements in the GUI. While certain embodiments described herein or components thereof are described by reference to a desktop interface, such descriptions are for illustrative purposes only. It will be understood by those skilled in the art that various adjustments can be made to the system and its components without departing from the spirit or scope of the invention. For example, the GUI and components thereof can be adjusted for use in any format depending on the amount of data that can be displayed per screen, e.g., a GUI in a desktop environment can display more data per screen than a GUI in a smart phone. While the appearance of a GUI may be adjusted because of the size limitations of the format (e.g., desktop vs. smart phone), the system functionality remains unchanged and it is within the skill of the ordinary artisan to adjust the GUI as needed for any individual computer format. Likewise, the elements of the GUI can be organized or displayed in any manner without departing from the spirit or scope of the invention. For example, the layout of individual elements or fields in the GUI can be adjusted, e.g., the relative position of search fields, data tables, data object representations, event, provider, or event promoter information, elements of a consumer-user and/or provider profile, etc. without altering the system functionality. And while the system is illustrated and described herein by reference to one or more GUI layouts, those embodiments are for illustrative purposes only and should not be construed as limitations on the scope of the invention.

A user can have a "preference" for an event, provider, event promoter, and/or another user (e.g., consumer-user and/or event promoter-user) represented by a data object representation on the system. A "preference" on the system expressed by one user for another user, an event-promoter-user, provider, or event promoter, is expressed by, e.g., "following" a data object representing that user, event-promoter-user, provider, or event promoter, which enables one user to track the system activities of another user, event-promoter-user, provider, or event promoter; "friending" e.g., one user requests to join another's group of contacts and the other user accepts or rejects that request, and if accepted, the first user is able to track the system activities of the other user; "liking" a data object representation signifying an event, event-promoter-user, provider, or event promoter, enables the user to indicate a predilection for that event, event-promoter-user, provider, or event promoter in a way that does not allow the user to track activities related to that event, event-promoter-user, provider, or event promoter; "listing" a data object representation signifying an event, event-promoter-user, provider, or event promoter, which allows the user to include that event, event-promoter-user, provider, or event promoter, or individual in one or more lists created by that user; "sharing" a data object representation signifying an event, event-promoter-user, provider, or event promoter, which allows the user to provide a link to that data object to a user, his/her followers, and/or one or more contacts of that user or his/her followers ("sharing" includes but is not limited to emailing a hyperlink to the data object representation, and/or posting a hyperlink to the data object representation on a social networking site, e.g., Facebook, Pinterest, and/or Twitter); "attending" or "not attending" a data object representation signifying an event, which allows the user to select a visual indication on the data object representation of his/her intention to attend or not attend an event represented by that data object representation, e.g., a selection made via an attendance or non-attendance icon in the data object representation; and/or "conversing" about a data object representing a user, event, or provider, which generates a conversation data object representation associated with a source data object and the user initiating the conversation and that conversation data object representation is visible to followers of the user initiating the conversation.

In a preferred embodiment, a user of the system expresses a preference for an event, event promoter, provider, event-promoter-user, or individual by following, listing, conversing, sharing, attending, not attending, or liking a data object representation signifying that event, event promoter, provider, event-promoter-user, or individual. In one particular embodiment of the system, if a first user follows or attends a data object representation signifying an event, individual, provider, event-promoter-user, or event promoter, the identity and one or more of the system activities of that first user with respect to that followed or attended data object representation are visible to other users of the system that follow that first user and/or those other users the first user follows. In particular, the followed or attended data object representation will be displayed in the first user's GUI and it may also be displayed in the GUI of followers of the first user and/or those followed by the first user. In addition, other users of the system that do not have a relationship with the first user can also view his/her followed or attended data object representations under his/her user profile on the system, but the followed or attended data object representations of the first user will only be displayed automatically on the GUI of those other users that follow the first user and/or those users that the first user follows. (Of course, the system can be adjusted to enable one or more additional interactions with a data object representation, e.g., listing, conversing, or liking, to be automatically displayed to other users of the system and/or the set of followers of a user on the system in the same way as the action of following a data object representation is automatically displayed.) With respect to one consumer-user expressing a preference for another consumer-user on the system, e.g., by following a data object representing that individual, such interactions on the system between one consumer-user and another can be likened to those individuals having a "relationship" and/or a connection on the system. The preferences described above can be expressed by a user and/or a provider on his/her own behalf or on behalf of a provider he/she is authorized to represent on the system.

One type of preference that can be expressed on the system is a "system tracking preference" i.e., an action taken by one user with respect to a data object representation signifying an event, event promoter, provider, event-promoter-user, consumer-user, etc. that enables the actor (i.e., the user expressing the preference) to track the identity and system activities associated with that data object. In a preferred embodiment, a user of the system expresses a preference for an event, event promoter, provider, event-promoter-user, or individual by following, listing, conversing, attending, or liking a data object representation signifying that event, event promoter, provider, event-promoter-user, or individual. If a first user or provider follows or attends a data object representation signifying an event, individual, event-promoter-user, provider, or event promoter, the acts of following or attending constitutes an expression of a system tracking preference that enables that first user to view and track the system activities of the other users, event promoter, event, provider, event-promoter-user, etc. in which he/she has expressed a system tracking preference. (Once again, the system can be adjusted to enable one or more additional interactions with a data object representation, e.g., listing, conversing, or liking, to constitute a "system tracking preference" that enables the actor to track the identity and system activities associated with that data object.)

As described above, a provider, event promoter, event-promoter-user, user, or consumer-user creates a data object related to an event, provider, or event promoter. In a specific embodiment, if another user follows that data object representation, indicates an intention to attend the event represented by that data object representation, or includes it in a list then the system can create a derivative data object specific for and visible to the follower (and his/her followers). The original data object representation (or source data object) can be, e.g., liked, listed, shared, attended, or followed by additional users of the system, but in this embodiment, the acts of following or attending (i.e., expressions of a system tracking preference) create a derivative data object and that derivative data object representation is visible to the follower and his/her followers. Likewise, if a provider elects to follow or attend a data object representation created by another provider or a user on the system, then the system can create a derivative data object specific for and visible to that provider and followers of that provider. (This is one example of a system configuration and the skilled artisan will readily appreciate that the system can be adjusted to expand the list of interactions that constitute system tracking preferences that generate derivative data objects.)

In an alternative embodiment of the system, if a user follows a data object representation then the system does not create a derivative data object as described above. Instead, the system generates an association between the user that followed the data object and that data object and that association is stored to a global tracking database. In this alternative embodiment, once a user follows a data object then the system displays the data object representation of that data object to the user and his/her followers.

Expressing a preference for a data object representation signifying an event, event promoter, provider, or another user, is one form of "interaction" a user can have with a data object (or a derivative data object) representation signifying an event, event promoter, provider, or another user on the system. An "interaction" with a data object representation, as used herein, includes but is not limited to, viewing a data object representation, expressing a preference for a data object representation, commenting on a data object representation, generating a conversation data object based on a source data object, participating in a dialog regarding a data object representation and/or a conversation data object representation, offering an opinion regarding a data object representation and/or a conversation data object representation, providing a rating for a data object representation, clicking through a data object representation to view additional details, clicking through a data object representation to view first provider-hosted information, participating in a survey regarding a data object representation, requesting further information from the provider regarding a data object representation, buying a ticket for an event displayed in a data object representation from a third-party retailer/reseller, buying a ticket for an event displayed in a data object representation directly from the first provider, buying a ticket for an event displayed in a data object representation from an individual, participating in an auction regarding a data object representation, offering a ticket for an event displayed in a data object representation for any value, requesting to purchase a ticket for an event displayed in a data object representation, requesting that a discontinued event displayed in a data object representation is re-introduced by the first provider, e.g., on an alternative or additional date or at an alternative or additional venue, requesting that an event is organized or scheduled by a provider, requesting that additional tickets, dates, and/or venues are added for an event, requesting a change of venue or date for an event, suggesting an alternate venue or data for an event, suggesting to the first provider product ideas, promotions, improvements, and/or corrections regarding an event represented by a data object representation, removing a data object representation from one or more lists ("de-listing"), sharing a data object representation with an individual or group, e.g., emailing the data object representation (or a hyperlink to the data object representation), including a hyperlink for that data object representation on a social networking system, etc., "un-liking" a data object representation, e.g., removing that data object representation from the list of liked data object representations in a consumer-user's profile, "un-friending", e.g., removing that data object representation from the list of "friends" in a consumer-user's profile, or combinations thereof.

It will be understood by the skilled artisan that the system described herein is not limited a method of managing and/or exchanging information about items or providers, but it can also be extended to a method of managing and/or exchanging any type of information, e.g., between a merchant and a customer, an event-planner and an attendee, a service provider and a customer, within a business entity between employees of that business, etc. In a specific embodiment, the system described herein relates to a method of exchanging information about events, event promoters, etc. In a particular embodiment, the set of information exchanged and/or managed on the system uniformly relates to events and/or event promoters, etc. While other social networking sites, e.g., Facebook, Twitter, etc., can include item or provider-related posts and/or comments, that is ancillary to the purpose of the sites, i.e., to encourage social interaction between users for any purpose. In contrast, the present system encourages social interaction between users and providers about events and/or event promoters, etc.

Customizable Data Management System

The invention provides a streamlined method of transferring data through the system to synthesize a dataset that is customized for a particular user of the system based on the user's preferences and relationships on the system. That customized dataset is displayed in the user's GUI. Likewise, the system synthesizes a customized dataset for each individual user and provider on the system and displays that unique customized dataset in the user's/provider's GUI. Because each user, provider, item, event, and data object on the system includes a unique identifier, each time a participant on the system (user or provider) expresses a preference for a data object representation, that action is uniquely associated in the system with the user (or provider) and one or more data objects, either the original data object and/or a derivative data object, depending on the type of preference expressed. If the user expresses a system tracking preference, a derivative data object is generated and uniquely associated with that user; the system then generates a subset of that user's followers and copies a reference to that data object into one or more sections, channels, or feeds of the follower's GUI so that the user's followers are apprised of the user's activity on the system. If, on the other hand, the user expresses a preference that does not constitute a system tracking preference, a derivative data object is not generated, but the user's preference for the original data object is recorded in the system and the system copies a reference to that original data object into one or more sections, channels, or feeds of the user's GUI.

In particular, each user, item, event, provider, event promoter, category, etc., is associated in the system with a data object and each data object, user, provider, category, and item on the system is associated in the system with a unique identifier (ID). Each data object (and derivative data object) includes a reference to the user identifier (ID) of the user that created it, as well as the provider ID associated with that data object, and all data objects (and derivative data objects) and the unique identifiers associated with them are stored in a collective data object database. In one embodiment, if user A chooses to follow data object X representation (i.e., the user expresses a system tracking preference for data object X representation), the system creates a derivative data object having identifier X'. The system then creates an association between user A, data object X, and data object X' and that association is stored in a global tracking database. Therefore, in this specific example, the association that is created includes the following data: user A, data object X, and data object X'. The system then surveys the global tracking database for the dataset of followers of user A on the system, e.g., users B, C, and D. If user A has no followers, derivative data object X' (i.e., a derivative data object X' representation) is displayed in one or more user A customized channels or feeds, e.g., those channels or feeds related to user A's recent activities on the system. If user A has a follower, e.g., user B, the system displays derivative data object X' representation in a user B customized channel or feed designed to display data object representations new to user B on the system; and likewise, if user A has additional followers, e.g., users C and D, the system displays derivative data object X' representation in a user C customized channel or feed and a user D customized channel or feed, respectively.

In an alternative embodiment, if user A chooses to follow data object X (i.e., the user expresses a system tracking preference for data object X), the system does not create a derivative data object, although the system creates an association between user A and data object X and that association is stored in a global tracking database. Therefore, in this specific alternative embodiment, the association that is created includes the following data: user A and data object X. The system then surveys the global tracking database for the dataset of followers of user A on the system, e.g., users B, C, and D. If user A has no followers, data object X representation is displayed in one or more user A customized channels or feeds, e.g., those channels or feeds related to user A's recent activities on the system. If user A has a follower, e.g., user B, the system displays data object X representation in a user B customized channel or feed designed to display data object representations new to user B on the system; and likewise, if user A has additional followers, e.g., users C and D, the system displays data object X representation in a user C customized channel or feed and a user D customized channel or feed, respectively.

As described above, the act of following or attending a data object representation constitutes a system tracking preference that creates an association between the follower and the data object and optionally, the system generates a derivative data object based on the followed data object. In one specific embodiment of the system, the act of liking a data object does not generate a system tracking preference although an association is created between the like data object representation and the user that liked that representation. Therefore, in this specific embodiment, if user A likes data object X representation, that preference is associated with data object X in the collective data object database and likewise, user A's preference for data object X is stored in user A's profile, but the system does not generate a derivative data object. An association between user A and data object X is created and stored to the global tracking database and/or an additional tracking database, which may be a component of the global tracking database or a separate database in the system. The system displays data object X representation in one or more of user A's GUI sections, channels, or feeds as well as one or more sections, channels, or feeds of user A's followers.

A further data transfer and management embodiment is provided in which the system generates a customizable section, channel or feed of data object representations not previously displayed to a user of the system in his/her customizable GUI. In this embodiment, if a user chooses to view his/her New Channel, the system retrieves a dataset of data objects previously displayed in the New Channel, queries the collective data object database for objects not previously displayed in the user's New Channel, generates a dataset of new data objects, deletes those data objects previously displayed or viewed on the system, and displays the new data object representations of the dataset in the New Channel. If no new data objects are available in the collective data object database, the system displays a message to the user via the GUI that the New Channel is empty. In one embodiment, the system can determine whether a data object representation has been viewed by a user, e.g., by detecting via JavaScript in the browser that the data object representation was displayed in the GUI and a message is sent to the server to instruct the system to remove the data object from the New Channel data table. When the New Channel is refreshed, that data object representation will no longer be displayed. Alternatively, the system may not detect actual "views" by a user in his/her browser, but instead, simply maintain an inventory of data objects that have been presented in the New Channel and once presented, the reference to that data object is deleted from the New Channel data table. In yet another alternative, the system can delete a reference to a data object within a selected time from first display in the New Channel, e.g., within one week, one month, three months, etc.

The system uses this method to create a variety of synthesized datasets that are customized for each user or provider on the system, depending on the type of information they would like to view on the system. For example, the invention provides a method of exchanging event promoter information on a system, wherein the system has (i) a plurality of consumer-users including a first consumer-user and one or more additional consumer-users, wherein optionally, the first and one or more additional consumer-users have a relationship on the system, and (ii) a plurality of event promoters including a first event promoter, the method comprising acts of:

Receiving first event promoter information;
Receiving first event promoter preference information indicating that the first consumer-user has expressed a preference for the first event promoter information;
Filtering the first event promoter information to create a subset of first event promoter information that is provided to the first consumer-user;
Displaying to the first consumer-user one or more data object representations relating to the subset of the first event promoter information;
Receiving one or more first consumer-user interactions with the one or more data object representations relating to the subset of first event promoter information;
Displaying to the first event promoter:
  Interaction data relating to the first event promoter and specific to one or more consumer-users;
  Interaction data related to the first event promoter aggregated for a plurality of consumer-users on the system;
  Comparative interaction data from a plurality of customer-users related to the first event promoter relative to a one or more other event promoters on the system; or
  Combinations thereof.

For example, the plurality of users of the system includes a plurality of consumer-users of the system, as well as event promoters that offer events on the system. The processor receives information indicating that a first consumer-user of the system has a preference for (i) an event offered by an event promoter on the system, and/or (ii) an event promoter offering one or more events on the system. The processor receives event and/or event promoter information relating to the commercial event and/or event promoter, and filters the event and/or event promoter information to create a subset of the event and/or event promoter information that is provided to consumer-users in which the first user has expressed a preference. The processor displays one or more data object representations relating to the subset to the first user in the GUI. The processor also receives information related to interactions the first consumer-user has with the subset of data object representations displayed to the first consumer-user, e.g., viewing the data object representation, purchasing tickets to an event depicted in a data object representation, comments to a data object representation, liking, attending, or following a data object representation, initiating a conversation regarding a data object representation and thereby generating a conversation data object regarding a source data object, etc., and the system displays to the first event promoter, interaction data related to the plurality of consumer-users having a preference for the first event promoter. The system also displays to the first event promoter interaction data related to the first event promoter aggregated for a plurality of consumer-users on the system, as well as comparative interaction data from the plurality of users of the system related to the first event promoter relative to other event promoters on the system.

When the system includes a plurality of event promoters, the method also includes the following steps: receiving additional event promoter information from a plurality of event promoters; receiving additional event promoter preference information indicating that the first consumer-user has expressed a preference for an additional subset of the additional event promoter information; filtering the first event promoter information and the additional event promoter information to create one or more supplemental subsets of additional event promoter information that is provided to the first consumer-user; displaying to the first consumer-user one or more data object representations relating to the one or more supplemental subsets of additional event promoter information; receiving one or more first consumer-user interactions with the one or more data object representations relating to the one or more supplemental subsets of additional event promoter information; and displaying to each of the additional event promoters: (i) interaction data relating to the one or more additional event promoters and specific to the one or more consumer-users expressing a preference for the one or more additional event promoter information; (ii) interaction data related to the one or more additional event promoters aggregated for a plurality of consumer-users on the system; (iii) comparative interaction data from a plurality of customer-users related to the one or more additional event promoters relative to a one or more other event promoters on the system; or (iv) combinations thereof.

In an additional embodiment, the invention provides a computer system comprising: a plurality of user devices each having a display interface available to a user; a plurality of event providers; a global database of data objects, each data object comprising a unique object identifier of that object and a user, event, or provider identifier of a user, item or provider to which that object relates, the data objects including a user association data object comprising a target user identifier of a target user and a follower user identifier of a user following the target user, wherein the global database is configured responsive to the target user expressing a tracking interest in a data object representation by instigating a tracking instruction at their user device to create an association between the target user identifier and the data object representation; a global tracking database configured responsive to the target user expressing the tracking interest in the data object to store the association; and an information exchange computer configured, responsive to the target user expressing the tracking interest in the data object to access the global database and the global tracking database and to display the data object representation to the follower user via the display interface of their user device.

In this additional embodiment, the invention therefore provides a computer implemented method of selecting data objects for interaction with a user at a graphical user interface, the method comprising: receiving a data stream from an event provider, the data stream identifying events available from the event provider; storing a data object in a global database with a provider identifier uniquely identifying the item provider; storing for each event in the data stream a data object with an event identifier uniquely identifying the event; detecting a user interaction at a graphical user interface of a user device, the interaction with an event or event provider data object representation, and associating the data object with a user identifier uniquely identifying the user; storing in a tracking database the association between the data object and the user identifier; and using the tracking database to select a customized data set of data objects based on the associations in the tracking database, the customized data set being for presentation at the graphical user interface.

Still further, the invention includes a computer system comprising: a plurality of user devices each having a display interface available to a user; a plurality of event providers; a global database of data objects, each data object comprising a unique object identifier of that object and a user, event, or provider identifier of a user, event or provider to which that object relates, the data objects including a user association data object comprising a target user identifier of a target user and a follower user identifier of a user following the target user, wherein the global database is configured responsive to the target user initiating a conversation regarding a data object representation by instigating a conversation instruction at their user device to create a new conversation data object based on that data object; a global tracking database configured responsive to the target user initiating the conversation regarding the data object representation to store an association between the user identifier of the target user, the object identifier of that data object, and the object identifier of the created conversation data object; and an information exchange computer configured, responsive to the target user initiating the conversation regarding the data object representation to access the global database and the global tracking database and to display the conversation data object representation to the follower user via the display interface of their user device.

In this embodiment, the invention provides a computer implemented method of selecting data objects for interaction with a user at a graphical user interface, the method comprising: receiving a data stream from an event provider, the data stream identifying event available from the item provider; storing a data object in a global database with a provider identifier uniquely identifying the event provider;

storing for each event in the data stream a data object with an event identifier uniquely identifying the event; detecting a user interaction at a graphical user interface of a user device, the interaction with an item or event provider data object representation and comprising initiating a conversation regarding the data object representation, and creating a conversation data object with a conversation identifier uniquely identifying the user and the event or event provider represented by the data object representation; creating in a tracking database an association between the conversation data object, the user and the event and/or event provider data object; and using the tracking database to select a customized data set of data objects based on the associations in the tracking database, the customized data set being for presentation at the graphical user interface.

In a specific embodiment, the invention provides a method of exchanging event promoter information on a system as described above, wherein the system displays to the first consumer-user event promoter information not previously displayed to a consumer-user on the system. In a preferred embodiment, the system preferentially displays the event promoter information not previously displayed to the consumer-user relative to other event promoter information the system previously displayed to that consumer-user, thereby identifying those data object representations not previously displayed to the consumer-user. In another embodiment, the system displays to a consumer-user event promoter information not displayed to a consumer-user within a defined time frame, e.g., one year, 6 months, 3 months, 1 month, etc. In this regard, the system displays one or more data object representations related to new events, event promoters, etc. that the consumer-user has not seen on the system, i.e., that subset of event promoter information on the system in which the consumer-user has expressed a preference that is new to that consumer-user. Therefore, the consumer-user GUI displays a subset of information related to events and/or event promoters not previously displayed to the consumer-user by the system. For example, the new event promoter or event information may include but is not limited to, a new event offered by an event promoter, a new event or event promoter in an interest category preferred by the consumer-user and for a new event promoter, products offered by that new event promoter, new description information related to an event or event promoter, new purchasing information related to an event or event promoter, a promotion related to that event or event promoter, an image, video, or another graphic related to an event or event promoter not previously displayed to the consumer-user, a new review for that event or event promoter, new events or event promoters associated with an event or event promoter or that may be used with that event or event promoter (and vice versa), new comments about that event or event promoter made by followers of the user, etc.

Moreover, if a consumer-user expresses a system tracking preference for event promoter information, the system filters that event promoter's information to create a first supplemental subset of event promoter information that is provided to that consumer-user and his/her followers and displays one or more derivative data object representations that relate to that first supplemental subset of event promoter information. Likewise, if an additional consumer-user of the system expresses a system tracking preference for a first consumer-user, the system filters the first event promoter information in which the first consumer-user has expressed a preference to create a second supplemental subset of first event promoter information and displays one or more data object representations and/or derivative data object representations relating to that second supplemental subset to the additional consumer-user. Moreover, if an event promoter-user of the system expresses a system tracking preference for a first consumer-user, the system filters the first event promoter information in which the first consumer-user has expressed a preference to create a third supplemental subset of first event promoter information and displays one or more data object representations and/or derivative data object representations relating to that third supplemental subset to the event promoter-user.

In a further embodiment, the invention includes a method of exchanging information on a system having a plurality of consumer-users including a first consumer-user, the method comprising acts of (a) receiving information indicating that a first consumer-user has a preference for an event and/or event promoter; (b) receiving event and/or event promoter information, provided by at least some of the plurality of consumer-users and/or the event promoter relating to the commercial event and/or event promoter; (c) filtering the event and/or event promoter information to create a subset of the event and/or event promoter information that is provided to the consumer-user; and (d) displaying to the first consumer user one or more data object representations relating to the subset of the event and/or event promoter information.

The invention also includes a method of exchanging information on a system between a first event promoter and a first consumer-user, the system comprising (a) a plurality of consumer-users including the first consumer-user, and (b) a plurality of event promoters including the first event promoter, wherein the system is configured to receive, filter, and/or display information related to the first consumer-user, the first event promoter, the plurality of consumer-users, the plurality of event promoters, an event, interaction data, comparative interaction data and combinations thereof; the method comprising acts of (a) viewing, by the first event promoter, interaction data related to the plurality of consumer-users expressing a preference for first event promoter information; and (b) providing additional first event promoter information responsive to the first event promoter interaction data. The method can also include viewing, by the first event promoter, event promoter comparative interaction data for the first event promoter relative to the plurality of event promoters on the system and/or a subset of the plurality of event promoters on the system; and providing additional first event promoter information responsive to the first event promoter interaction data and/or the first event promoter comparative interaction data.

In addition, also provided is a method of exchanging information on a system between a first event promoter and a first consumer-user, the system comprising (a) a plurality of consumer-users including the first consumer-user, and (b) a plurality of event promoters including the first event promoter, wherein the system is configured to receive, filter, and/or display information related to the first consumer-user, the first event promoter, the plurality of consumer-users, the plurality of event promoters, an event, interaction data, comparative interaction data and combinations thereof; the method comprising acts of: (a) viewing, by the first consumer-user, first event promoter information relating to (i) the general first event promoter information and/or the first event promoter commercial event; (ii) expressing a preference for (i) the general first event promoter information and/or the first event promoter commercial event; and (iii) viewing, by the first consumer-user, a subset of first event promoter information that is provided by the system to the first consumer-user.

Moreover, also included is a method of exchanging information on a system between a first consumer-user and one or more additional consumer-users, the system comprising (a) a plurality of consumer-users including the first consumer-user and the one or more additional consumer-users, wherein the first and one or more additional consumer-users are connected in the system, and (b) a plurality of event promoters including the first event promoter, wherein the system is configured to receive, filter, and/or display information related to the first consumer-user, the first event promoter, the plurality of consumer-users, the plurality of event promoters, an event, interaction data, comparative interaction data and combinations thereof; the method comprising acts of: (a) viewing, by the first consumer-user, a subset of first event promoter information that is provided by the system to the first consumer-user and optionally one or more additional consumer-users; and (b) viewing, by the first consumer-user, an interaction with the subset of first event promoter information comprising: (i) a preference for one or more members of the subset of first event promoter information, wherein the preference is expressed by the first consumer-user and/or the one or more additional consumer-users; (ii) a comment regarding one or more members of the subset of first event promoter information, wherein the comment is provided by the first consumer-user and/or the one or more additional consumer-users; or (iii) combinations thereof. Also contemplated in this method is (c) interacting, by the first consumer-user, with the subset of first event promoter information, e.g., expressing an additional preference for a data object representation within the subset, responding to a comment provided by another consumer-user, etc.

As shown in FIG. 1(a), the event promotional system includes a collective consumer data table (101), a collective event promoter data table (102), a processor (103), an interface (104), and a set of filtering and analysis programs (105). The collective consumer data table stores all information about the plurality of consumer-users that participate on the system and likewise, the collective event promoter data table stores all information about the plurality of event promoters that participate on the system. The collective consumer data table comprises one or more sets of consumer data, one of which is depicted in FIG. 1(a) as individual consumer data table (106). For each consumer-user with a profile on the system, there is a corresponding consumer data table or individual consumer data table stored within the collective consumer data table. Each individual consumer data table comprises one or more additional data tables, including but not limited to a consumer profile (107) and event preferences (108), a contact, follower, and/or following data table (109), and an interest data table (110). The event preferences can also include one or more event promoter and/or event lists created by the consumer-user (not shown), which may be used by the consumer-user to group event promoters and/or events in a consumer-user created ontology.

The collective event promoter data table comprises one or more event promoter data, one of which is depicted in FIG. 1(a) as individual event promoter data (111). For each event promoter that participates on the system, there is a corresponding event promoter data table or individual event promoter data table stored within the collective event promoter data table. Each individual event promoter data comprises one or more additional data tables, including but not limited to an event system including a list of all events of the event promoter offered on the system (112), a contact, follower, and/or following data table (113) including a list of all consumer-users on the system that have expressed a preference for that event promoter or an event offered by that event promoter on the system, and an interest data table (114), including those interest categories that are relevant to the events offered by the event promoter. In an optional embodiment, the collective event promoter data table includes a system ontology comprising event and event promoter categories, wherein event promoter information is organized within one or more event promoter data tables in accordance with the system ontology.

The processor (103) includes a filtering program configured to filter the collective event promoter data table based on the consumer's preferences, e.g., event and/or event promoter preferences. In other words, the processor filters the event and/or event promoter information in the collective event promoter data table and the collective consumer data table to create a subset of the event and/or event promoter information that relates only to those events and/or event promoters in which a first user has expressed a preference. For example, if a first user identified an interest in event X, the system uses that information to filter the collective event promoter data table for information related to event X, generating a consumer-customized data table that includes information related to event X. The system also filters the collective consumer data table for one or more users from among the plurality of users on the system followed by the first user that have provided event and/or event promoter information about event X. Therefore, the GUI for that consumer-user displays a selected subset of information related to event X to that consumer, e.g., an event X data object representation that includes a description of event X, purchasing information, an image, video, or another graphic of event X, reviews for event X, sales or promotional information associated with event X, events related to event X, events used in connection with event X, and as described in more details below, comments about event X made by followers of the user (derivative data objects representation related to event X).

In one embodiment, the filtering program provides a method of organizing the collective event data table based on the consumer's preferences, e.g., event and/or event-provider preferences. In other words, the processor filters the event and/or event-provider information in the collective event data table and the collective consumer data table to create a subset of the event and/or event-provider information that relates only to those event and/or event-providers in which a first user has expressed a preference and the system displays that subset to the consumer-user in a section or portion of the GUI dedicated to one or more of the consumer-user's preferences. For example, if a first user identified an interest in event X, the system uses that information to filter the collective event data table for information related to event X, generating a consumer-customized data table that includes information related to event X. The system also filters the collective consumer data table for one or more users from among the plurality of users on the system followed by the first user that have provided event and/or event-provider information about item X. Therefore, the GUI for that consumer-user displays a selected subset of information related to event X to that consumer, e.g., an event X data object representation that includes a description of event X, purchasing information, an image, video, or another graphic associated with event X, reviews for event X, sales or promotional information associated with event X, items related to event X, items used in connection with event X, additional events associated with event X, and as described in more details below, comments about event X made by followers of the user (derivative data object representations related to event X).

The GUI for that consumer-user can display the selected subset of information in any suitable format. In one embodiment, the GUI displays the selected subset of information in a channel or feed which is organized according to a consumer-user's preferences and the consumer-user can navigate between channels in the GUI. The system can include a set of defined channels or feeds and/or the consumer-user can customize one or more channels or feeds based on his/her preferences. The set of predefined channels or feeds can include, but is not limited to, popular data object representations (e.g., data object representations that have received or been the subject of high system activity in a given time period), promotional data object representations (e.g., promotions or deals are offered by an event and/or event-provider in relation to the data object representations in the channel or feed; "Deals Channel"), new data object representations (e.g., data object representations that have not been viewed by the consumer-user on the system, as described herein), all data object representations, and/or all event data object representations. Moreover, the set of predefined channels or feeds can further include a set of channels or feeds that are consumer-user specific, e.g., new data object representations to that consumer-user, event data object representations for which that consumer-user has expressed a preference (e.g., "My Events Channel"), one or more collections of lists of data object representations of that consumer-user (e.g., "My Lists Channel"), one or more collections of friends, followers, etc. associated with that consumer-user on the system (e.g., "My People Channel"), liked data object representations (e.g., "My Likes"), individuals, events and/or event-providers that follow that consumer-user (e.g., "Following Me Channel" and subchannels within can include "People Following Me" and/or "Events Following Me"), data object representations the consumer-user has acted upon and/or interacted with in the system (e.g., "My Activity Channel"), and/or data object representations the consumer-user has followed, liked, or otherwise expressed a preference for in the system (e.g., "My Following Activity," "My Liked Activity," etc.). Still further, the consumer-user can also define one or more customized channels or feeds based on criteria selected by that consumer-user. For example, the consumer-user can define a channel for data object representations related to his/her interests, e.g., golf, running, classical music, opera, etc., such that the channel would organize data object representations for which the consumer-user has defined a preference that are related to that interest (e.g., "My Golf Channel"). Still further, the consumer-user can define a channel for specific type of events, e.g., concerts, sporting events, theatrical events, fundraising events, etc., such that the channel would organize data object representations for which the consumer-user has defined a preference that are related to that type of event (e.g., "My Concert Channel," "My Sports Channel," "My Charity Channel," etc.). Therefore, the GUI displays a plurality of channels or feeds in the consumer-user's GUI, including predefined and/or customized channels or feeds, wherein the content of each channel or feed is based on each individual consumer-user's preferences on the system. Each channel or feed is individually selectable.

Still further, the system includes an interface (104) which enables a consumer-user to interact with the system and his/her profile and preferences. The consumer-GUI allows the consumer to search, browse, and view event and event promoter listings on the system, and as described in more detail below, individual event data object representations, event promoter data object representations, etc., unfiltered and/or filtered by the system based on a consumer-user's preferences. Moreover, the consumer-GUI enables the consumer to modify or edit his/her profile and preferences on the system. Likewise, the interface also includes an event promoter GUI configured to enable interaction of an event promoter representative ("event promoter-user") with event promoter information and/or interaction data generated by the system for the event promoter. The consumer- and event promoter-interfaces are described in more detail below.

Figure 1B:
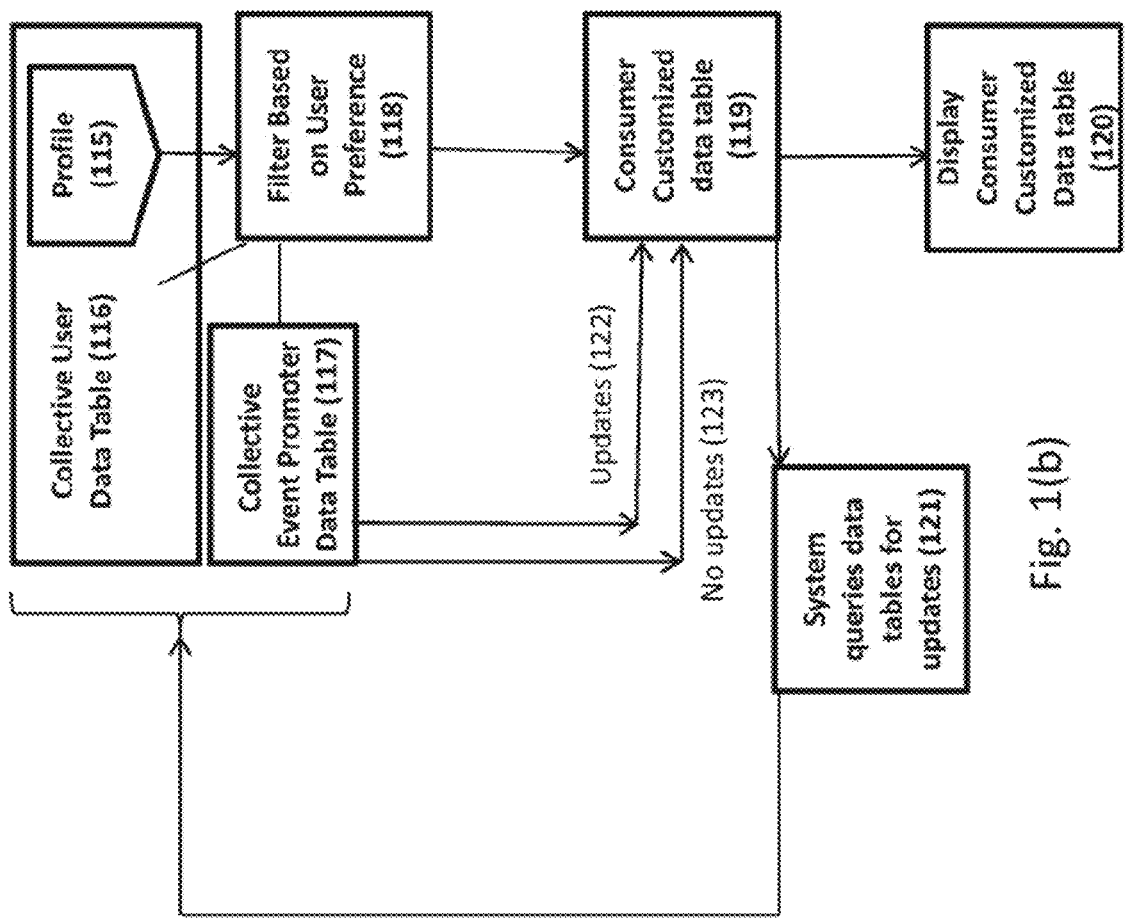
FIGS. 1(b)-(f) are schematic illustrations of the flow of data in the system from one or more system components to another.

Use of the system is illustrated schematically in FIG. 1(b). A consumer-user creates a profile on the system (115) (the profile set-up process is described in more detail below). The profile is a component of the individual user data table (not shown in FIG. 1(b)), which is a component of the collective user data table (116). The system filters the collective user data table and the collective event promoter data table (117) based on the preferences and interests identified in the profile (118). A consumer customized data table is created by this filtering process (119) and the results are displayed in the consumer GUI (120). The system periodically queries the collective user data table, collective event promoter data table, and the consumer profile for updates (121), e.g., each time a consumer-user logs into the system, and once on the system, the processor is programmed to refresh the data displayed in the consumer GUI in real time or on a periodic basis, e.g., every minute, 5 minutes, 10 minutes, 30 minutes, 1 hour, etc. If there are one or more updates since the last query, the consumer customized data table is updated (122) and if there are no updates, the consumer customized data table is not updated (123).

Figure 1C:
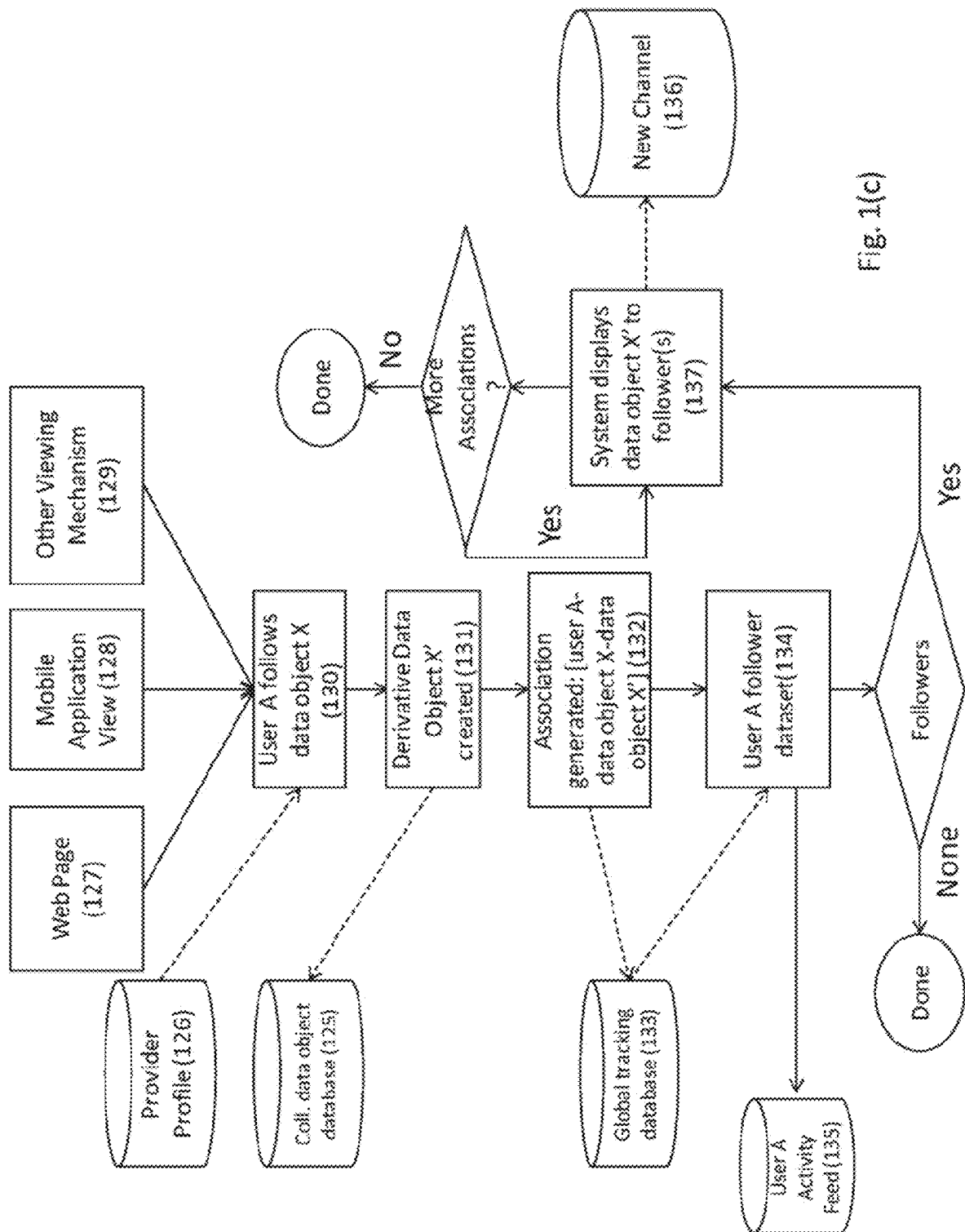

One embodiment of data transfer and management on the system is illustrated schematically in FIG. 1(c). Each data object, user, provider, event, event promoter, and category on the system is associated in the system with a unique identifier (ID) and as described above in reference to FIG. 1(a), each provider is associated in the system with an individual provider data table (124). Moreover, each user, event, event promoter, provider, brand, etc., is associated in the system with a data object and each data object is stored in a collective data object database (125) on the system (a component of element (105) in FIG. 1(a)). As described above, each provider is associated in the system with a provider profile (126). Each data object includes a reference to the user identifier (ID) of the user (or provider) who created it, as well as the unique ID of the user, provider, event, event promoter, category, etc. referenced in that data object. Therefore, for example, a user having user identifier A, referred to below as user A, accesses the system via a web page (127), mobile application view (128), or other viewing mechanism (129), and for example, chooses to follow a provider data object representation having identifier X, and the system then creates a derivative data object having identifier X' (131). In this example, data object X is a source data object and derivative data object X' is a derivative of source data object X. Derivative data object X' is stored in the collective data object database. The system then creates an association between user A, data object X, and data object X' (132) and that association is stored in a global tracking database (133) (also a component of element (105) in FIG. 1(a)). Therefore, in this specific example, the association that is created includes the following data: user A, data object X, and data object X'. The system then surveys the global tracking database for the dataset of followers of user A on the system, i.e., users B, C, and D (134). If user A has no followers, derivative data object X' representation is displayed in one or more user A customized sections, channels or feeds, e.g., a section, channel and/or feed related to recent user A activities on the system (135). If user A has a follower, e.g., user B, the system displays derivative data object X' representation in a user B customized section, channel or feed (136) designed to display data object representations new to user B on the system (137); and likewise, if user A has additional followers, e.g., users C and D, the system displays derivative data object X' representation in a user C customized channel or feed and a user D customized channel or feed, respectively. If an additional association is added to the global tracking database related to user A and/or data object X', the system identifies those additional associations global tracking database (138) and displays any updates to the dataset of additional associations in the New Channel.

The data transfer and management system illustrated in FIG. 1(c) is analogous to the embodiment in which a first user indicates that he/she will attend an event. As described above, when a user indicates that he/she will attend/not attend an event represented by a data object representation, that action constitutes a system tracking preference and in response, the system generates a derivative data object that reflects the first user's preference. Therefore, if user A, accesses the system via a web page (127), mobile application view (128), or other viewing mechanism (129), and for example, chooses to attend an event data object representation having identifier Y, the system then creates a derivative data object having identifier Y'. Derivative data object Y' is stored in the collective data object database. The system then creates an association between user A, data object Y, and data object Y' and that association is stored in the global tracking database. Therefore, in this specific example, the association that is created includes the following data: user A, data object Y, and data object Y'. The system then surveys the global tracking database for the dataset of followers of user A on the system, i.e., users B, C, and D (134). If user A has no followers, derivative data object Y' representation is displayed in one or more user A customized sections, channels or feeds, e.g., a section, channel and/or feed related to recent user A activities on the system. If user A has a follower, e.g., user B, the system displays derivative data object Y' in a user B customized section, channel or feed designed to display data object representations new to user B on the system; and likewise, if user A has additional followers, e.g., users C and D, the system displays derivative data object Y' representation in a user C customized channel or feed and a user D customized channel or feed, respectively. If an additional association is added to the global tracking database related to user A and/or data object Y', the system identifies those additional associations global tracking database and displays any updates to the dataset of additional associations in the New Channel.

Figure 1D:
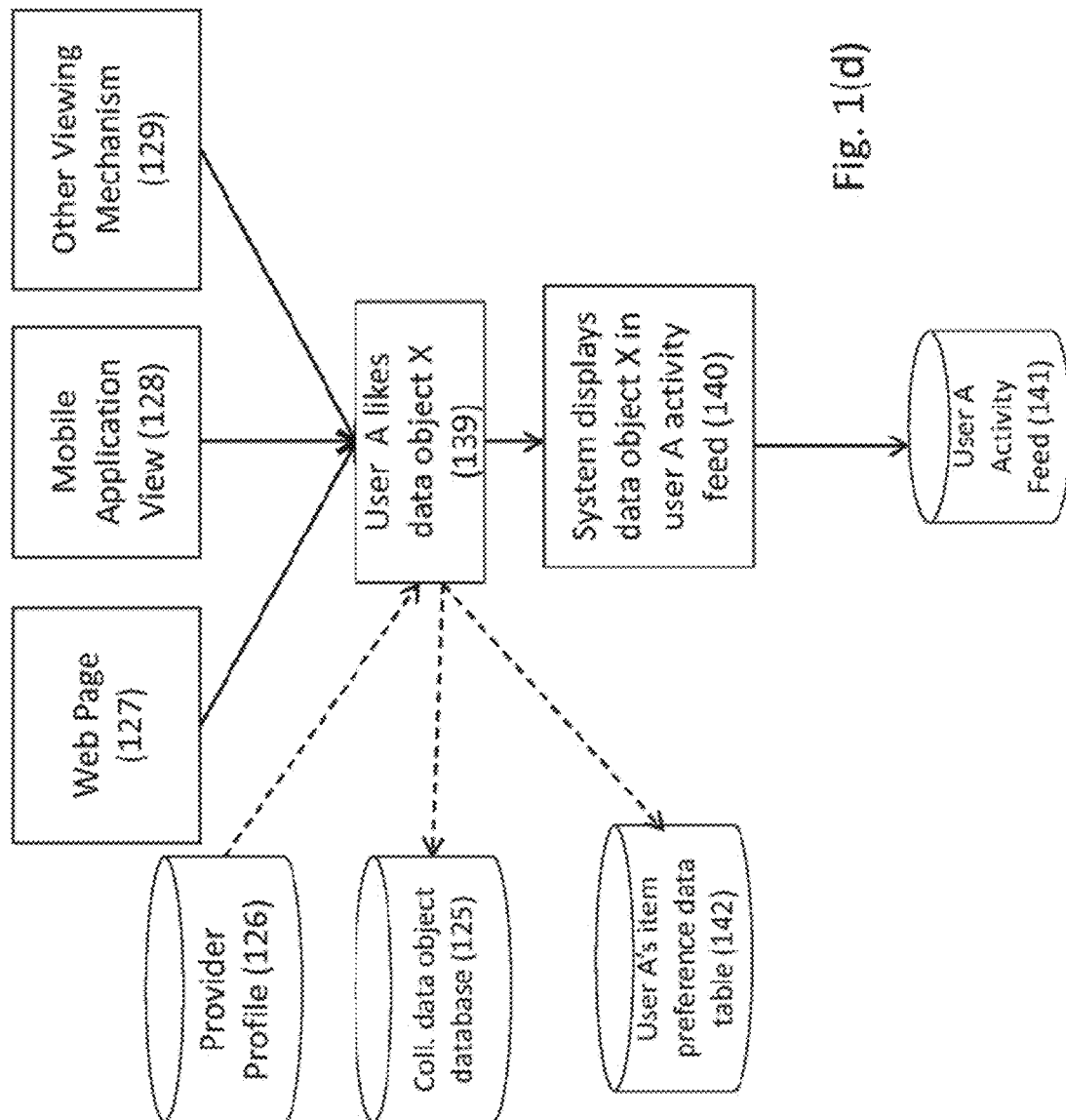

An additional embodiment is depicted in FIG. 1(d) in which user A likes data object X representation. As described above, in one specific embodiment of the system, the act of following a data object representation constitutes a system tracking preference that generates a derivative data object based on the followed data object, whereas liking a data object representation does not generate a system tracking preference. Therefore, as shown in FIG. 1(d), if user A likes data object X representation, that preference is associated with data object X in the collective data object database and likewise, user A's preference for data object X is stored in user A's profile (under the item preferences data table (142)), but the system does not generate a derivative data object. An association between user A and data object X is created and stored to the global tracking database and/or an additional tracking database, which may be a component of the global tracking database or a separate database in the system. The system displays data object X representation (140) in one or more of user A's GUI sections, channels, or feeds (141) as well as one or more sections, channels, or feeds of user A's followers.

Figure 1E:
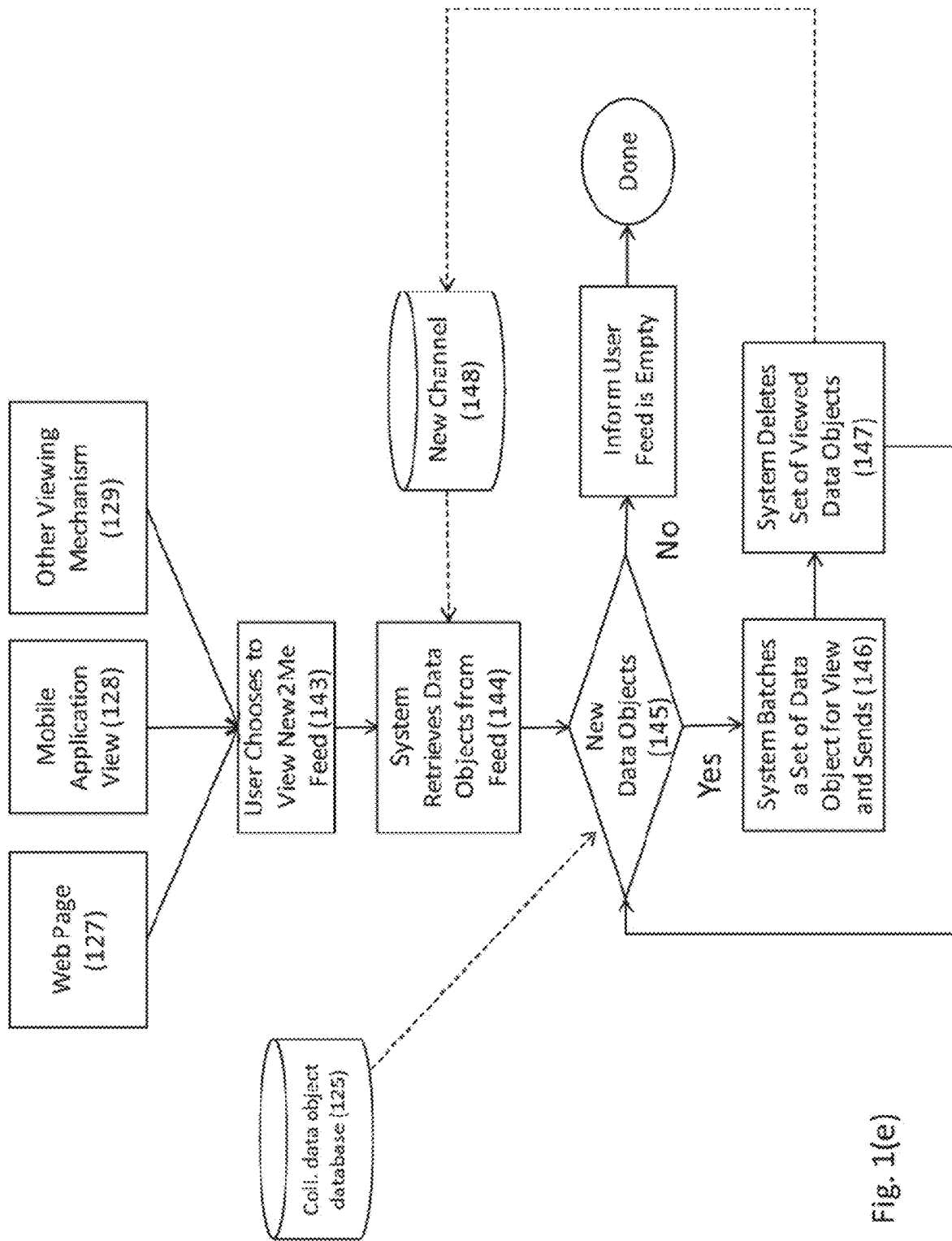

A further data transfer and management embodiment is illustrated schematically in FIG. 1(e). If a user interfaces with the system via a web page, mobile application, or other viewing mechanism and chooses to view his/her New Channel (143), the system retrieves a dataset of data object representations previously displayed in the New Channel (144), queries the collective data object database for objects not previously displayed in the user's New Channel (145), generates a dataset of new data objects (146), deletes those data objects previously displayed or viewed on the system (147), and displays the dataset of new data object representations in the New Channel (148). If no new data objects are available in the collective data object database, the system displays a message to the user via the GUI that the New Channel is empty (149). In one embodiment, the system can determine whether a data object representation has been viewed by a user, e.g., by detecting via JavaScript in the browser that the data object was displayed in the GUI and a message is sent to the server to instruct the system to remove the data object from the New Channel data table. When the New Channel is refreshed, that data object representation will no longer be displayed. Alternatively, the system may not detect actual "views" by a user in his/her browser, but instead, simply maintain an inventory of data objects that have been presented in the New Channel and once presented, the reference to that data object is deleted from the New Channel data table. In yet another alternative, the system can delete a reference to a data object within a selected time from first display in the New Channel, e.g., within one week, one month, three months, etc.

Figure 1F:
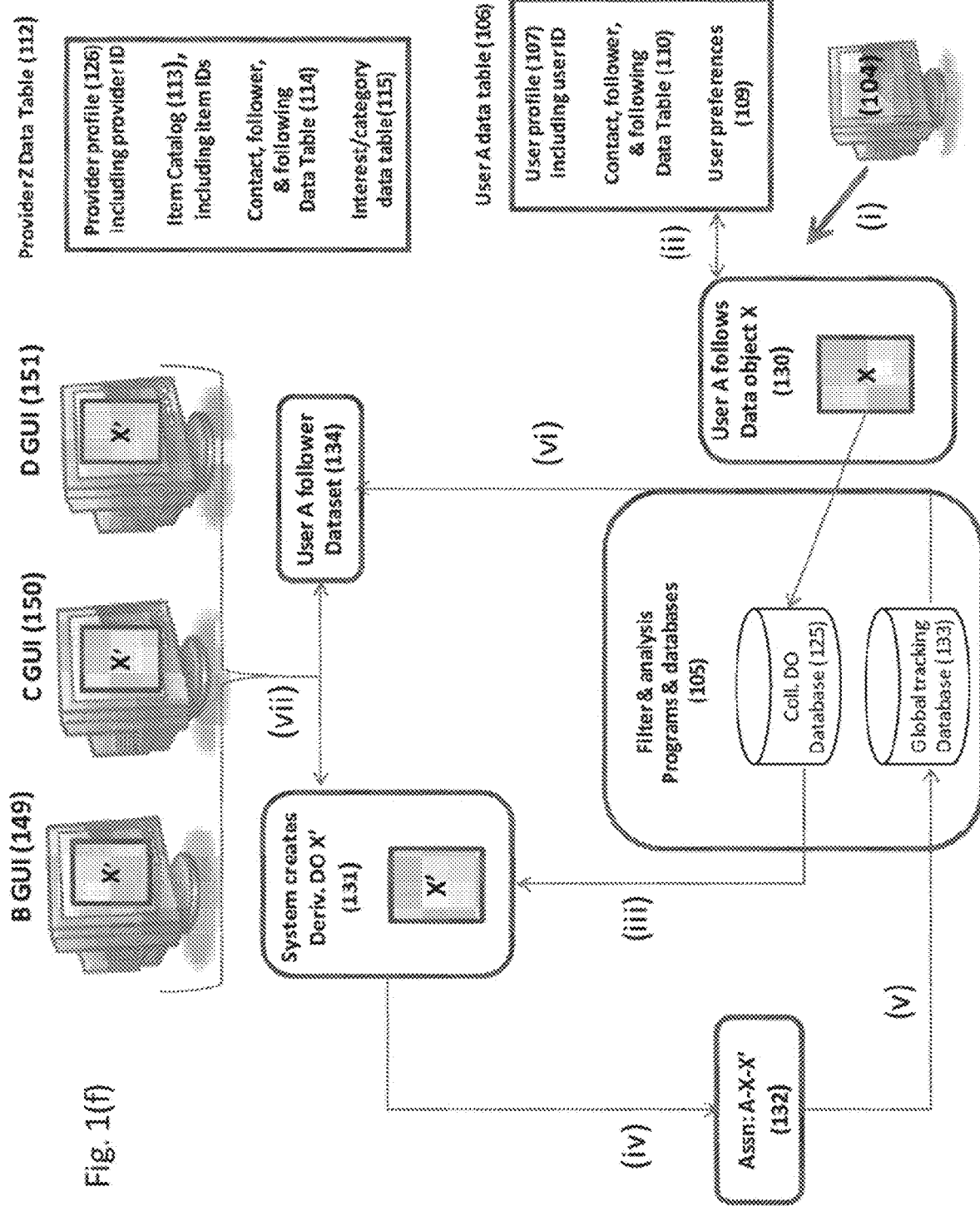
Figure 1H:
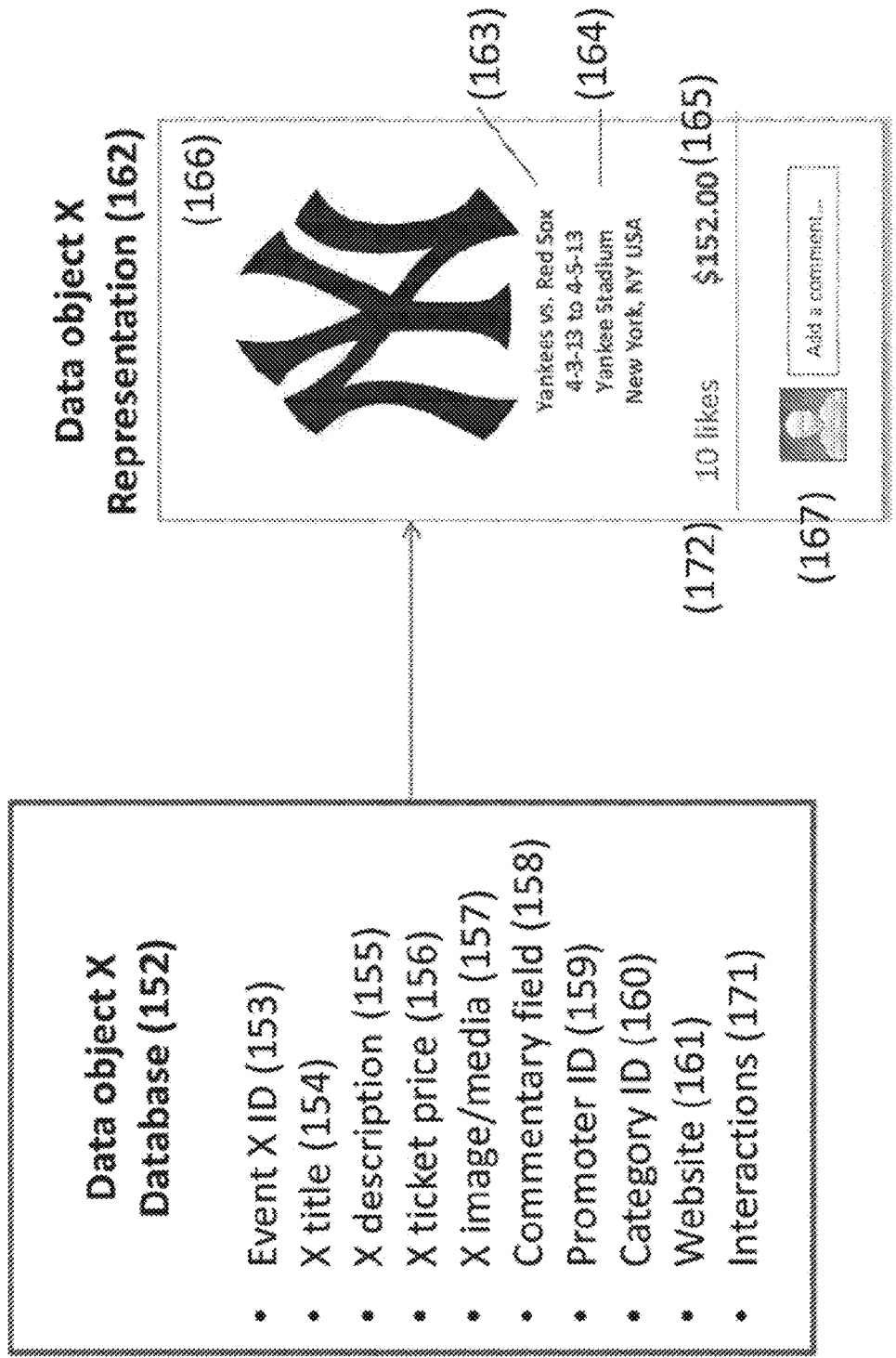
FIG. 1(h) is an illustration of a data object and the types of data stored within the data object database and the data object representation generated by the system.

A further illustration of one embodiment of data transfer and management on the system is illustrated schematically in FIG. 1(f). User A (i) interfaces with the system on his GUI (104) and choses to follow data object X representation (130), a data object created by provider Z. As described above, provider Z is represented by a data table (112), which includes a profile (126) including provider Z's ID, provider Z's item catalog (113) (and each item in that catalog has a unique item ID), a contact, follower, and following data table (114), and an interest and/or category data table (115) which includes the interest and/or category IDs for each interest and/or category, as well as the unique item IDs for each product in an interest and/or category of provider Z. When user A choses to follow data object X representation, that preference is (ii) stored in user A's data table (106), which includes his user profile (107), including his user ID, his contact, follower, and following data table (110), and user A's preferences (109). Data object X, stored in the collective data object database (125) is used by the system's filtering and analysis programs (105) to (iii) generate a derivative data object having identifier X' (131). Derivative data object X' is also stored in the collective data object database. The system then (iv) creates an association between user A, data object X, and data object X' (132) and that association is (v) stored in a global tracking database (133) (also a component of element (105)). The system then surveys the global tracking database to (vi) generate the dataset of followers of user A on the system, i.e., users B, C, and D (134). The system (vii) displays derivative data object X' representation to the followers of user A, e.g., users B, C, and C in a B, C, and D customized section, channel or feed (149, 150, and 151, respectively) designed to display data object representations new to users B, C, and D, respectively, on the system.

As illustrated in FIGS. 1(*c*)-(*f*), the global tracking database provides a simple organizational structure that allows the system to identify relationships between data objects, users, providers, categories, etc. It allows the system to track an evolving network of relationships between data objects, users, providers, categories, etc. For example, as illustrated in FIG. 1(*g*), and in the examples described above, an association is created between user A, data object X, and derivative data object X' (132). The system then queries the global tracking database for followers/followees of user A and identifies the dataset of followers/followees of user A, users B, C, and D (168), associates the followers/followees of user A with the A-X-X' association (169), and then associates the followers/followees of user A, users B, C, and D, with derivative data object X' (170). This iterative process is used continuously as new associations are added to the global tracking database.

An example of a data object and the accompanying data object representation is illustrated in FIG. 1(*h*). Data object X is a database (152), that includes an event ID (153), a title (154), event description (155), optionally, a ticket price (156), optionally, an image and/or media (157), a commentary field (158), the event promoter ID (159), optionally, a category ID for the category associated with the event (160), and optionally, a hyperlink to a website (161), e.g., an event website, a provider website, a reseller/distributor website, etc., and one or more interactions (or interaction data) (171) one or more users and/or providers on the system have had with that data object. As described above, the one or more interactions can include but are not limited to: viewing the data object representation, expressing a preference for the data object representation, commenting on the data object representation, initiating a conversation regarding the data object representation and thereby creating a conversation data object representation, participating in a dialog regarding the data object representation, indicating attendance/non-attendance to an event represented by that data object representation, offering an opinion regarding the data object representation, providing a rating for the data object representation, clicking through the data object representation to view additional details, clicking through the data object representation to view first promoter-hosted information, clicking through the data object representation to purchase a ticket to the event represented by that data object representation and/or clicking through the data object representation to purchase one or more items, e.g., promotional items, associated with the event represented by that data object representation, participating in a survey regarding the data object representation, requesting further information from a promoter regarding the data object representation, buying a ticket to an event displayed in the data object representation from a third-party retailer/reseller, buying a ticket to an event displayed in the data object representation directly from the promoter, buying a ticket to an event displayed in the data object representation from an individual, participating in an auction regarding the data object representation, offering a ticket to an event displayed in the data object representation, requesting to purchase a ticket to an event displayed in the data object representation, or combinations thereof.

The system extracts the data contained in the data object to generate a data object X representation (162), including a title (163), item description (164), a price (165), an image and/or media (166), a commentary field (167), and optionally, a hyperlink to a website, e.g., an event website, a provider website, a reseller/distributor website, etc. (not shown), and one or more interactions with the data object representation (172). The data object representation can include less than the full dataset contained in the database, e.g., omitting a visual representation of the event ID, promoter ID, and category ID.

As described herein in reference to FIG. 1(*h*), each data object includes interaction data for that data object. The system also includes a global interaction data database that stores all interaction data for each data object in the collective data object database. The global interaction data database can be a subcomponent of the global tracking database or a separate database maintained on the system. The system uses the interaction data stored in the global interaction data database to generated marketing data for providers that participate on the system, as described herein. In specific example, if data object X representation has been liked 10 times and user A indicates that he also likes data object X representation, then the number of users on the system that have liked data object X representation will be increase to 11. If user A un-likes data object X representation, the number of users liking data object X representation is reduced to 10. For the purpose of reporting usage statistics and other analytics to a provider, the system records the number of interactions with the data object, e.g., in this specific example, the total number of likes the data object X representation has ever received on the system (11), together with the total number of un-likes the data object X representation has received on the system (1), such that the current like count is 10, which is the number of likes displayed in field (172) of the data object X representation. Each interaction with a data object representation is recorded separately in the global interaction data database along with the user ID of the user who interacted with the data object representation and the date that it occurred. This enables the system to display statistics to the providers and to do time-series analysis of the user activity.

In one specific example, if a provider would like to understand how users are interacting with a data object representation, the system can query the global interaction data database for the set of interactions taken by users on the system regarding that data object representation. The set of interactions generated by the system will include the number of comments, ratings, likes, shares, followers, etc. associated with that data object. The set of interactions will also include the click through rate of the data object, the number of purchases associated with that data object, etc. The provider can also compare the interaction data set related to a particular data object relative to other data objects in the provider's catalog, a competitor provider's catalog, data objects in the same event category as the particular data object, etc. These and other marketing analytics, described in more detail below, can be explored using the interaction data associated with a data object and stored in the global interaction data database.

Another embodiment of data transfer and management on the system is illustrated schematically in FIG. 13(*a*). In this alternative embodiment, user A accesses the system via a web page (1301), mobile application view (1302), or other viewing mechanism (1303), and for example, chooses to follow (or, in an alternative embodiment not specifically shown in FIG. 13, attend) a provider data object X (1304) (available in the provider profile (1305)). The system creates an association between user A and data object X (1306) and that association is stored in the global tracking database (1307). Therefore, in this specific example, the association that is created includes the following data: user A and data object X. Unlike the example described above, the system creates an association between user A and data object X, but a derivative data object X' is not created in response to user A's decision to follow data object X. The system then surveys the global tracking database for the dataset of followers of user A on the system, i.e., users B, C, and D (1308). If user A has no followers, data object X representation is displayed in one or more user A customized sections, channels or feeds, e.g., a section, channel and/or feed related to recent user A activities on the system (1309). If user A has a follower, e.g., user B, the system displays data object X representation in a user B customized section, channel or feed (1310) designed to display data object representations new to user B on the system; and likewise, if user A has additional followers, e.g., users C and D, the system displays data object X representation in a user C customized channel or feed and a user D customized channel or feed, respectively. If an additional association is added to the global tracking database related to user A and/or data object X, the system identifies those additional associations in the global tracking database and displays any updates to the dataset of additional associations in the New Channel.

An additional embodiment is depicted in FIG. 13(*b*) in which user A generates a conversation data object based on a source data object X representation. In this embodiment, if user A generates a conversation data object X based on a source data object X representation (1311), the system creates a conversation data object X (1312), which is stored to the collective data object database (1313), and an association is created between user A, the source data object X, and the conversation data object X (1314). The association between user A, data object X, and conversation data object X is created and stored to the global tracking database (1307) and/or an additional tracking database, which may be a component of the global tracking database or a separate database in the system. The system then surveys the global tracking database for the dataset of followers of user A on the system, i.e., users B, C, and D (1308). If user A has no followers, conversation data object X representation is displayed in one or more user A customized sections, channels or feeds, e.g., a section, channel and/or feed related to recent user A activities on the system (1309). If user A has a follower, e.g., user B, the system displays conversation data object X representation in a user B customized section, channel or feed (1315) designed to display data object representations new to user B on the system; and likewise, if user A has additional followers, e.g., users C and D, the system displays conversation data object X representation in a user C customized channel or feed and a user D customized channel or feed, respectively.

Additional details regarding conversation data objects and how they are stored and displayed in the system are depicted in FIG. 13(*c*). In this embodiment, if user B, a follower of user A, comments on a conversation data object X (1316), then the conversation data object X representation is modified to include user B's comment (1317), and that modified form of conversation data object X is stored in the collective data object database (1313). In one specific embodiment, the action of starting a conversation about a data object generates a conversation data object, but participating in a conversation about a conversation data object, adding one or more comments to a conversation data object and/or responding to one or more comments in a conversation data object modifies the original conversation data object but participating in a conversation does not generate a new conversation data object. An association is generated between user B, the source data object X, and the conversation data object X (1318) and that association is stored in the global tracking database (1307). The system then surveys the global tracking database for the dataset of followers of user B on the system, i.e., users C and D (1319). If user B has no followers, conversation data object X representation is displayed in one or more user B customized sections, channels or feeds, e.g., a section, channel and/or feed related to recent user B activities on the system (1320). If user B has a follower, e.g., user C, the system displays conversation data object X representation in a user C customized section, channel or feed (1321) designed to display data object representations new to user C on the system; and likewise, if user B has additional followers, e.g., user D, the system displays conversation data object X representation in a user D customized channel or feed.

As shown in FIG. 13(*d*), it is possible for more than one user of the system to converse about a data object. In this embodiment, users A and C each start an independent conversation regarding source data object X representation (1322 and 1323, respectively), and the system generates two conversation data objects X based on the actions of users A and C on the system, i.e., user A conversation data object X (1324*a*) and user C conversation data object X (1324*b*). An association is generated between user A, the source data object X, and the user A conversation data object X (1325) and that association is stored in the global tracking database (1307); and an association is also generated between user C, data object X, and user C conversation data object X (1326) and that association is also stored in the global tracking database. The system then surveys the global tracking database for the dataset of followers of users A and C on the system (1327 and 1328, respectively). If users A and C have no followers, user A conversation data object X and user C conversation data object X are each separately displayed in one or more user A and C customized sections, channels or feeds, respectively, e.g., a section, channel and/or feed related to recent user A and C activities on the system (1329 and 1330, respectively). If users A and C have one or more followers, the system displays user A conversation data object X representation and user C conversation data object X representation in those followers customized section, channel or feed (1331) designed to display data object representations new to that additional user on the system.

A further illustration of one embodiment of data transfer and management on the system is illustrated schematically in FIG. 13(*e*). User A (i) interfaces with the system on his GUI (1332) and choses to follow data object X representation (1333), a data object created by provider Z. As described above, provider Z is represented by a data table (1334), which includes a profile (1335) including provider Z's ID, provider Z's event catalog (1336) (and each event in that catalog has a unique item ID), a contact, follower, and following data table (1337), and an interest and/or category data table (1338) which includes the interest and/or category IDs for each interest and/or category, as well as the unique event IDs for each event in an interest and/or category of provider Z. When user A choses to follow (or, e.g., attend) data object X representation, that preference is (ii) stored in user A's data table (1339), which includes his user profile (1340), including his user ID, his contact, follower, and following data table (1341), and user A's preferences (1342). The system then (iii) creates an association between user A and data object X (1343) and that association is (iv) stored in a global tracking database (1307) (also a component of element (105)). The system then surveys the global tracking database to (v) generate the dataset of followers of user A on the system, i.e., users B, C, and D (1344). The system (vii) displays data object X representation to the followers of user A, e.g., users B, C, and C in a B, C, and D customized section, channel or feed (1345, 1346, and 1347, respectively) designed to display data object representations new to users B, C, and D, respectively, on the system.

An example of a conversation data object and the accompanying conversation data object representation is illustrated in FIG. 13(*f*). Much like the data object depicted in FIG. 1(*h*), conversation data object X is a database (1348), that includes an event ID (1349), an event title (1350), event description (1351), a ticket price (1352), optionally, an image and/or media (1353), a commentary field (1354), the provider (promoter) ID (1355), optionally, a category ID for the category associated with the event (1356), optionally, a hyperlink to a website (1357), e.g., an event website, a promoter website, a ticket reseller/distributor website, etc., and one or more interactions (or interaction data) (1358) one or more users and/or providers on the system have had with that data object. The conversation data object X database also includes the user ID of the user that created the conversation data object (1359). Interactions are stored in the system as associations between the conversation data object and the user interacting with the conversation data object representation. As described above, the one or more interactions can include but are not limited to: viewing the conversation data object representation, expressing a preference for the conversation data object representation, commenting on the conversation data object representation, participating in a dialog regarding the conversation data object representation, offering an opinion regarding the conversation data object representation, providing a rating for the conversation data object representation, clicking through the conversation data object representation to view additional details, clicking through the conversation data object representation to view first provider-hosted information, participating in a survey regarding the conversation data object representation, requesting further information from a provider regarding the conversation data object representation, buying a ticket to an event displayed in the conversation data object representation from a third-party retailer/reseller, buying a ticket to an event displayed in the conversation data object representation directly from the event provider, buying a ticket to an event displayed in the conversation data object representation from an individual, participating in an auction regarding the conversation data object representation, requesting to purchase a ticket to an event displayed in the conversation data object representation, requesting that a cancelled event displayed in the conversation data object representation is rescheduled by the promoter, suggesting to the promoter product ideas, improvements, and/or corrections regarding the conversation data object representation, or combinations thereof.

The system extracts the data contained in the conversation data object to generate a conversation data object X representation (1360), including a title (1361) and one or more of the following optional fields: the event description (e.g., venue and dates) (1362), a ticket price (1363), an image and/or media (1364), a commentary field (1365), a hyperlink to a website, e.g., an event website, a promoter website, a ticket reseller/distributor website, etc. (not shown), and one or more interactions with the data object representation (1366). The conversation data object representation can include less than the full dataset contained in the database, e.g., omitting a visual representation of the event ID, provider ID, and category ID. A conversation data object representation can also optionally include a visual indicator in the representation to distinguish the conversation data object from a source data object, e.g., a text box surrounding the item image (1367), as well as a representation of the user who created the conversation data object (1368) and a subtitle that indicates the context of the conversation that is the subject of the data object representation (1368). In one specific embodiment, a conversation data object representation includes a title that refers to the item represented by the conversation data object, a representation of the user who created the conversation data object (1369), and a subtitle that indicates the context of the conversation represented by the conversation data object representation.

Consumer-User Profile & Interface

A consumer-user can use the event promotional system without signing in, specifying any event/event promoter preferences and/or interests, or providing any personal information. In this embodiment, the system allows an unregistered consumer-user to view the content of the system, but an unregistered consumer-user's access can be limited to unrestricted functions of the system, e.g., the unregistered consumer-user can search the collective event promoter data table and/or a specific event promoter data table, view event and/or event promoter details (event or event promoter data object representations, respectively), view consumer-user and event promoter-user activity as it is occurring across all of the users, etc., while a registered consumer-user can create one or more event and/or event promoter lists, follow one or more events, event promoters and/or individuals in the system, etc.

Figure 2A:
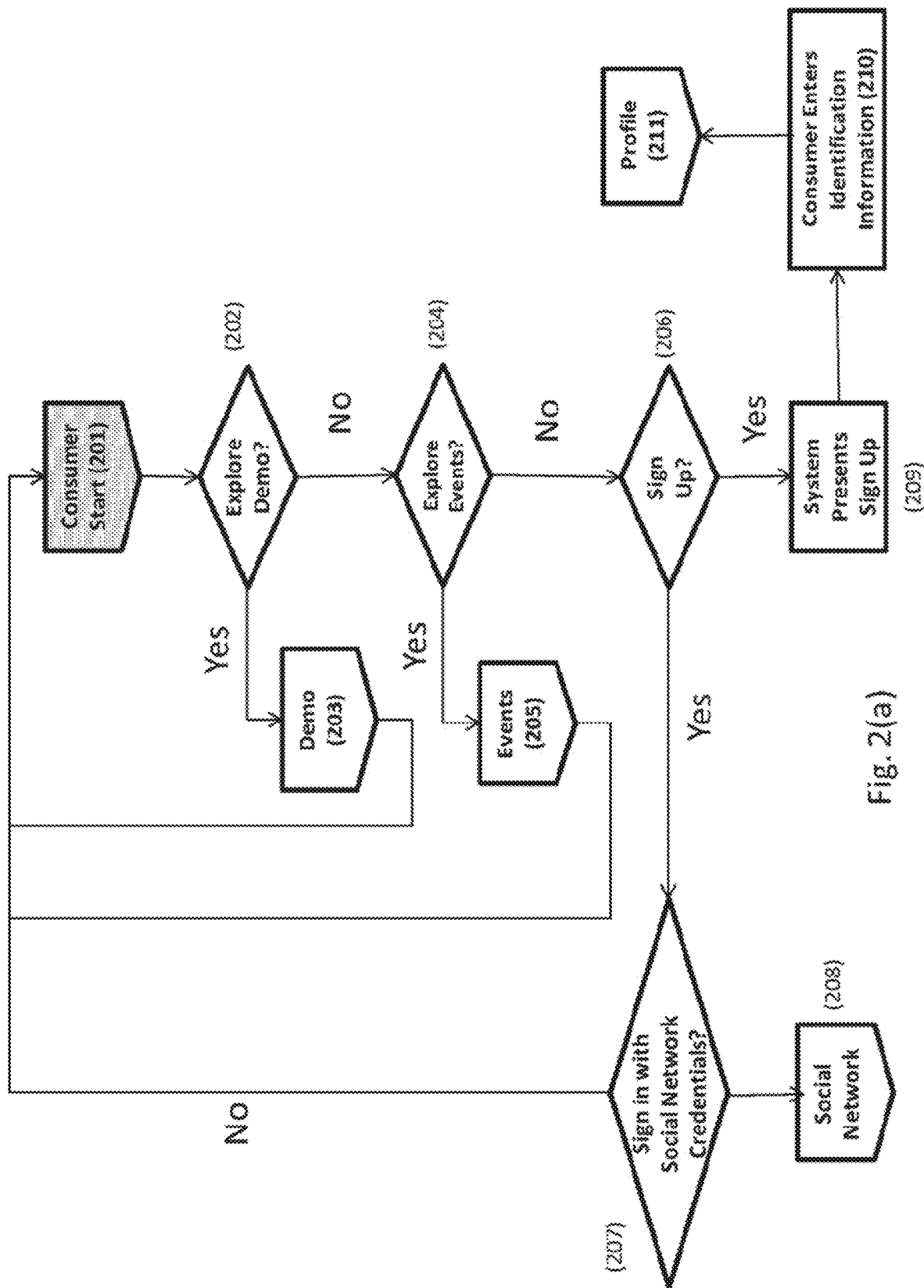
FIG. 2(a) illustrates how a consumer-user can create a profile on the system.

In a preferred embodiment, a consumer-user creates a profile on the system that includes a consumer-user profile comprising his/her name, email, password, and optionally one or more additional fields, e.g., address, telephone number, sex, date of birth, approximate individual or household income, employment information, a reference to a separate social networking website, age verification information, e.g., driver's license number or another form of personal identification, nickname(s), avatar, place of birth, occupation, hobbies, alma mater(s), marital status, the age and identity of one or more relatives, etc. A method of creating a profile on the system is illustrated in FIG. 2(*a*). An unregistered consumer-user accesses the system (201) and optionally, is given the opportunity to explore the system by viewing a system demonstration (202). If the consumer-user elects to view the demonstration, the system displays the demonstration to the user (203) and redirects the user to the initial landing page for an unregistered user (201). In addition, the consumer-user is given the option to view the various event promoters that participate in the system (204), optionally directing the system to display a searchable event promoter listing (205), and/or the consumer-user can simply search the collective event promoter data table for event promoters that participate in the system. The consumer-user is given the opportunity to create a profile on the system (206), and if selected, the system displays a sign-up screen (209) that includes information the system will use to identify that consumer-user (210).

In one embodiment, the profile creation process includes collecting information from a consumer-user regarding his/her interests in one or more interest categories, as well as, e.g., his/her hobbies, occupation, etc. FIG. 3(*a*) illustrates one method of creating a profile on the system. FIG. 3(*a*) is an example of a profile creation screen. The module displays a series of interests (301) and the consumer-user selects those interests he/she prefers. The module can then display a series of event promoters that fall within the interest categories selected and the consumer-user can de-select event promoters within that interest category in which the consumer-user is not interested (302) (FIG. 3(b)). Likewise, the module can display avatars of people the consumer-user is following once the consumer-user links the system to his/her contacts in a social networking site, and the consumer-user can de-select those people he/she does not wish to follow on the system (not shown). Moreover, the module can display one or more lists the consumer-user may wish to create in view of his/her interests and the consumer-user can de-select those lists he/she does not wish to populate on the system and/or create new lists he/she wants to populate on the system (FIG. 3(c)).

Figure 3D:
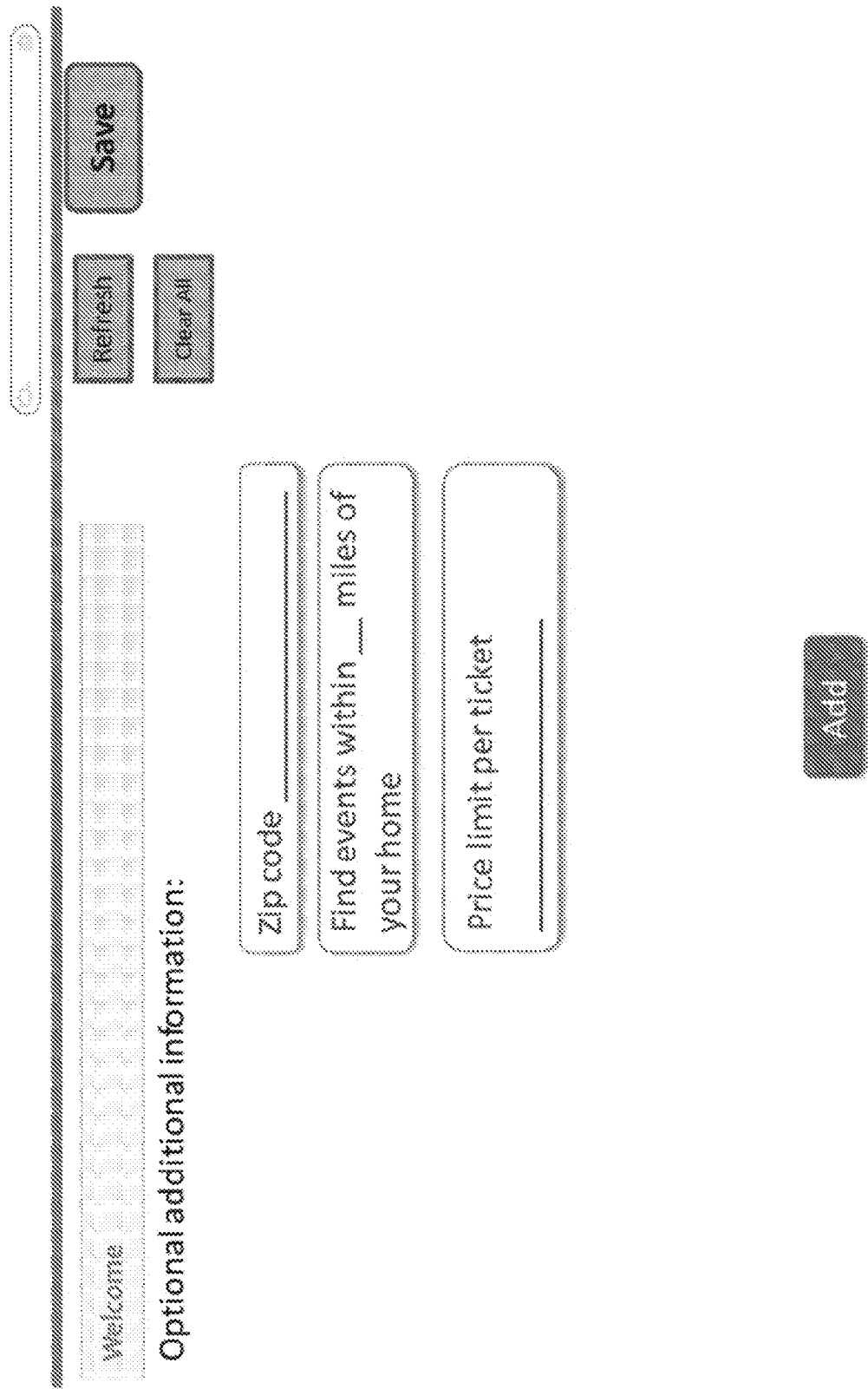

FIG. 3(d) is a schematic illustration of how a consumer-user can create a profile on the system. In one embodiment, the consumer-user signs into a social networking site (303) and he/she is directed to a system sign in screen (304). The consumer-user is prompted to enter his/her social network login credentials (305) and the system connects (306) with the social network (307) to confirm that the credentials are valid (308). If the credentials are not valid, the system prompts the consumer-user to login without using his/her social network credentials. If the credentials are valid, the system queries the collective consumer data table (309, 310) to confirm that consumer-user has an existing profile on the system (311). If the consumer-user has an existing profile (312), the system displays the consumer-user landing page for that profile (313) based on information drawn from the consumer-user profile data table (314). If the consumer-user does not have an existing profile, the system creates a new profile on the system for that consumer-user and stores profile information in a consumer profile data table for that consumer-user. The system presents a consumer-user with one or more listings of event promoters and/or event categories for the consumer-user to select his/her favorites, as described above in reference to FIGS. 3(a)-(c) (315), and information regarding event promoters, event promoter categories, events, and event categories, presented at this stage of the process is supplied by the collective event promoter data table (316). The system also includes a feature that facilitates favorite selection (317), known as a favorite wizard (318), and described below. The consumer-user selects favorite event promoters and event categories (319), as well as optional subcategories (not shown), and the system draws information for this process from the collective event promoter data table (320), saving the results in the consumer event promoter preferences data table for that consumer-user (321). At the conclusion of this process, a consumer-user profile is created (322).

Once a consumer-user expresses a preference for a data object representation, the system software determines which consumer-users GUIs, channels or feeds the data object representation should be displayed in by querying the followee/follower relationships stored in the collective consumer data table, individual consumer-data tables, collective event data table, and/or individual event data tables. For example, if consumer-user Bob follows Event Y on the system (e.g., Event Y is a concert series by an artist followed by Bob) and Event Y adds a new show data object (e.g., a new date has been added to the concert series), the system will query the collective consumer data table, individual consumer-data tables, collective event data table, and/or individual event data tables to look for a preference Bob has expressed in Event Y so that the new show data object representation is displayed in one or more sections, channels, or feeds of Bob's consumer-user GUI. The system will copy a reference to the data object into the appropriate pre-defined or customized channel or feed data tables and a consumer-user associated with each pre-defined or customized channel will see the new data object upon the next refresh of the channel or feed GUI. Moreover, for the channels or feeds designed to display data object representations not previously viewed by a consumer-user (e.g., "New Channel"), after the system has determined that a data object has been viewed by a given consumer-user and/or previously presented by the system to the consumer-user in his/her GUI, the system will remove the data object from the New Channel by deleting the reference from the New Channel data table. In one embodiment, the system can determine whether the data object has been viewed by a consumer-user, e.g., by detecting via JavaScript in the browser that the data object was displayed in the consumer-user's GUI and a message is sent to the server to instruct the system to remove the data object from the New Channel data table. When the New Channel is refreshed, that data tile will no longer be displayed. Alternatively, the system may not detect actual "views" by a consumer-user in his/her browser, but instead, simply maintain an inventory of data objects that have been presented in the New Channel and once presented, the reference to that data object is deleted from the New Channel data table. In yet another alternative, the system can delete a reference to a data object within a selected time from first display in the New Channel, e.g., within one week, one month, three months, etc.

Figure 3F:
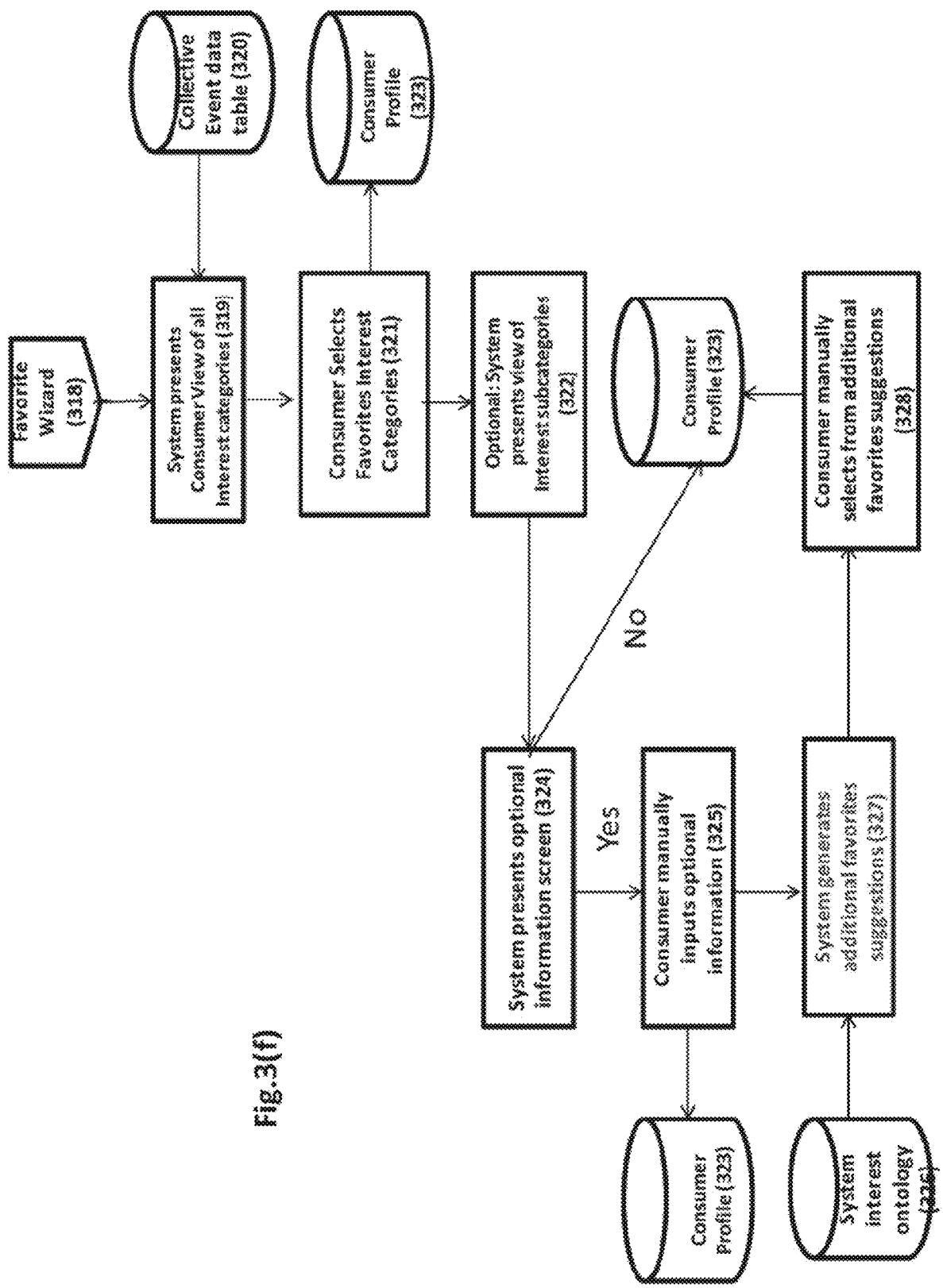

FIGS. 3(e)-(f) illustrates the favorite wizard (318) referenced above. The favorite wizard presents the consumer-user a view of all interest categories (319), based on information drawn from the collective event promoter data table (320). The consumer-user selects favorite interest categories (321) and optionally, subcategories (322) and those selections are saved to the consumer profile (323). The system optionally presents one or more fields regarding optional information (324), e.g., concerning the consumer-user's occupation, average household income, home ownership, purchasing preferences, children, marital status, etc., that can be used by the system to generate event/event promoter suggestions. If the consumer-user elects to include the optional information in the profile, he/she inputs the information (325), which is saved to the consumer profile (323). The system optionally generates additional interest category and/or event promoter suggestions (327) based on the optional information provided by the consumer-user and information contained in the collective event promoter data table (326), and the consumer-user selects from the additional suggestions (328) to generate a profile stored to the consumer-user profile (323).

In an additional embodiment, the favorite wizard can also compare the consumer-user's profile information, e.g., age range, sex, and interests, to event and/or event promoter selections of comparable consumer-users on the system, and the system displays suggestions based on that comparison. For example, if a consumer-user is a male, age 45, with an interest in golf, the system will survey the event/event promoter preferences of additional male consumer-users on the system within the same age range that have also expressed an interest in golf, and display events and/or event promoters the additional consumer-users have selected as suggested favorites.

The following example serves to illustrate the profile creation system described above and illustrated in FIGS. 3(a)-(f): the consumer-user identifies one or more preferred interest categories, e.g., sports and outdoors, and the system displays one or more preferred interest subcategories, e.g., within the category of sports and outdoors, the consumer-user can specify an interest in team sports, exercise and fitness, outdoor recreation, etc. For each additional interest category selected, the consumer-user can optionally select interest subcategories, e.g., within the category of team sports, the consumer-user can specify an interest in one or more sports teams, optionally within one or more subcategories of sporting activities; likewise, within the category of outdoor recreation, the consumer-user can specify an interest in cycling, golf, hiking, running, etc. Each preferred interest subcategory can be further categorized into additional subcategories, e.g., within the subcategory of running, the consumer-user can specify an interest in competitive events, racing events of varying or specified distances, terrain, etc. Additionally or alternatively, if the consumer-user specifies an interest in music, the consumer-user can optionally select interest subcategories within music, e.g., classical, jazz, rock, pop, country, etc. The system can include one or more predefined interest categories and subcategories and/or the consumer-user can define consumer-user-specific interest categories and subcategories. As described above, each category (and subcategory) comprises a unique ID and events and/or promoters associated with that category also comprise a unique ID. Therefore, if a consumer-user expresses a preference for a particular category of events on the system, an association is made by the system between the user ID and the category ID, and the system then uses that association to identify event IDs included in that category and display those event IDs to the user. Hence, the system matches the unique user IDs, category IDs and event IDs within that category to generate a tailored subset of data objects matching his/her preferences.

Once the consumer-user has selected an interest category and/or one or more subcategories, the selection screen is updated to display representative event promoters that participate in the system that are categorized within the interest categories and/or subcategories highlighted by the consumer-user.

In one embodiment, an event promoter can pay an additional fee to be prominently displayed in the selection screen, e.g., to be displayed in the first grouping of representative event promoters that are categorized within a selected interest category (this is an example of one way of "featuring" an event which is described in more detail below). The interest category selection step can be updated at any time during the selection process by the consumer-user. The various representative event promoters can be shown in the selection screen using the individual event promoter logo or the field can include a list of event promoters by event promoter name. The consumer-user can select and/or de-select one or more event promoters from the lists provided in the profile set-up, i.e., to select favorite event promoters and/or to remove event promoters the consumer-user does not want to browse on the system. Alternatively, the consumer-user need not select and/or de-select any event promoters from the lists provided in the profile set-up which allows the consumer-user to view information from all event promoters categorized within the general interest categories/subcategories selected by the consumer-user. For example, the consumer-user can specify an interest in classical music of any event promoter or of a particular artist. In addition, the consumer-user can de-select jazz music performed by a particular artist which would inform the system to filter the consumer-user's results to remove that artist from the consumer-user's view. Still further, the consumer-user can refresh all or part of the event promoter selection process at any time during profile set-up.

In addition or alternatively, the consumer-user can also select one or more event promoters during the profile set-up without any reference to a particular interest category. In this embodiment, the system presents a list of event promoters that participate in the system and the consumer-user selects those event promoters in which he/she has an interest. The list of event promoters can be displayed to the consumer-user in any order, e.g., alphabetical or divided into one or more interest categories. The consumer-user can also provide information regarding which events the consumer-user has already attended and/or which event promoters the consumer-use has experience with in order to allow the system to filter the results of an event promoter's event offerings to eliminate events/event promoters the consumer-user has already attended or does not wish to attend. In this regard, the system can provide targeted results including events that are new to a given consumer-user, albeit not necessarily a newly publicized event on the system or in the general marketplace.

The system can collect additional information from a consumer-user that may better inform the system regarding the consumer-user's event preferences. For example, the system can collect information regarding occupation, income, and whether he/she has any children and their approximate age ranges. Information about the number of children the consumer has may inform the system and/or an event promoter that the consumer's interests may extend to events for children although the consumer-user has not necessarily expressed an interest in those events at another stage of the profile creation process (a consumer-user can also chose not to provide this information if he/she is not interested in receiving information about such event).

The consumer-user can also include a list of one or more contacts in his/her profile. The contacts need not be consumer-users of the system. In a preferred embodiment, one or more of the consumer-user's contacts are also consumer-users ("additional consumer-users") of the system. In one embodiment, a consumer-user's contact data table is populated by importing one or more contacts of a consumer-user's contact data table of a social networking website. Alternatively or additionally, the contact data table can be populated by importing one or more contacts of a consumer-user's contact data table of an email exchange system. In one embodiment, the contact data table includes a list of individuals and/or event promoters followed by the consumer-user and/or those event promoters and/or individuals that follow the consumer-user. Alternatively, the consumer-user profile can include a follow/follower data table that includes a list of individuals and/or event promoters followed by the consumer-user and/or those event promoters and/or individuals that follow the consumer-user and the follower/follower data table is separated from the contact data table.

The system can allow a consumer-user to manage interactions with contacts or contacts on a social networking site via the system, e.g., to browse and search all users of the system that participate in a particular social networking site, to invite other system users to become contacts via a social networking site, to accept and/or reject friend invitations via the system, delete contacts or contacts from a contacts or contacts list on the system, to send a private message to one or more contacts or contacts in their network via the system, to block communications from a contact in their network over the system, and/or to report a friend's or contact's misconduct on the event promotional system to a system administrator. Moreover a consumer-user can view their contact list in a grid or list format, sort their contacts or contacts list alphabetically by first or last name, perform keyword (or name) searching on a contacts or contacts list, group contacts or contacts in one or more lists, and filter a contacts or contacts list to display all contacts or contacts, those recently added and/or with updated profiles, etc., and add a contacts from a contacts list to one or more preferred lists, described below.

In addition, the consumer-user can also create one or more lists in his/her consumer-user profile populated by his/her preferred interests, events and/or event promoters. Each individual consumer profile includes one or more additional data tables including a consumer-user's preferences, e.g., event promoter preferences, event preferences, and interest categories. The one or more additional data tables can include one or more event lists organized in any manner defined by the consumer-user. For example, a consumer-user can create one or more lists, including but not limited to: desired events, attended events, preferred events, events identified by a consumer for a third party, events viewed by the consumer, events shared or commented on by the consumer with a contact, events shared or commented on by a contact with a consumer, and all events, as well as one or more event promoter lists (also organized in any manner defined by the consumer-user), including but not limited to: desired event promoters, attended events hosted by an event promoter, preferred event promoters, events and/or event promoters identified by the consumer for a third party, event and/or event promoter data objects shared or commented on by the consumer with a friend, event and/or event promoter data objects shared or commented on by a friend with the consumer, and all event promoters.

For example, the consumer-user can create one or more lists of events for specific reasons, e.g., a wish list, gift list, etc. As used herein, a wish list is a list of event/event promoters a consumer-user wants to attend, while a gift list is a list of events/event promoters the consumer-user may want a third party to attend. In addition, the consumer-user can create one or more lists for various purposes, as shown in FIG. 3(c), e.g., favorite artists, teams, events to see, favorite artists, teams, events of a family member, fundraisers, charities, etc. In one embodiment, the consumer-user can grant access to one or more lists in his/her consumer-user profile to one or more contacts. For example, the consumer-user can grant a friend access to a limited number of the lists in his or her profile, e.g., only his/her wish or gift list, or one or more of his/her contacts can be granted full access to all of his/her lists. In this regard, the access granted to a friend can be view-only access or the friend can be granted permission by the consumer-user to comment on one or more of the events in the consumer-user's lists. Still further, the consumer-user profile can also include a list of events and/or event promoter pages available on the system bookmarked by the consumer-user and one or more contacts can be granted access to the consumer-user's bookmarks.

For an event and/or event promoter data object, a consumer-user can provide a comment, write a review and/or rate the event or event promoter. A comment from one user to another regarding an event promoter or event can be about any subject, including but not limited to, a suggestion to purchase tickets to that event for oneself or an individual, an indication that one user likes or dislikes the event, an indication that one user would like to purchase tickets to an event from another user, etc. The following attributes for the event/event promoter rating and reviews can be included by the consumer-user in his/her comment and/or review: consumer-user name or anonymous rating, comment or review date, rating (e.g., on a scale of one to five stars or another rating system created by the system), and comment and/or review text. In a preferred embodiment, the consumer-user can provide a comment on an event and/or data object representation and contacts of the consumer-user can do the same. An event promoter can also include a comment on an event and/or event promoter data object representation. Because the filtering program is configured to select that information relevant to an individual consumer-user on the system, only those comments supplied by a contact, follower, and/or one followed by the specific consumer-user and/or by an event promoter in which that consumer-user has expressed an interest are displayed in the data object representation for that event and/or event promoter as it appears in that specific consumer-user's interface.

A consumer-user can also indicate an intention to attend or not attend an event. In one embodiment, the data object representation can include selectable attendance and non-attendance icons that indicate the consumer-user's intention to attend/not attend that event. Preferably, when the consumer-user selects the attendance icon to indicate his/her preference to attend an event, the non-attendance icon is automatically de-selected (and vice versa) and the attendance and non-attendance icons are visually distinct. As described above, such an interaction with the data object representation constitutes one type of system tracking preference and creates a derivative data object representation, visible to followers and those followed by that consumer-user on the system.

Still further, the consumer-user can enable the system to interface with the consumer-user's calendar on his/her computer in order to export events the consumer-user will attend to his/her calendar and/or to import calendar entries into the system to generate a consumer-user calendar that includes system events as well as additional calendar entries for the consumer-user unrelated to the system. Alternatively, the consumer-user may choose not to import his/her calendar. In this embodiment, the system will generate a consumer-user calendar that is limited to those events tracked on the system and optionally, one or more calendar entries manually entered by the consumer-user on the system.

The consumer-user can also set one or more privacy settings in his/her profile that enables the consumer-user to define how much information about a consumer-user's calendar of events is visible to other consumer-users on the system, or if the calendar feature is not enabled on the system by the consumer-user, which events the consumer-user will attend. In one embodiment, a consumer-user's calendar of events or those events that will be attended by the consumer-user may only be visible to that consumer user. Alternatively, if a consumer-user selects/de-selects an attendance icon on a data object representation, he/she can identify a subset of followers/followed that can view his/her attendance/non-attendance preference, individually or by group. This attendance viewing preference can be set when the consumer-user creates his/her profile on the system, or the attendance viewing preference can be selected each time the attendance icon is selected/de-selected. For example, when a consumer-user selects an attendance icon in a data object representation, the system prompts the consumer-user to make an additional selection of those individuals or groups of individuals on the system he/she wishes to view his/her intention to attend, e.g., from a drop-down menu of his/her contacts, friends, followers, followed, etc. If the consumer-user elects to restrict the attendance viewing preference to only a limited set of his/her followers on the system or to maintain the attendance viewing preference private (so that only that consumer-user can view the attendance icon), the system treats the attendance icon as equivalent to following an event, such that the followers of that consumer-user are able to view the fact that he/she has followed the event on the data object representation, but the fact that he/she intends to attend the event is not visible on the data object representation.

In addition, as described above, a consumer-user can also interact with a data object representation as follows: viewing one or more data object representations, expressing a preference, commenting on one or more data object representations and/or derivative data object representations, participating in a dialog regarding one or more data object representations or derivative data object representations, offering an opinion, providing a rating, clicking through one or more data object representations to view additional details, clicking through one or more data object representations to view first event promoter-hosted information, participating in a survey, requesting further information, buying a ticket to an event displayed in one or more data object representations from a third-party retailer/reseller, buying a ticket to an event displayed in one or more data object representations of the subset directly from the event promoter, buying a ticket to an event displayed in one or more data object representations from an individual, participating in an auction, offering a ticket to an event displayed in one or more data object representations in the subset for any amount, requesting to purchase a ticket to an event displayed in one or more data object representations, requesting that a discontinued event displayed in a data object representation is re-introduced by the first event promoter, e.g., on an alternative or additional date or at an alternative of additional venue, requesting that an event is organized or scheduled by an event promoter, requesting that additional tickets, dates, and/or venues are added for an event, requesting a change of venue or date for an event, suggesting an alternate venue or data for an event, suggesting to the first event promoter product ideas, promotions, improvements, and/or corrections regarding an event represented by a data object representation, removing a data object representation from one or more lists ("de-listing"), sharing a data object representation with an individual or group, e.g., emailing the data object representation (or a hyperlink to the data object), including a hyperlink for that data object representation on a social networking system, etc., "un-liking" a data object representation, e.g., removing that data object representation from the list of liked data objects in a consumer-user's profile, "un-friending", e.g., removing that data object representation from the list of "friends" in a consumer-user's profile, or combinations thereof.

Yet another type of interaction a consumer-user can have with a data object representation is to click through the data object representation to purchase a ticket to the event represented by that data object representation and/or clicking through the data object representation to purchase one or more items, e.g., promotional items, associated with the event represented by that data object representation. The purchase associated with these interactions can be made in the system or via a website linked to the data object representation. The website can be the event promoter's website or an online ticket broker, if the purchase is a ticket purchase, or, if the purchase is for one or more items associated with the event, the website can be the event promoter's website or another shopping website carrying items associated with the event. In a specific embodiment, the website is an online shopping community such as that described in U.S. application Ser. No. 14/208,825, filed Mar. 13, 2014, the disclosure of which is incorporated by reference in its entirety.

The system also allows the consumer-user to include geographic information to display those events the consumer-user can attend in a certain specified location or within a specified geographic area. As shown in FIG. 3(d), the system can prompt the consumer-user to specify his/her location and a radius around that location within which he or she wants to view events on the system. In another embodiment, the consumer-user enables the system to use the location services feature of a consumer-user's computer to access the consumer-user's current location and the system uses that geographic location to filter events within that location, thereby displaying only those events within a selected geographic area. The system may also enable the consumer-user to specify a price limit per ticket he/she is willing to spend on a ticket to an event.

Figure 4A:
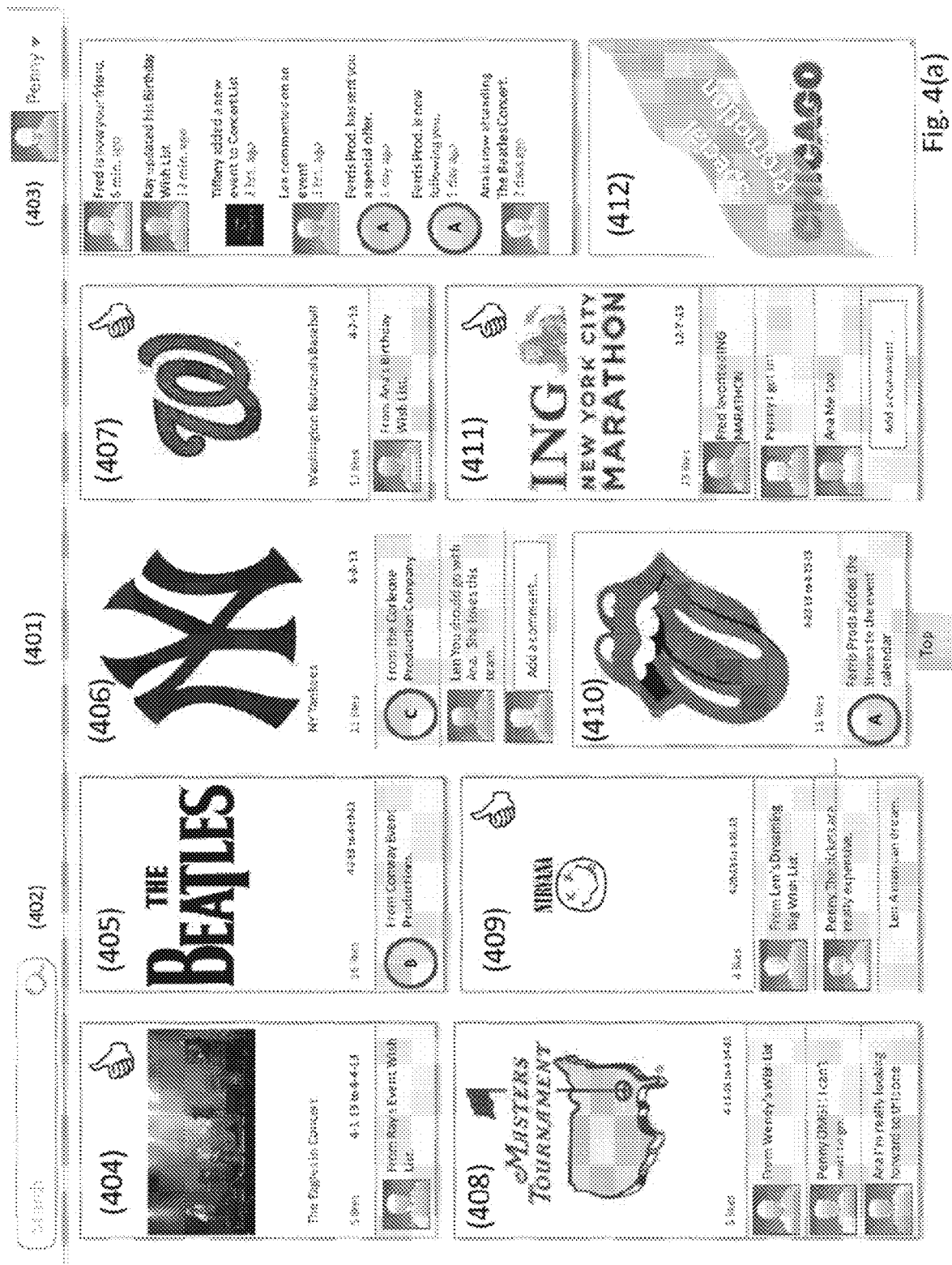
Figure 4C:
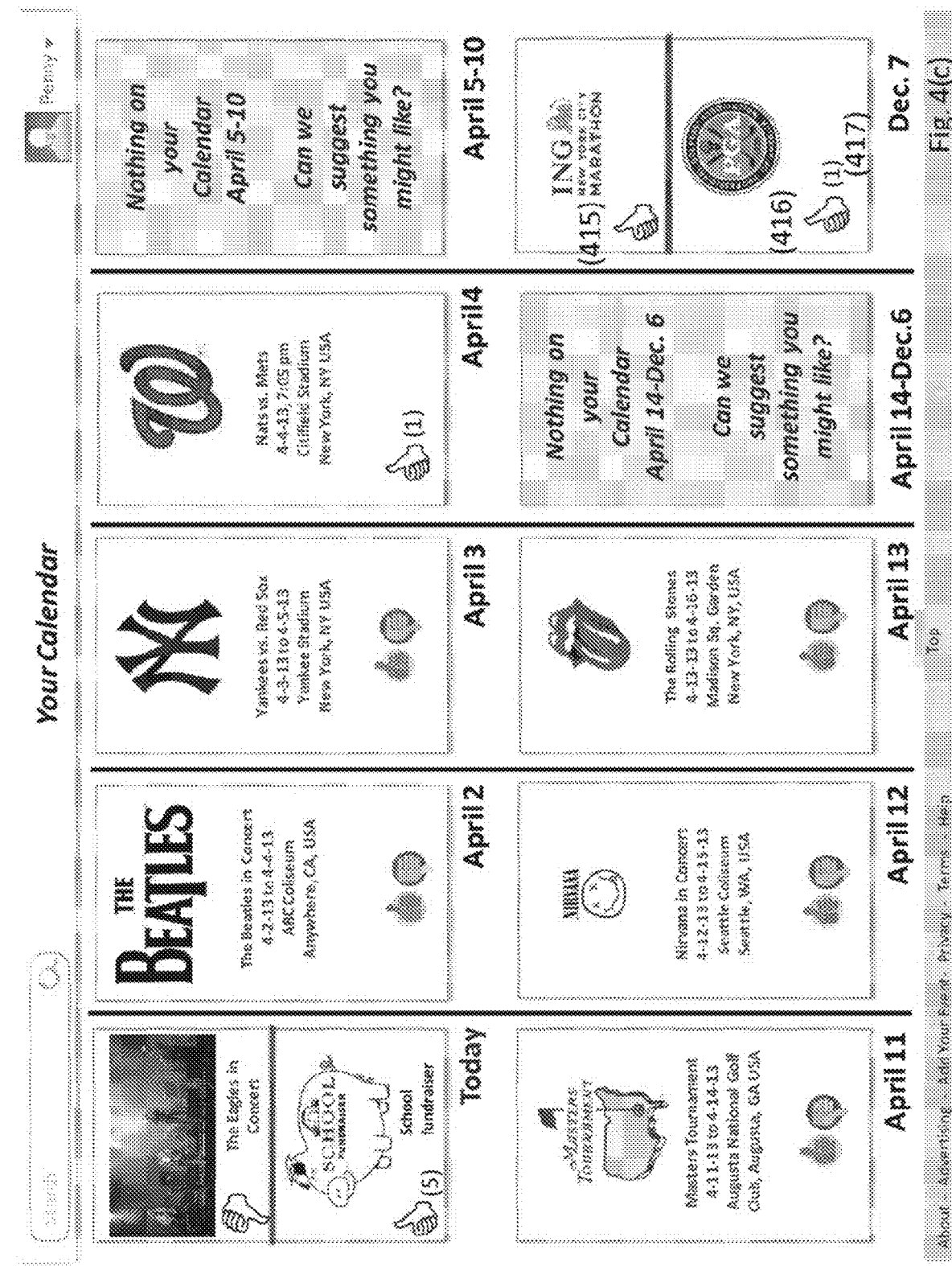

Once the consumer-user creates a consumer-user profile and an system profile, the information provided by the consumer-user is formatted by the network to create a consumer-user GUI or consumer-user landing page (or a "home page") that is tailored to the consumer-user's profile. One non-limiting example of a consumer-user GUI landing page is depicted in FIGS. 4(a)-(g). The GUI includes a header (401) that includes a search field (402) and an optional consumer avatar (403) that identifies the consumer-user GUI as one that has been customized by the system for the consumer represented by that avatar (in an alternative embodiment, the consumer avatar can be replaced by a username field (not shown)). The data object representations (404-412) in the GUI can be displayed in any order. In one embodiment, the consumer-user interface organizes data object representations relative to activities on the system, i.e., an activity feed which provides information regarding activities the consumer-user has engaged in on the system and/or activities of contacts or follows of the consumer-user. The activity feed can be displayed in chronological, reverse chronological, random order, or a consumer-user defined order. In a preferred embodiment, the activity feed is displayed in reverse chronological order. In the embodiment depicted in FIG. 4(b), the data object representations are displayed in a chronological order, e.g., a calendar view, with various events the consumer-user has tracked on the system organized by date in the GUI. For those days on which the consumer-user has not tracked a data object, e.g., April 5-10 or April 14-December 6 in FIG. 4(b) (413 and 414, respectively), the system can optionally include a data object representation that includes a visual indication that no events are being tracked on that date. As shown in FIG. 4(c), a data object representation can also include an attendance icon (415 and 416) indicating the consumer-user's intention to attend the event depicted by the data object representation. Optionally, the attendance icon can further include an indication that one or more of the consumer-user's friends or followers has also indicated an intention to attend that event (e.g., a parenthetical adjacent to the attendance icon) (417).

Figure 4D:
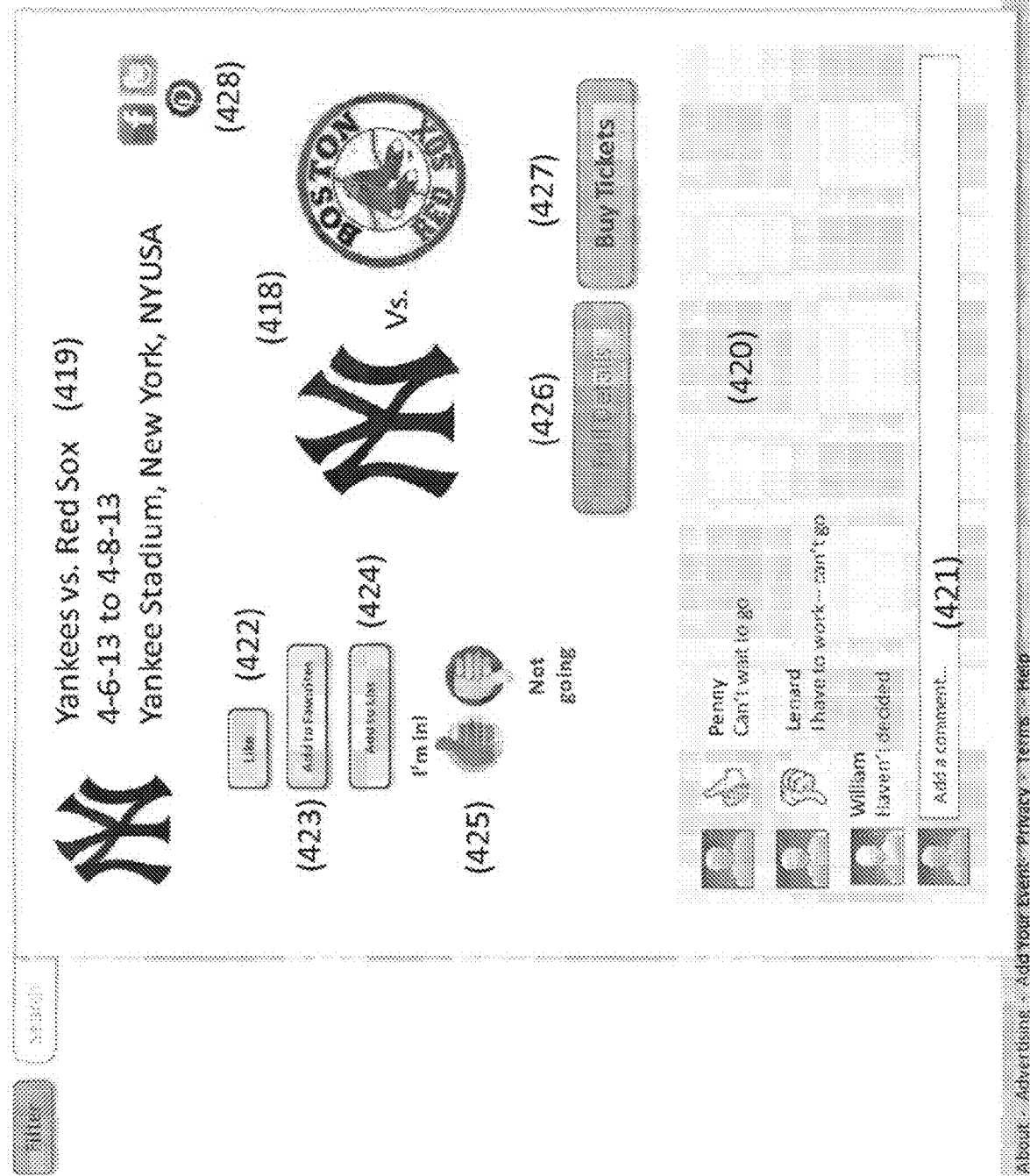
Figure 4E:
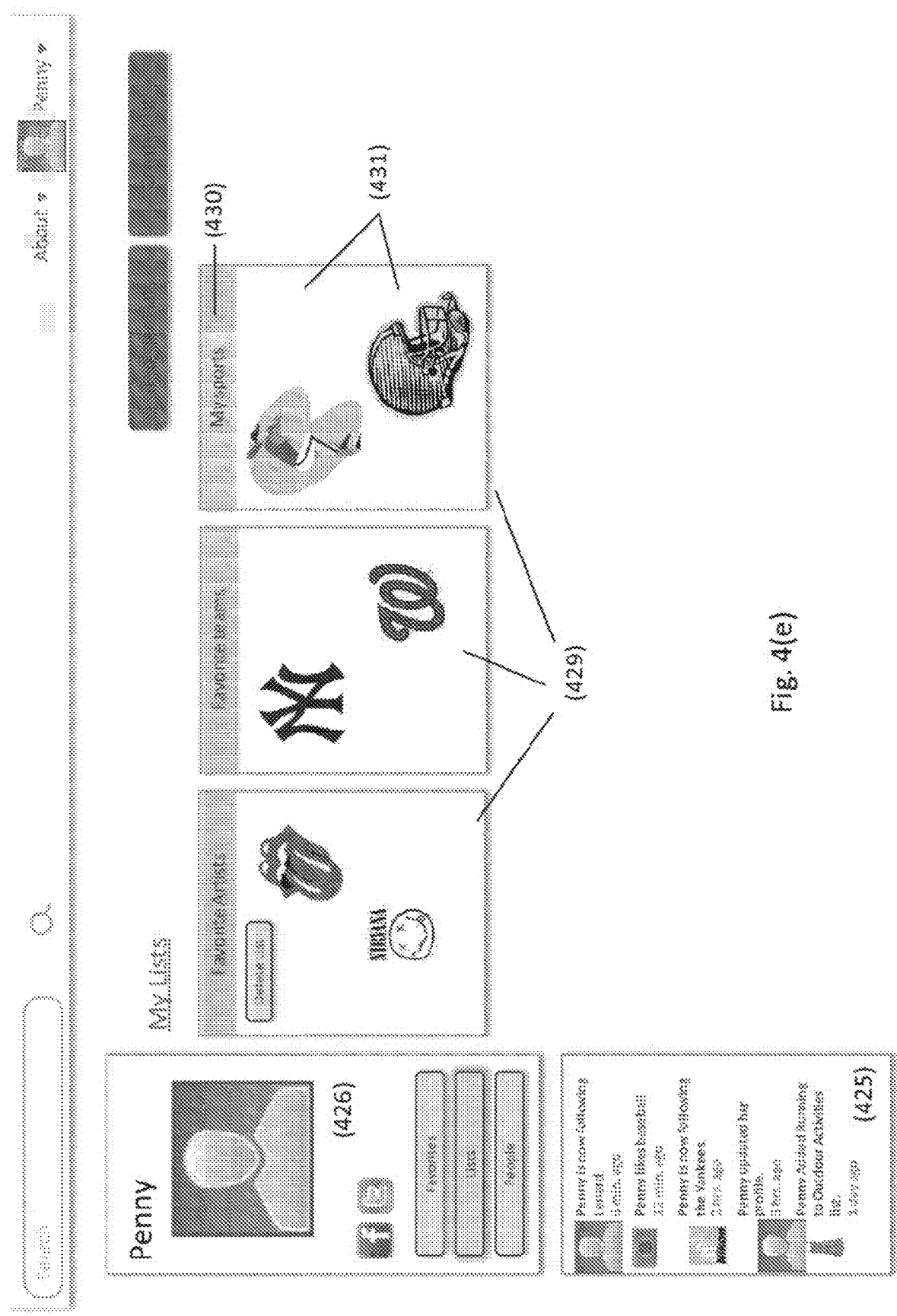
Figure 4F:
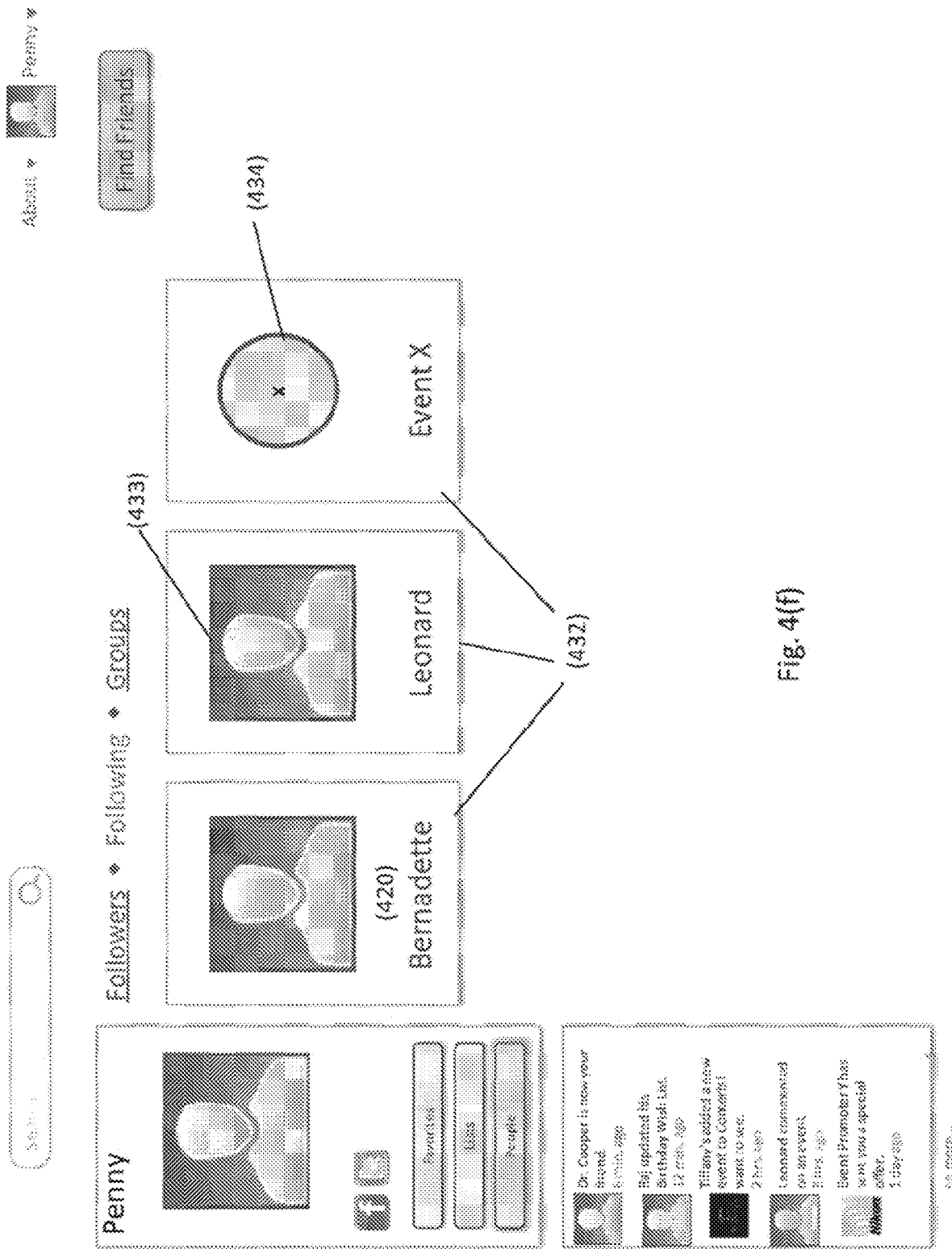
Figure 4G:
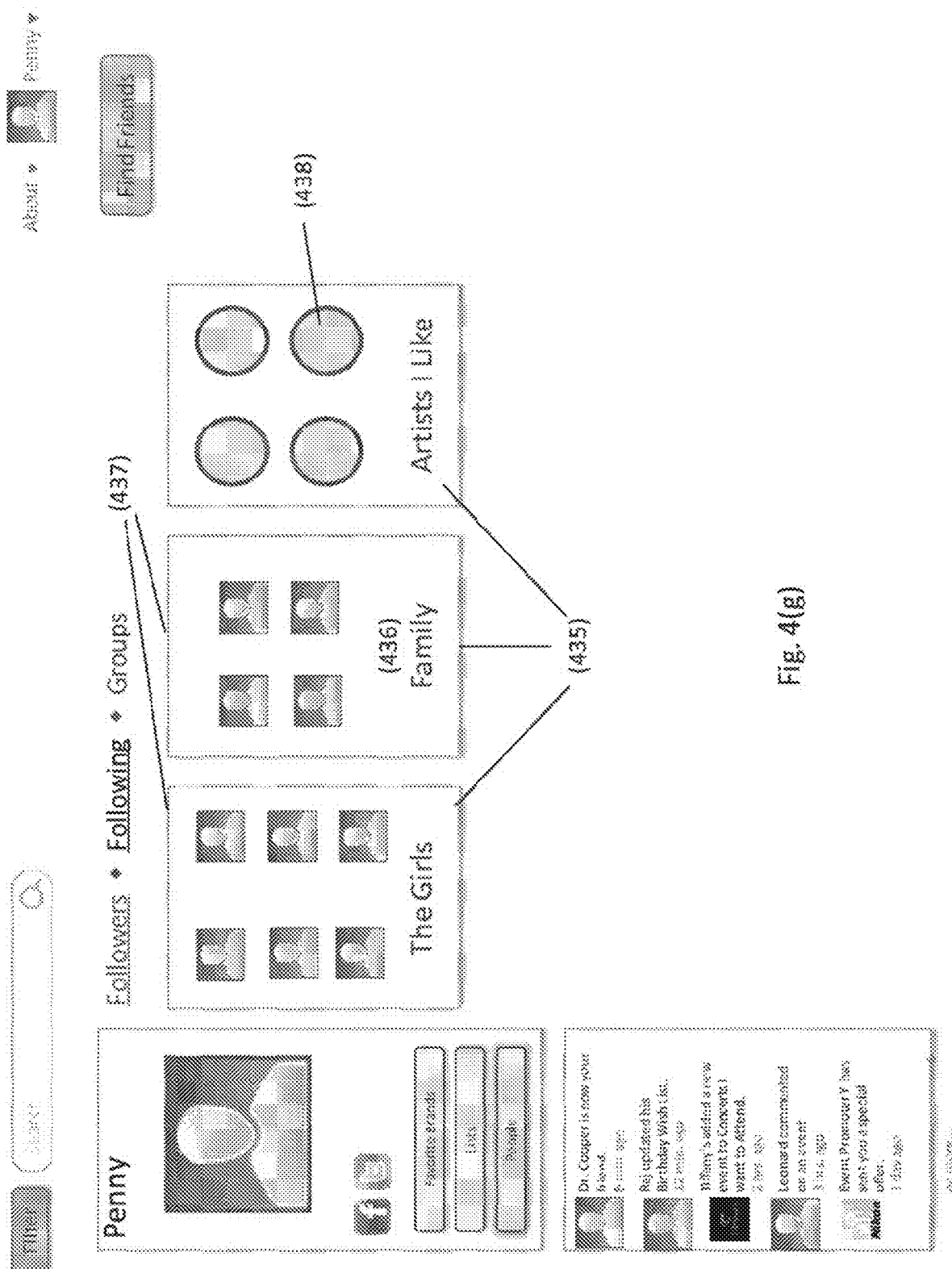

A more detailed view of a data object representation is shown in FIG. 4(d), wherein that data object representation includes a selectable common visual representation of an event, including an event image (418), a title (419), and a commentary field (420), including comments from contacts or followers of the individual consumer-user, including the event promoter that supplies the event depicted in the data object representation, as well as a field that can be selected by the user to add a comment to the commentary field (421). Each data object representation can also include icons (422-424) that the consumer-user can select to indicate a preference for that data object (e.g., "like" (422), "add to favorites" (423), "add to list" (424), or "follow" (not shown)). Moreover, each data object representation also includes a selectable attendance icon (425), which is optionally associated with a drop down menu or another selection mechanism that enables the consumer-user to identify one or more contacts or followers he/she will allow to view the attendance icon, if selected (not shown). The data object representation also includes a link to a more detailed explanation of the event (426), a link to an outlet to purchase tickets to that event (427), as well as one or more icons to social networking sites on which the consumer-user can share the event (428).

FIG. 4(*e*) illustrates one embodiment of a screen a consumer-user can access via the landing page (e.g., via a drop-down menu under the consumer-user icon or username (not shown) to provide more detail regarding one or more lists the consumer-user has created in the system. Each list is represented by a data object representation (429), and that data object representation can include a name for that list (430) and optionally one or more images of events included in that list (431). Another screen a consumer-user can access via the landing page is shown in FIG. 4(*f*), which includes more detail regarding one or more individuals and/or event promoters the consumer-user follows on the system and/or one or more individuals and/or event promoters that follow the consumer-user on the system. Each individual or event promoter is represented by a data object representation (432) and the data object representation can include the individual or event promoters name and optionally, an avatar (433) or event promoter logo or trademark (434). Moreover, the consumer-user can also access a screen via the landing page that includes more detail regarding groups of individuals and/or event promoters the consumer-user follows on the system and/or one or more individuals and/or event promoters that follow the consumer-user on the system (FIG. 4(*g*)). Each group of individuals or event promoters is represented by a data object representation (435) and the data object representation can include the group name (436) and optionally, one or more avatars (437) or event promoter logos or trademarks (438).

As noted above, a consumer-user can interact with one or more contacts on the system, e.g., by sharing events or event promoters with contacts or followers, by adding to and/or commenting on a data object representation, etc. In one specific embodiment, a consumer-user can also use the system to solicit comments from one or more contacts or followers regarding one or more event or event promoter data object representations in which the consumer-user is interested. For example, if a consumer-user is considering a purchase of tickets to two or more events, he/she can share those event pages with one or more contacts or followers via the system and ask those contacts or followers to vote for or otherwise comment on the event or event promoter he/she should purchase. In one embodiment, the system offers a voting mechanism that can be sent via the system from a consumer-user to one or more contacts or followers, and the voting mechanism enables the one or more contacts or followers to indicate which event or an event of an event promoter the consumer-user should attend. In addition, the voting mechanism also includes a field that allows the one or more contacts or followers to comment on the event offerings.

Likewise, the system displays events/event promoters in a variety of formats, including but not limited to, a grid, list, slide show, and/or carousel format, and the system allows the consumer-user to page through events/event promoters in the display. The system can display the total number of events and/or the consumer-user can specify the number of events that can be viewed on a given page. The system can display featured and/or unreleased events in a visually distinguishable way in the displayed format from other events. In a slide show and/or carousel format, the consumer-user can view the slide show in full- or partial screen mode. Any of the display formats include a feature to navigate from the selected view to the event details page, as well as, bookmarking an event so as to create a redacted list of events to be viewed in detail at a later time. In addition, the slide show and/or carousel formats includes navigation controls that enable the consumer-user to go to the beginning and end of the slide show, go forward and reverse one event page in the slide slow, continuously play and/or pause the slide show. Any of the display formats can also provide a Quick View button over the event image when the consumer-user moves his/her cursor/mouse over the event. The Quick View can display a popup sub-display containing an abbreviated list of event details and the Quick View also enables the consumer-user to navigate from the Quick View to the full event display page.

In addition, any of the landing pages described herein can display a sampling of information about additional consumer-users of the system, including but not limited to contacts, followers, celebrities, subject matter experts, and critics. In one embodiment, a consumer-user can select the categories of additional consumer-users that the system displays on the landing page. In addition, the consumer-user can identify specific additional consumer-users he/she wants displayed on the landing page, e.g., certain specific contacts, followers, celebrities, subject matter experts, and/or critics, or a select group of contacts, followers, celebrities, and/or critics. Alternatively, the system can randomly select additional consumer-users that can be displayed on the landing page, e.g., in the absence of instructions from the consumer-user. For example, the system can randomly display information regarding contacts or followers from the consumer-user's contacts data table and the system can periodically rotate the display of information regarding contacts from the contacts data table on the landing page, e.g., changes can be implemented by the system each time the consumer-user logs into the system, daily, weekly, monthly, etc. Similarly, the system can randomly display information regarding celebrities, subject matter experts, and/or critics, e.g., celebrities, subject matter experts, and/or critics that have identified certain events and/or event promoters identified by the consumer-user in his/her preferences. The system can periodically rotate the display of information regarding celebrities and/or critics on the landing page, e.g., changes can be implemented by the system each time the consumer-user logs into the system, daily, weekly, monthly, etc.

The system can display a collection of featured events based on one or more system criteria. For example, the system can display a collection of events most viewed/searched by system consumer-users, ranked e.g., by a combination of criteria selected from the number of event page viewings, the number of times the event page is added to a preferred event list by system consumer-users (e.g., a favorite, wish, watch, and/or gift list), the number of times the event page is bookmarked by system consumer-users, and/or consumer-user ratings for the event. The system can also display a collection of events having the highest ratings provided by system consumer-users. Moreover, the system can display a collection of events recommended by a consumer-user based on the consumer-user's profile. Consumer-users can filter the results of these event collections, in ascending or descending order, based on one or more of the following criteria: event promoter, price, average review, relevance to a search criteria, release date, etc., and a consumer-user can display the collection or a filtered view of the collection in a grid, list, carousel, or slide show presentation view.

The system can also display a list of all event promoters available on the system. The data table can be organized alphabetically and/or by interest category/subcategory. Consumer-users can perform a keyword search of event promoters and events in the all event promoter data table and the consumer-user can filter the event promoter data table and/or the results of a keyword search based on the following criteria: event/event promoter category, time, price, average customer review, relevance, release date, etc. A consumer-user can display the all event promoter data table or a filtered view of the data table in a grid, list, carousel, or slide show presentation view.

The system allows the consumer-user to search the site, including the event/event promoter pages and all related content using keyword searches. The system can segregate the search results by the following content types: event promoters, events, articles, reviews, blogs, etc. For each content type, the number of search results for that type are displayed and the search results for each content type are displayed in a list format. The display of event promoter search results can include a picture of the event promoter logo, the event promoter name, and a description of the event promoter, among other information. The consumer-user can view the event promoter's page by clicking on the event promoter logo or the name of the event promoter. The display of event search results can include in or more of the following attributes: one or more event images, the event name, a description of the event, the price, average event rating, and the number of ratings. The consumer-user can to view the event details page for an event by clicking on either the event picture or the event name. The display of results of searching within articles can include a picture of the author, if provided, the author name, the title of the article, the date the article was written, and an introduction to the article. The consumer-user can view the entire article by clicking on the title of the article. The display of results of searching within event reviews can include a picture of the event being reviewed, the name of the event, the reviewer's name or alias, the date the review was written, and an introduction to the review. The consumer-user can view the entire review by clicking on the title of the review. The display of results of searching within blogs can include a picture or avatar of the blogger, the blogger's name or alias, the date the blog was written, the blog title, and an introduction to the blog. The consumer-user can view the entire blog by clicking on the title of the blog.

The system is configured to send consumer-users notifications regarding new events/event promoters and/or new information about events and/or event promoters and the consumer-user can receive such notifications via any of a variety of methods. In one embodiment, such notifications are modifications to event or event promoter data objects, including derivative data objects, and those modified data objects are displayed in the consumer-user GUI in reverse chronological order, as described above. Alternatively, the GUI can be displayed in a calendar view, in which case, a notification regarding an event would be displayed on the data object representation for that event on that day in the calendar. In addition or alternatively, the system can also notify a consumer-user by email, text messaging and/or private messaging. The system can also send a notification to a consumer-user in a social networking site, e.g., Facebook, Twitter, Friendster, MySpace, etc. An additional system consumer-user or event promoter can send the consumer-user a variety of notifications, including but not limited to: (a) a consumer-user of the system can send an additional consumer-user a message regarding an event, an interest category, an event promoter, an event promoter category, etc.; (b) an event promoter can send the consumer-user a message regarding new information related to an event, the event promoter, an interest category, etc. and/or an event promoter can send the consumer-user a message regarding a new event and/or category of events available (in a preferred embodiment, the event promoter can instruct the system to send a group of consumer-users that have expressed a preference for an event promoter or event promoter event, rather than giving an event promoter access to individual consumer-user's contact information); (c) a consumer-user can receive a friend invitation; (d) a consumer-user can receive a notification that another consumer-user and/or event promoter has elected to follow that consumer-user; (e) a consumer-user can receive a notification regarding a friend's or follower's impending birthday, anniversary, or the like; (f) a consumer-user can receive an invitation to join the system and/or to join an event promoter or event club; (g) a consumer-user can receive a notification that an event promoter has been added to an additional consumer-user's preferred event promoter data table, e.g., a friend or follower of the consumer-user; (h) a consumer-user can receive a notification that an event category has been added to a friend's or follower's preferred event data table; (i) a consumer-user can receive a notification that an event has been added to a friend's or follower's preferred event data table; (j) a consumer-user can receive a notification that an event has been added to a friend's or follower's wish, watch, and/or gift list; and/or (k) a consumer-user can receive a notification that a friend or follower has commented on, posted an event review and/or blog entry for, and/or suggested an event and/or event promoter. Moreover, a consumer-user can filter the notifications they receive in a variety of ways, including but not limited to: (a) received from a particular consumer-user; (b) received from a particular event promoter; (c) date; and (d) regarding a particular event/event promoter in the consumer-user's preferred event/event promoter data table; in ascending or descending order.

It will be understood that the components described above can be organized and depicted in a user-interface in a variety of ways, but such variations fall within the full scope of the invention. Moreover, various additional features can be included in the homepage, e.g., advertising materials, featured events, event promoters, additional consumer-users, additional links to the consumer-user's profile, one or more consumer data tables, additional system browsing features, etc., and such additional features are within the full scope of the invention.

Event Promoter Profile & Interface

Event promoters also create an event promotional system profile that includes event promoter information, including but not limited to the event promoter's name, contact information, website and a link thereto, email, and password, as well as a list of authorized event promoter-users of the event promoter profile. The event promoter can designate one or more event promoter managers or users (referred to herein as "event promoter-users"), e.g., an individual or group of individuals authorized to access and/or modify the event promoter profile or components thereof, and the event promoter profile will also include contact information, e.g., a name and email, and a password for each event promoter-user. An event promoter can also include an event promoter identifying key or password used to identify the event promoter or an event promoter-user if one or more of verifiable credentials are not provided at login to the system.

Figure 5A:
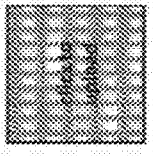
FIGS. 5(a)-(c) illustrate one embodiment of how an event promoter can create a profile on the system.

As shown in FIG. 5(a), in one embodiment, the event promoter establishes a profile on the system using a designated event promoter name, a website URL, and optionally one or more event promoter logos or trademarks and event lists. Much like the consumer-user's ability to create one or more lists, an event promoter can also organize its events in one or more lists grouped by the event promoter, e.g., current, discontinued, new, sale, and future event lists. Optionally, an event promoter can create one or more event promoter interest categories (not shown), including a description for each interest category, or in an alternative or additional embodiment, the event promoter can adopt one or more event promoter event categories created by the system to list the event promoter events on the system. For each event, an event promoter can create a data object that includes the common visual representation of an event or event promoter described above, as shown in FIG. 5(b). The data object includes one or more of the following: an event name (501), a description (502), an image 5603), optional additional media (504), e.g., videos, additional images, supporting documentation, etc., interest categories lists in which the event is included (505), one or more links to purchasing options (507), and a website URL for the event promoter (or authorized retailer or reseller) that offers the event (508). Preferably, each data object on the system regardless of origin includes an event image, event name, event price, and a commentary field (not shown; the commentary field is preferably automatically incorporated into the data object by the system once the data object is created by the event promoter). If selected by a consumer-user, the data object representation will display additional information regarding the event, e.g., a more detailed description of the event, additional media, purchasing options, a website URL for the event promoter, event ratings, etc. Event information that can be included in an event data object includes but is not limited to: an event identifier, optional SKU and/or custom identifier, a description of the event, an event image, event media (e.g., event-specific video and audio files as well as print media), retail price, shipping and handling information, sales, coupons, etc., advertising materials, event reviews and/or ratings, discussion forums, event-related news and events, instructions for use and/or assembly, associated/related events and/or accessories offered by the event promoter and/or an associated event promoter, event statistics, the identity and contact information for authorized retailers and/or resellers, authorized service providers for a given event or event promoter (e.g., for event assembly or after-market detailing), etc., event-specific supporting documents and information, e.g., an event insert, specifications, manual, instructions, literature references, reviews, blog links, links to discussion forums, etc., purchasing information including but not limited to price, coupons or discounts offered by the promoter, authorized ticket retailer and/or wholesaler, the identity and contact information for an authorized ticket retailer, wholesaler, and/or distributor, warrantee information, etc. In a specific embodiment, some of the information listed above for a given event may only be available to members of an event promoter or event club (described in more detail herein). For example, certain promotional opportunities may only be accessed by or offered to event and/or event promoter club members, e.g., coupons, discounts, etc.

In a preferred embodiment, a data object related to an event can include one or more event trademarks, event description information, event media, event purchasing information, event retail information, event promotional information, related first event promoter products, or combinations thereof; the event description information can comprise an event image, one or more event-specific supporting documents and information, one or more event reviews, an event rating, or combinations thereof; the event media may include an event-specific video file, an event-specific audio file, or print media; and the event-specific supporting documents and information comprises one or more literature references, reviews, blog link, press release, forum link, or combinations thereof.

Figure 5B:
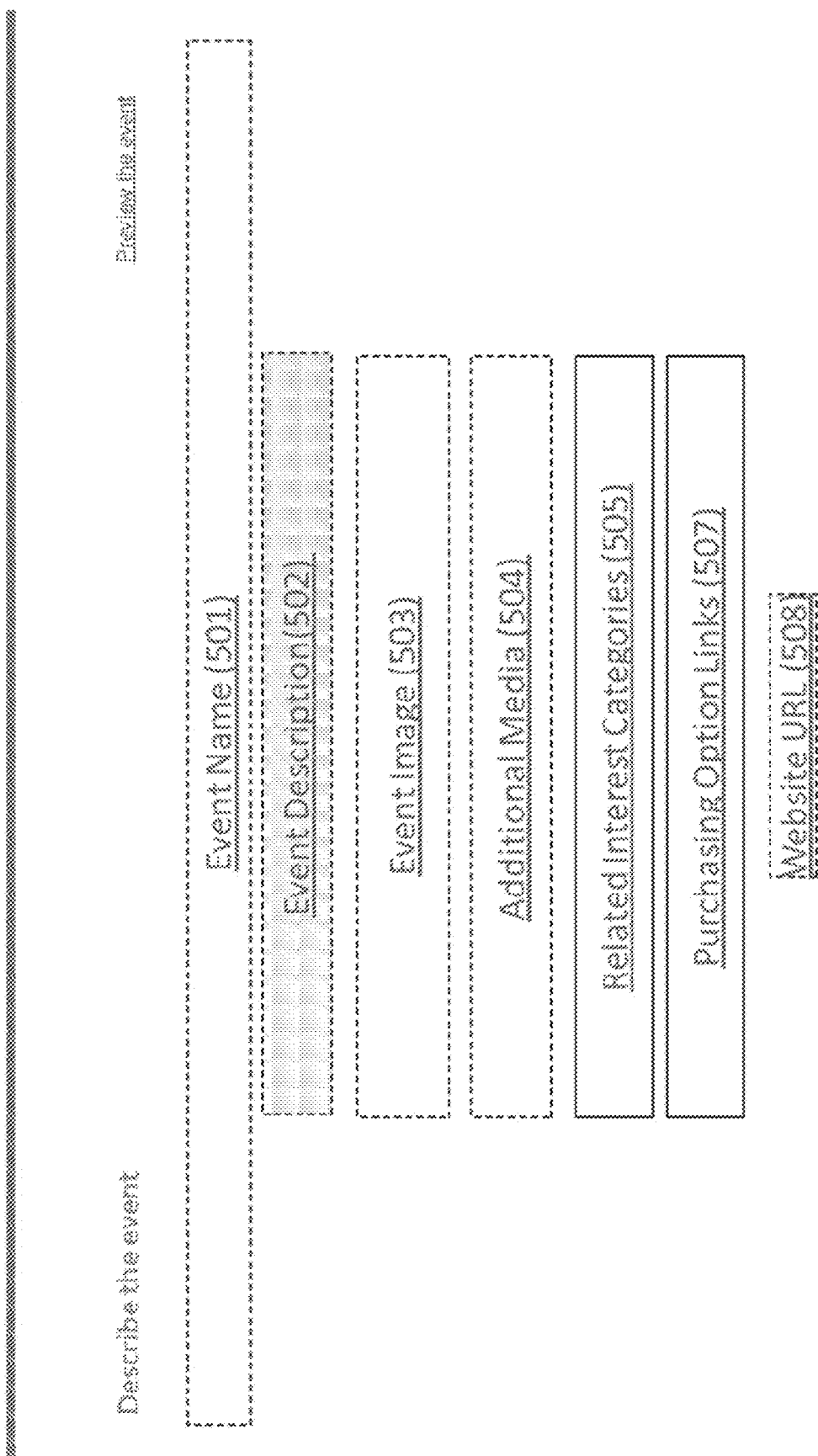

In addition or alternatively, as described above, a consumer-user of the system can create an event data object using, for example, the process illustrated in FIG. 5(b) and described above.

Figure 5C:
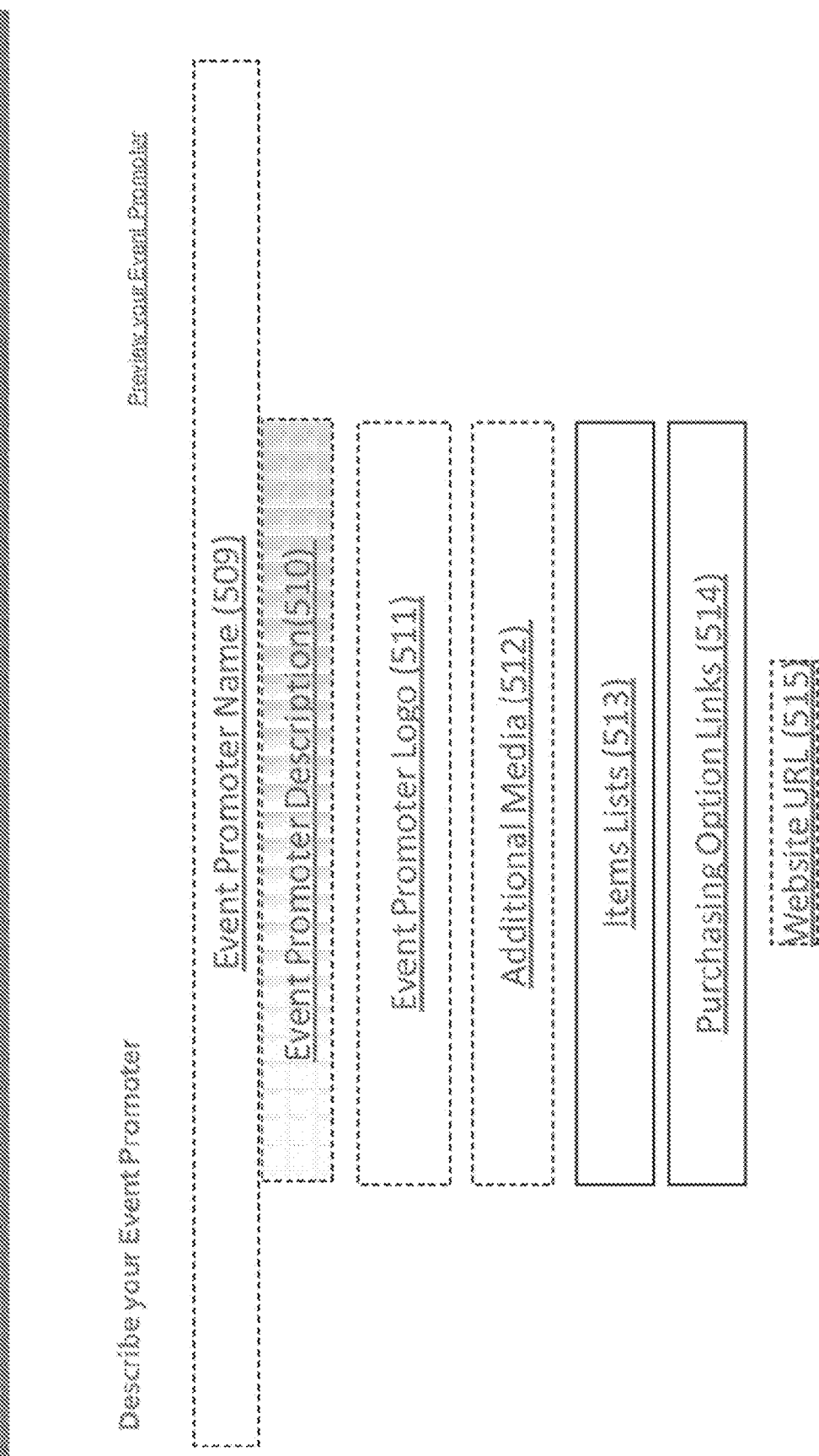
Figure 6A:
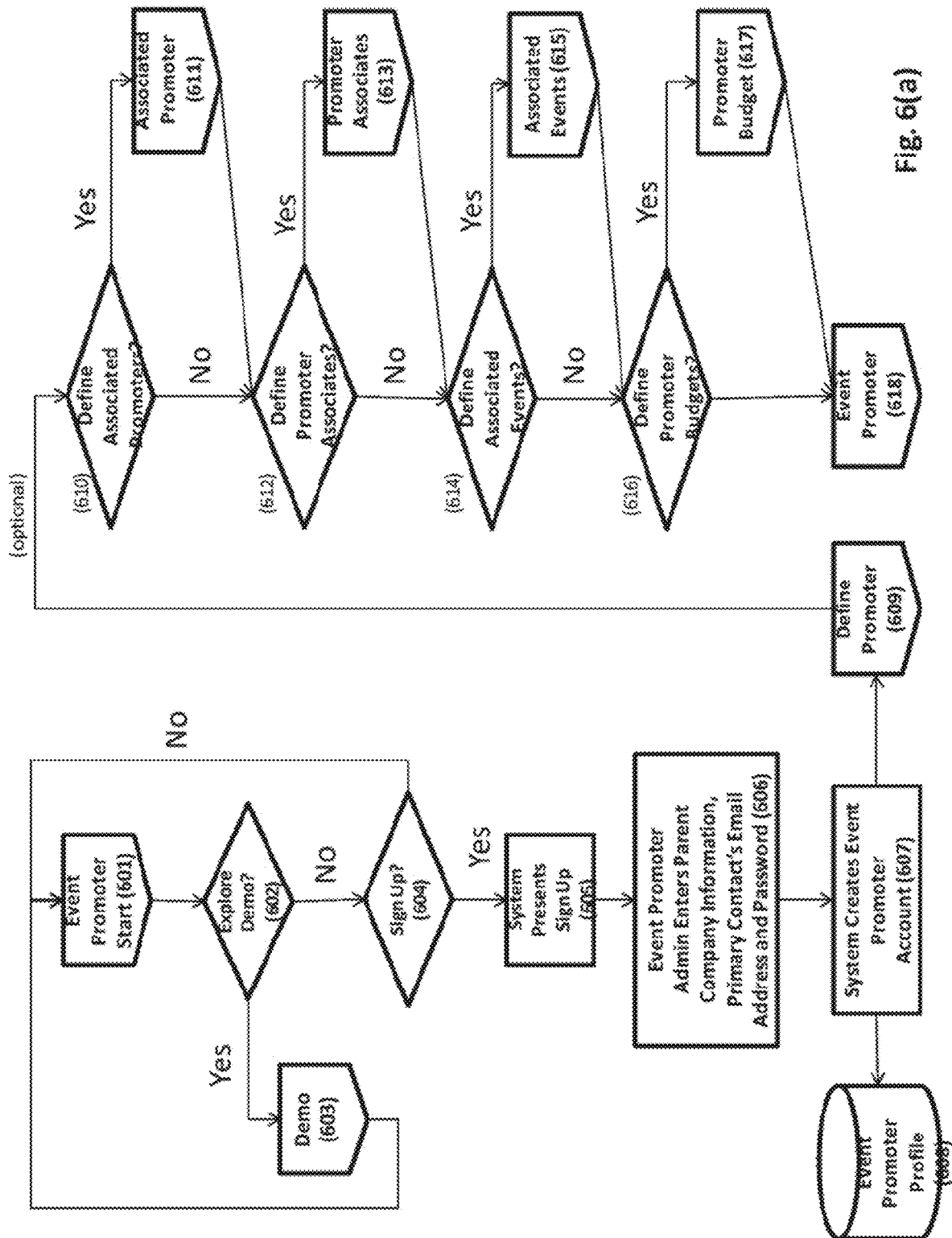
Figure 6B:
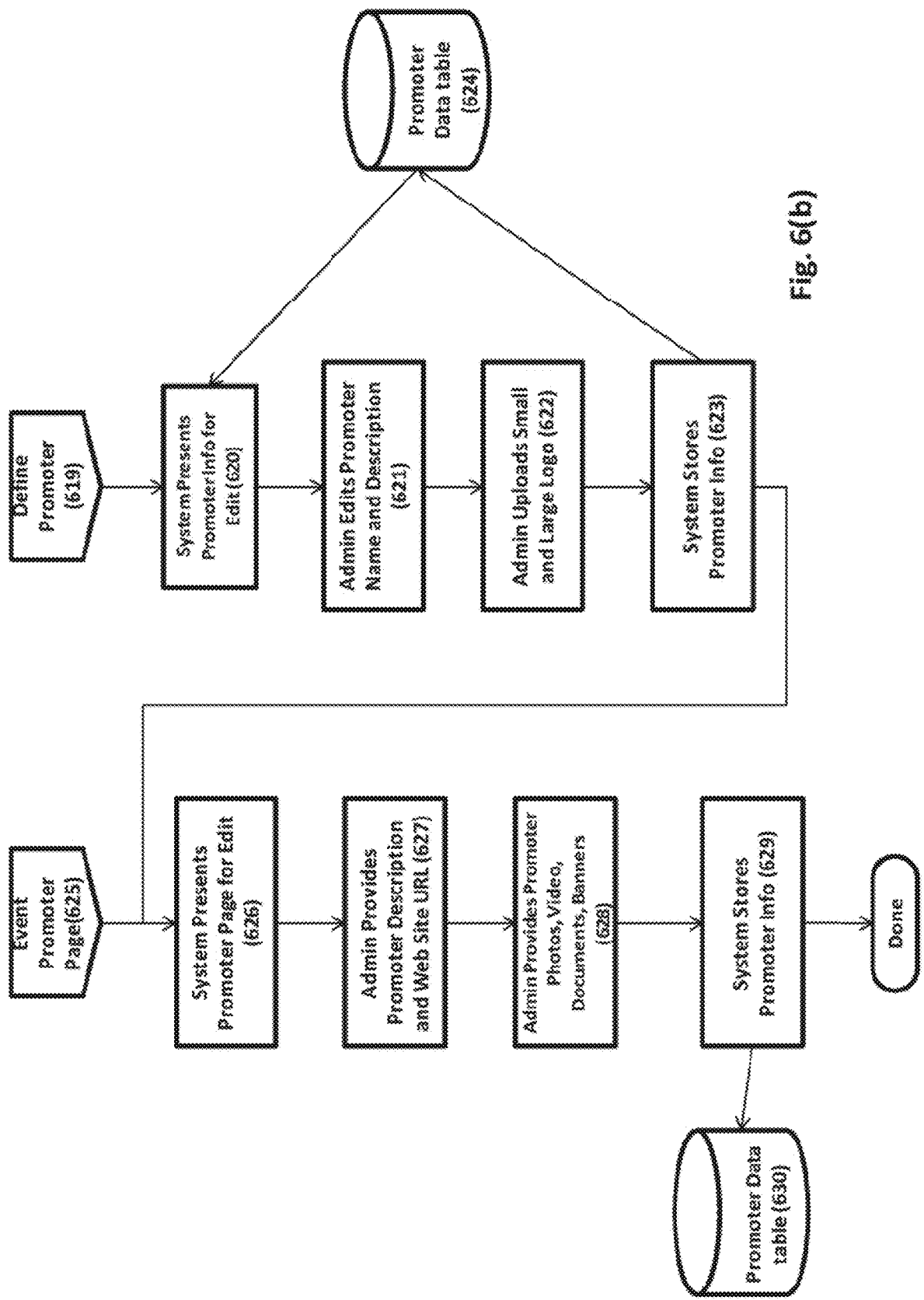
Figure 6D:
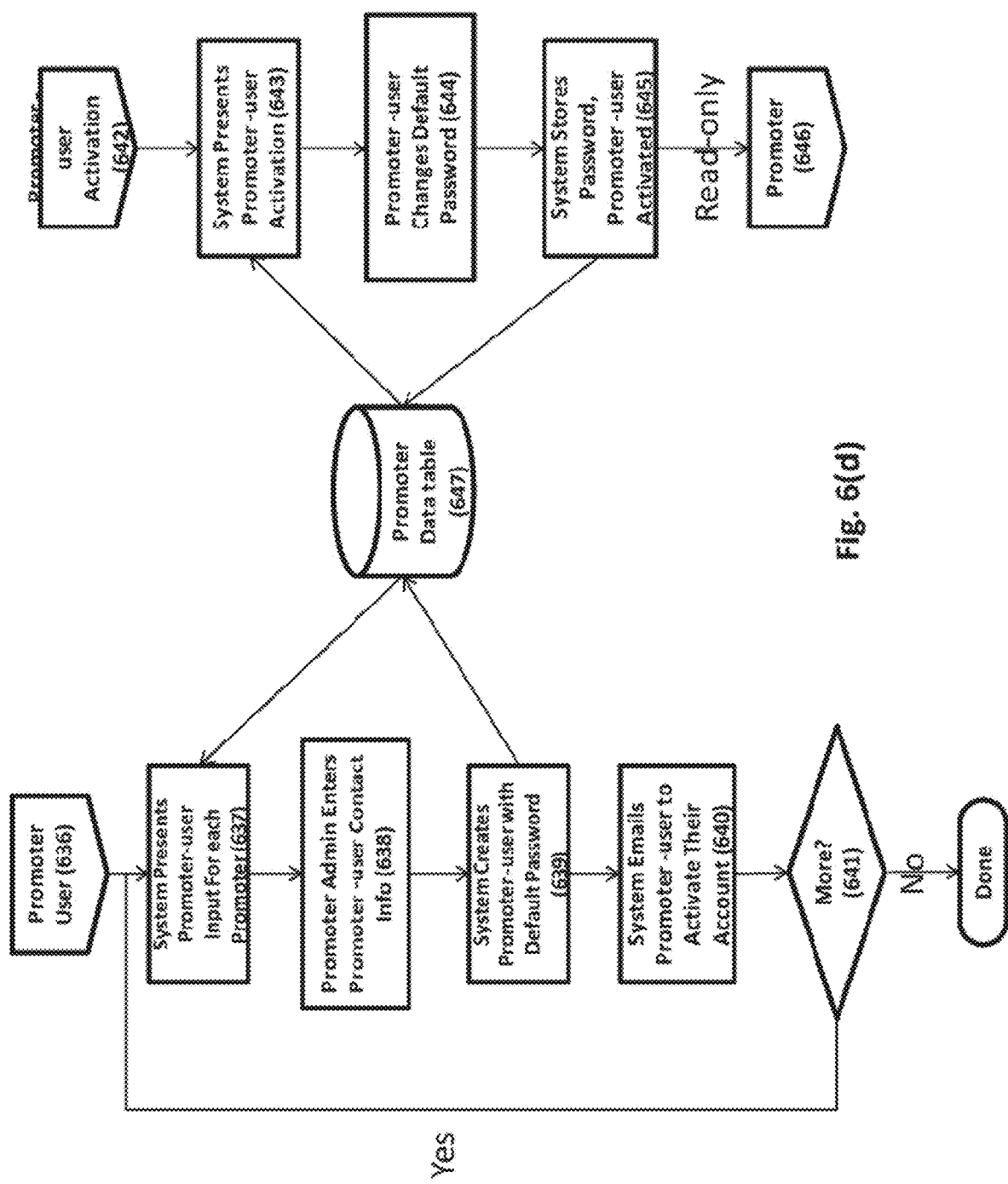
Figure 6E:
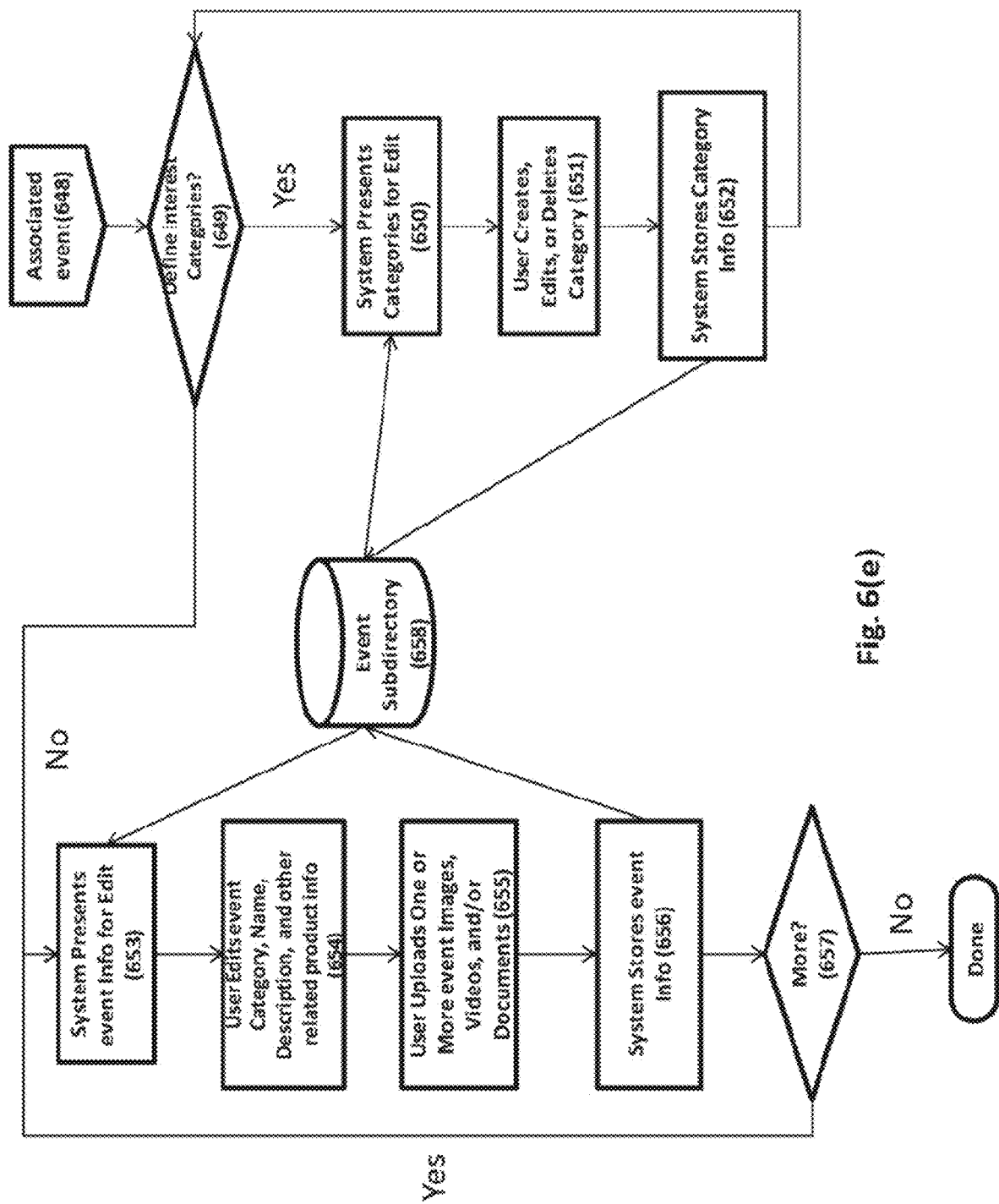
Figure 6F:
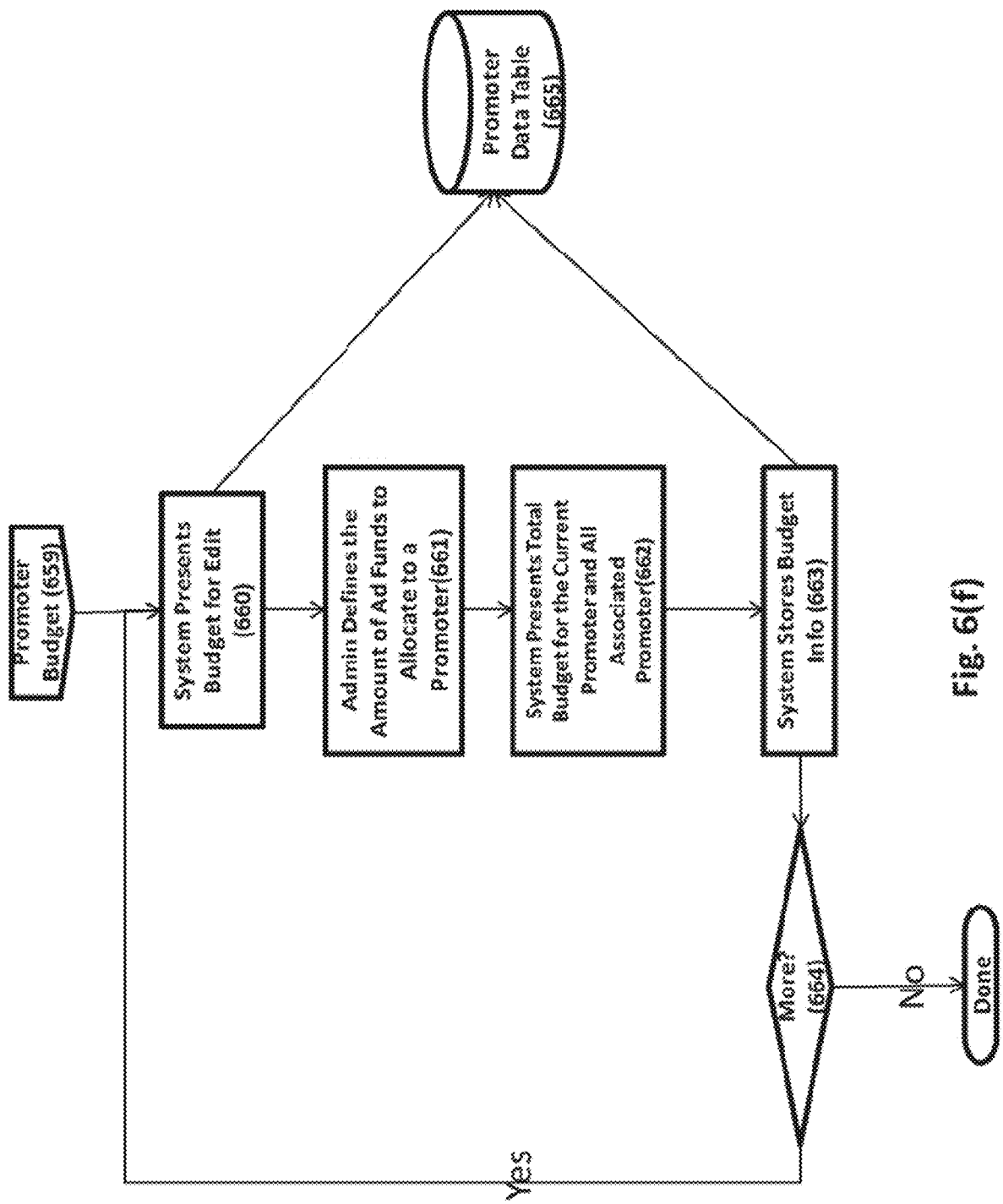

An event promoter can also create an event promoter data object as shown in FIG. 5(c), which includes an event promoter name (509), event promoter description (510), event promoter logo or trademark (511), additional event promoter media (612), event lists (513), purchasing option links (514), and a website URL (515). The event promoter data object can also include one or more interest categories associated with that event promoter (not shown). The purpose of an event promoter data object is distinct from that of an event data object in that the latter is designed to provide the viewer with information about a single event, whereas an event promoter data object is designed to give the viewer general information about the event promoter, e.g., the types of event or services they offer, their logos or trademarks, where their events can be purchased, etc. The event promoter data object can be accessed via one or more hyperlinks on the system, e.g., by selecting the event promoter name or event promoter icon under the list of event promoters available on the system.

Much like an event data object, each event promoter data object on the system regardless of origin includes an image, e.g., an event promoter logo or trademark, an event promoter name, and a commentary field (and like the event data object, the commentary field is preferably automatically incorporated into the data object by the system once the data object is created by the event promoter). If selected by a consumer-user, the event promoter data object will display additional information regarding the event promoter, e.g., a more detailed description of the event promoter, additional media, purchasing options, a website URL for the event promoter, event promoter ratings, etc. Information that can be included in an event promoter data object includes but is not limited to: a list of event promoter events, event promoter media (e.g., video and audio files as well as print media), sales, coupons, etc., advertising materials, event reviews and/or ratings, discussion forums, event promoter-related news and events, associated event promoter(s), event promoter statistics, the identity and contact information for the event promoter and/or for authorized retailers and/or resellers, authorized service providers for a given event or event promoter, etc., the identity and contact information for an authorized ticket wholesaler and/or distributor, etc. In a specific embodiment, some of the information listed above for a given event promoter may only be available to members of an event promoter or event club (described in more detail herein). For example, certain promotional opportunities may only be accessed by or offered to event and/or event promoter club members, e.g., coupons, discounts, etc.

In a preferred embodiment, an event promoter data object can include: one or more event promoter trademarks, one or more event promoter logos, one or more commercial event logos, event promoter description, interest categories associated with event promoter, event promoter media, event promoter purchasing information, retail information, event promoter promotional information, information related event promoters within the event promoter portfolio, related event promoter description, related event promoter products, or combinations thereof. The event promoter description information can include an event promoter image, one or more event promoter-specific supporting documents and information, one or more event promoter reviews, an event promoter rating, or combinations thereof; event promoter media can include an event promoter-specific video file, an event promoter-specific audio file, or print media; event promoter-specific supporting documents and information can include one or more literature references, reviews, blog link, press release, forum link, or combinations thereof.

Alternatively or additionally, the event promoter has the option of creating a stand-alone event promoter page that is directly accessible on the system via one or more hyperlinks, e.g., by selecting the event promoter name or event promoter icon under the list of event promoters available on the system. The event promoter page optionally includes an event promoter banner an event promoter description, event promoter media (including but not limited video files and pictures, as well as audio files, press releases, etc.), featured event categories, featured events, event lists, and avatars of one or more individuals that like the event promoter, e.g., celebrity endorsements or subject-matter experts in the relevant field. The event promoter page can also be customized to include additional information, including but not limited to a listing of one or more event promoter trademarks or service marks, event promoter retail information, event promoter event distributors, an event promoter description, event promoter media, event promoter events, an event promoter portfolio, etc. An event promoter page can be viewed by any consumer-user of the system, with a system profile or not, or the event promoter page can be configured to be viewed only by those consumer-users of the system that follow the event promoter or an event promoter event.

An event promoter can be a corporate event promoter, an umbrella event promoter, a family event promoter, and combinations thereof, in which case, the event promoter can include one or more related event promoters (alternatively referred to herein as "event promoter associates"), e.g., an endorsed event promoter, a sub-event promoter, an individual event promoter, and combinations thereof. Therefore, the event promoter page can include additional information regarding one or more event promoter associates. The event promoter description can include but is not limited to, an event ontology, a target market description, and combinations thereof. The event promoter information can further include advertising materials, event promoter reviews and/or ratings, discussion forums, event promoter-related news and events, event promoter statistics, the identity and contact information for authorized retailers and/or resellers, authorized service providers (e.g., for event assembly or aftermarket detailing), etc. The event promoter can include literature references, blog and/or discussion forum links, etc. The event promoter information can include event promoter media including but not limited to video files, audio files, print media and press releases. The event promoter page can be accessed via one or more hyperlinks on the system, e.g., by selecting the event promoter name or event promoter icon under the list of event promoters available on the system.

An event promoter may opt to highlight certain promotional offers for an event or event promoter by creating an event or event promoter data object that includes an indicator in the visual representation to reflect the fact that that event or event promoter is associated with a promotion, e.g., event data object representations of discontinued events can be displayed in different color scheme than those of non-discounted events, etc. Likewise, the data object representations of new events recently created by the event promoter can include a color scheme that differentiates those data object representations from other data object representations on the system. If tickets to an event will be discounted in the future, the event promoter can add a comment to the data object representation and/or alter the data object content to notify consumer-users interested in that event that it will soon be discounted. Data object representations of discounted or sale events can also include icons designed to indicate the time and/or quantity remaining for that discount or sale, e.g., a clock or time appears on the data object representation that counts down the remaining time for that discount or sale and/or counts down the quantity of events available at that discounted price. In an alternative or additional embodiment, an event promoter can also create a specialized event promoter page focused on one or more event categories, e.g., promotional, discontinued, new, sale, and/or future events.

Optionally, the system allows the event promoter to promote its events in various ways. For example, the event promoter can elect to allow the system to feature the event promoter, which authorizes the system to prominently display event promoter advertising and/or events in a featured events section of the GUI. For example, featured events can be displayed in a consumer-user's GUI if he/she has expressed interest in the corresponding interest category, in general advertising for the system, in the profile set-up process as described above, etc., and each of these methods of featuring an event may garner the same or a different fee. In one embodiment, the event promoter pays an extra fee for this service. Alternatively, the event promoter can compete with other event promoters on the system to be displayed in the featured event promoters section of the system, e.g., by a competitive bidding process based e.g., on a bid offered by the event promoter in terms of a value of cost per click. One or more mechanisms for featuring an event promoter or event can be provided by the system and there can be an additional fee associated with each type of featuring mechanism, for a group of featuring mechanisms (e.g., for one price the event promoter can feature its events in a variety of ways), or for all featuring mechanisms offered by the system (e.g., for one price the event promoter can feature its event using all featuring mechanisms offered by the system).

The event promoter can also specify security settings that enable the event promoter to segregate certain categories, data tables, and/or data tables of information provided in the event promoter profile from view from consumer-users of the system. For example, while event listings can be viewable by a consumer-user of the system, event promoter profile, inventory, and supply information may only be available to one or more designated event promoter users. Likewise, an event promoter can also specify security settings that enable the event promoter to grant view only or full access of one or more event promoter-users to certain categories, data tables, and/or data tables of information provided in the event promoter profile.

The creation of an event promoter profile on the system is further illustrated in FIG. 6(*a*). An event promoter creates a profile (601) and optionally views a demonstration of the system (602, 603). The system presents a sign-up screen (605), which allows the event promoter administrator and/or an authorized event promoter user to enter pertinent information about the event promoter, e.g., parent company information, contact information, password information, etc. (606). The system creates an event promoter profile (607) which is stored to the collective event promoter data table (not shown) in an individual event promoter data table (608). The event promoter can add information to the profile regarding the event promoter (609), e.g., the ability to define associated or related event promoters (610-613), associated events (614-615), and a budget for use of the system, e.g., for advertising and marketing on the system by the event promoter (616-617). This information is stored to the event promoter profile (618) in the event promoter data table.

As shown in FIG. 6(*b*), an event promoter can also edit event promoter information in the event promoter profile (620-621), include logos, associated images, and event promoter media (622), etc., which is stored to the event promoter data table. The event promoter can optionally create an event promoter page (625) that can be edited to include event promoter-defined content, websites, and media (626-628), which is also stored to the event promoter data table (630). FIG. 6(*c*) shows that each associated event promoter (631) can also be defined as described above and the content of the associated event promoter profile can also be adjusted by the event promoter administrator and/or an authorized event promoter-user and stored to the event promoter data table. The event promoter-administrator and/or authorized event promoter-user also has the ability to modify access of one or more additional event promoter-users of an event promoter profile, as illustrated in FIG. 6(*d*). The event promoter administrator enters contact information for each authorized event promoter-user and the system creates credentials for that event promoter-user to enable the event promoter-user to activate the profile and be associated in the system as an authorized user for the event promoter (636-641). The identity and login information for each authorized event promoter-user is stored to the event promoter data table (647). In addition, each event promoter-user activates his/her profile on the system (642), by viewing an activation screen (643), and changing the default system password (644). That information is stored to the system in the event promoter data table (645, 647).

An event promoter (and/or consumer-user) can create an event data object as illustrated in FIG. 6(*e*). The system queries the event promoter administrator and/or authorized event promoter-user for event information (653) and the user (event promoter-user if created by an event promoter or consumer-user if created by a consumer-user) edits the event information (654-655), which is stored to the event promoter data table (658). The system allows the event promoter to define interest categories and subcategories (649-651), which are stored to the event promoter data table. Similarly, as shown in FIG. 6(*f*), an event promoter can define a budget for use of the system (659), which can be edited, further defined, and stored to the event promoter data table (660-665).

In one embodiment, based on the information provided for the event promoter profile, the system will configure an event promoter landing page that allows consumer-users to browse event promoter events, event promoter information, etc. The event promoter landing page can be automatically configured by the system or customized by the event promoter as described above, e.g., to display certain event promoter advertising, banners, trademarks, service marks, etc., in a manner designated by the event promoter. The event promoter landing page can display event promoter events or event categories randomly or based on event or category popularity (as defined by event page viewings, event purchases, or another event classification mechanism). The event promoter landing page can include an event promoter club link to an event promoter club website available only to members of the event promoter club. The event promoter landing page can also display a random sample of consumer-users that have added their event promoter or an event promoter event to their consumer-user profile, if permitted by the consumer-user. In addition, the event promoter landing page can display one or more of the following: the number of consumer-users who have added the event promoter or an event promoter event to their favorites, the number of consumer-users that have followed the event promoter, the number of consumer-users and/or other event promoters the event promoter follows, a list of its most popular events, a sample of its event categories, a hyperlink to the event promoter's website, a hyperlink to the event promoter's club(s), and one or more advertisements for the event promoter and/or for an event promoter affiliate. It will be understood that the components described above can be organized and depicted in an event promoter page in a variety of ways, but such variations fall within the full scope of the invention.

In one embodiment, an event promoter can also create an event promoter and/or event club that includes featured event information and/or promotional opportunities available only to event promoter club members, e.g., consumer-users of the system that have expressed particular interest in an event promoter, e.g., via the creation of an event promoter-specific consumer-user profile. The event promoter/event club can display event promoter/event-specific content, e.g., video, audio, print media, discussion forms, etc., available only to event promoter/event club members, as well as event pre-release announcements, special promotions, incentives to participate in event promoter/event surveys and focus groups, etc. to members of the event promoter club. For example, the event promoter club can include press releases regarding the event promoter and/or related events, as well as hyperlinks to discussion forums related to the event promoter and/or event. Still further, the event promoter can identify certain celebrities, critics, and/or consumer advocate groups that have identified with and/or commented on the event promoter and/or one or more events of the event promoter. For example, if an event promoter has a celebrity endorsement relationship, the event promoter can display information about that celebrity and his/her endorsement of the event promoter and/or an event on the event promoter page. Similarly, the event promoter can identify certain individuals or groups as critics of the event promoter, events, or a category or subcategory of events for which the event promoter is known and the event promoter can provide information regarding the event/event promoter opinions of those individuals or groups. Such information can be provided in a hyperlink to a third party website, or as an audio, video, or text file, as well as a link to a blog or other discussion forum. It will be understood that the components described above can be organized and depicted in a user-interface in a variety of ways, but such variations fall within the full scope of the invention. Moreover, various additional features can be included in the event and/or event promoter club page, e.g., advertising materials, featured events, additional system browsing features, etc., and such additional features are within the full scope of the invention.

An event promoter can interact with one or more followers on the system, e.g., by sharing events or event promoters with followers and those consumer-users the event promoter follows, by adding to and/or commenting on a data object representation, etc. In one specific embodiment, an event promoter can also use the system to solicit comments from one or more followers/following regarding one or more event or event promoter data object representations in which the followers/following are interested. For example, an event promoter can add a comment to an event data object representation asking its followers/following to comment or give a rating of that event. The event promoter can also use the commentary field in the data object representation to notify consumer-users of related events it offers, e.g., if a consumer-user likes an event promoter event, then the event promoter can suggest that that event can be used with one or more accessories, e.g., offered by that event promoter or by a related event promoter. The system can also be used by an event promoter to compare its events with those of a competitor event promoter. For example, an event promoter can comment on or create a promotional data object representation regarding a competitor event promoter, thereby challenging that competitor event promoter to submit its comments in response, as well as users of those event promoter/competitor event promoter events to engage in the challenge.

In a preferred embodiment, the processor is configured to notify the consumer regarding new event information, new event promoter information, or combinations thereof, based on the consumer purchasing preferences, interaction data, or combinations thereof. The system can send the consumer-user a message, as described above, and/or the system can display those data object representations not previously displayed to the consumer-user in the consumer-user GUI in a more prominent position in the GUI relative to other data object representations. For example, those data objects not previously displayed by the system to the consumer-user can be displayed in reverse chronological order, so that the newest data object representations appear at the top of the interface (this is one embodiment of how newer data object representations can be featured in the GUI relative to other data object representations and it not intended to be a limiting embodiment). The new event information includes a new event offered on the system and information related to that new event offering; new information regarding an existing event offered on the system (e.g., an event represented by a data object representation that may have been previously displayed to the consumer-user, but new information about that event that was not previously displayed to the consumer-user); an event offering new to the consumer based on the consumer purchasing preferences and information related to the event offering new to that consumer; and combinations thereof. The new event information can include the identity of newly released event(s), new event description information, new event media, new purchasing information, and combinations thereof. The new event description information can include new event-specific supporting documents and information, event accessories and/or related events, event recall information, discontinued event information, and combinations thereof. New purchasing information includes but is not limited to new event pricing information, new shipping and handling information, new authorized retailer information, new availability (e.g., removal from backorder), event trademarks, event description, event media, new purchasing information, retail information, or combinations thereof.

Likewise, the system can also notify consumer-users of new event promoter information, e.g., a new event promoter of events offered on the system and information related to the new event promoter of events; new information related to an existing event promoter of events offered on the system; an event promoter of events new to the consumer based on the consumer purchasing preferences and information related to the event promoter events new to the consumer, and combinations thereof. Such new event promoter information can include information related to one or more event promoter trademarks, event promoter description, event promoter media, new purchasing information, retail information, event promoter events, event promoter portfolio, related event promoters within the event promoter portfolio, related event promoter description, related event promoter events, and combinations thereof. Event promoter description information can include an event promoter image, one or more event promoter-specific supporting documents and information, one or more event promoter reviews, an event promoter rating, and combinations thereof. Event promoter media includes an event promoter-specific video file, an event promoter-specific audio file, and print media. Event promoter-specific supporting documents and information are selected from the group consisting of a literature references, reviews, blog link, press release, forum link, and combinations thereof.

The system can also be directed by an event promoter to send a consumer-user direct advertising or promotional information via the system. Such direct advertising can be informed by the interaction data generated by the system, so that the event promoter can direct those materials to only those consumer-users on the system that have expressed an interest in the event promoter or its events. In a preferred embodiment, direct advertising and/or promotional information regarding an event or event promoter is relayed to those consumer-users having an interest in that event or event promoter by advertising- or promotion-specific data object representations that are displayed by the system on the consumer-user's GUI.

Figure 7A:
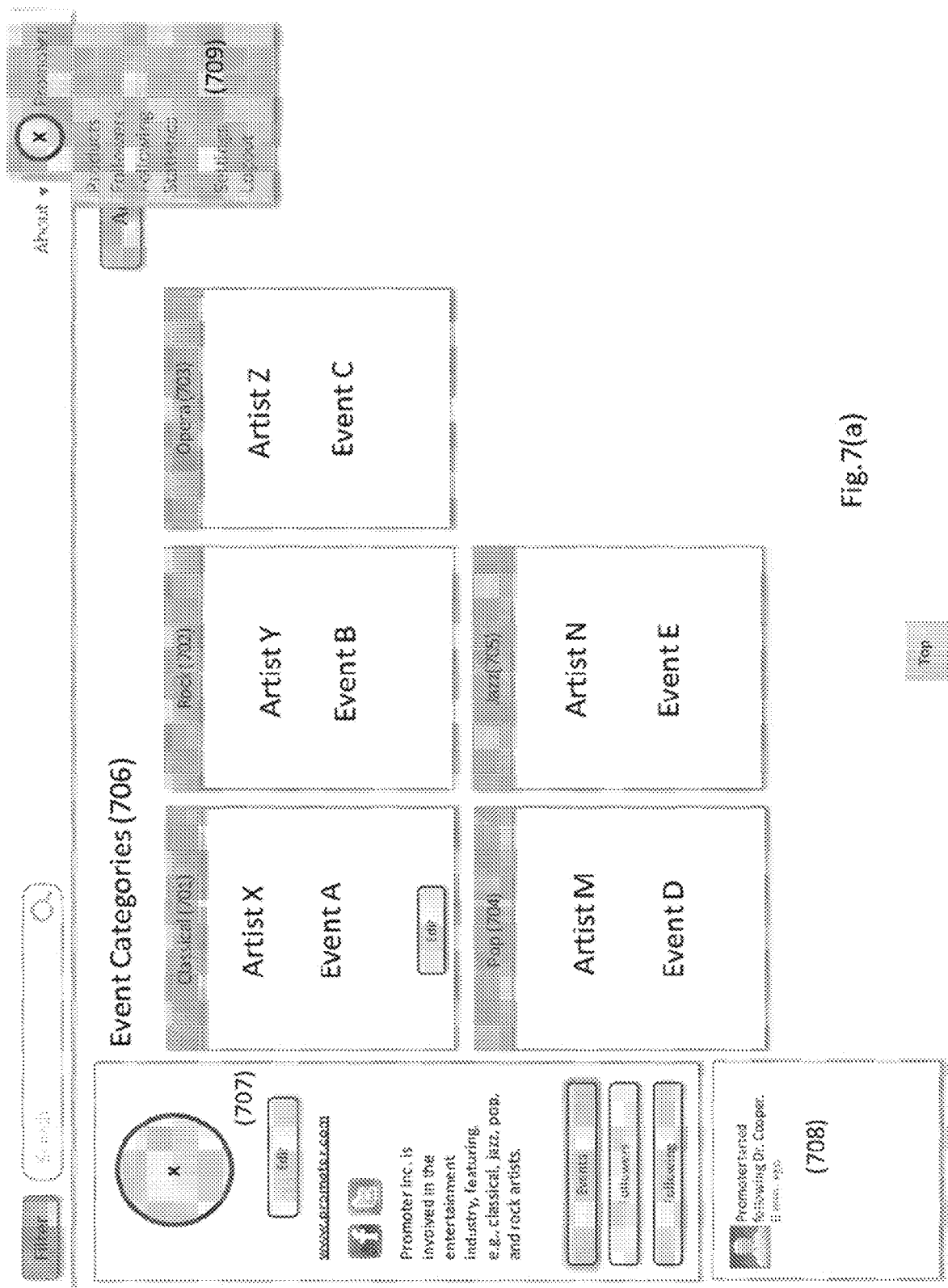
FIGS. 7(a)-(b) illustrate several embodiments of an event promoter's landing page on the system.
Figure 7B:
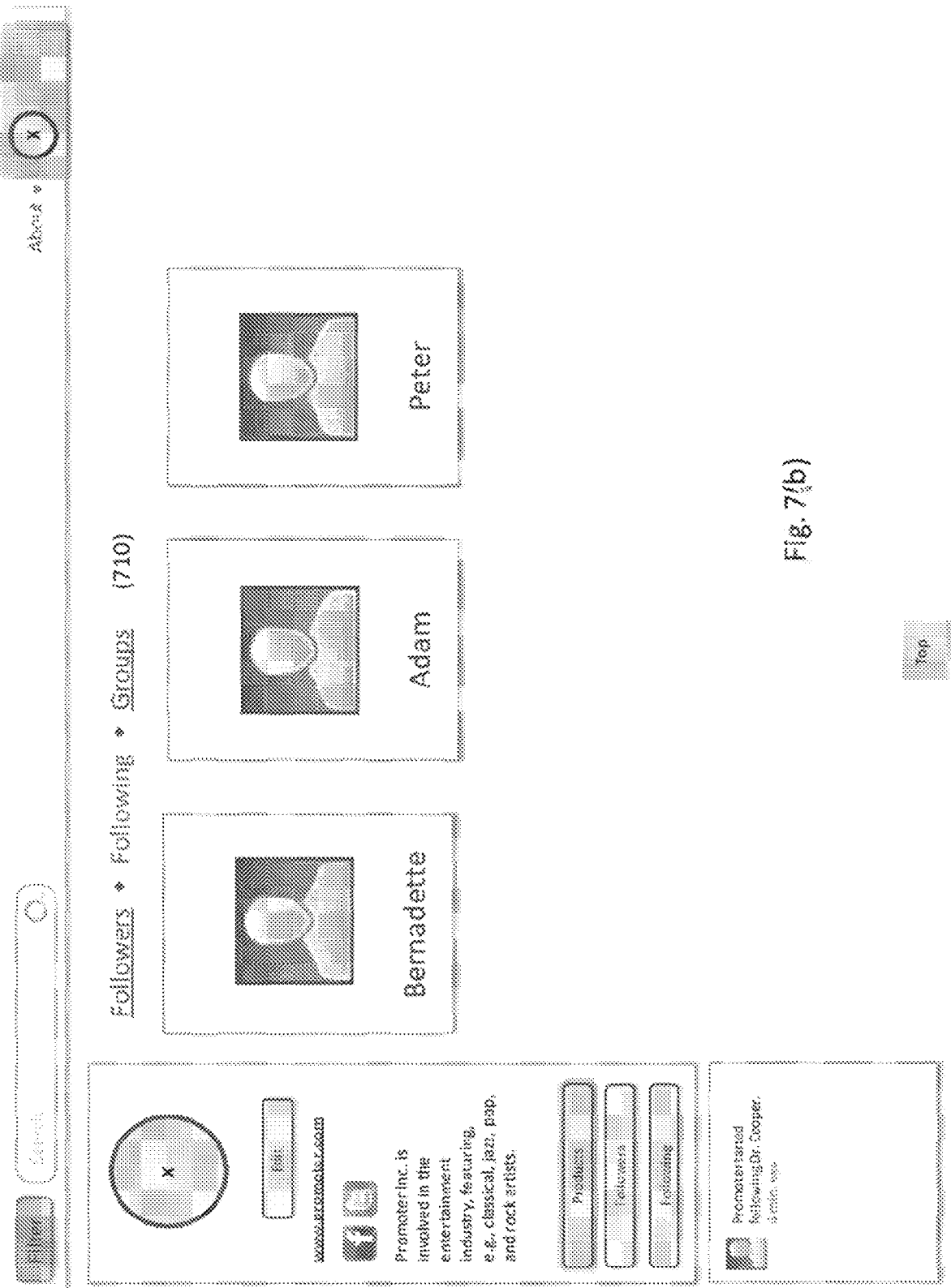

Once an event promoter profile has been created, an event promoter-user GUI is displayed by the system that is displayed only to authorized event promoter-users and includes details regarding the events offered on the system, followers of the event promoter and its events, statistics regarding how users are interfacing with the event promoter on the system (as described in more detail below), etc. As shown in FIG. 7(a), the event promoter-user GUI includes one or more data object representations (701-705) representing individual event (and/or interest) categories (706), a section of the GUI including general information about the event promoter and links to more details regarding event promoter events, followers, and individuals the event promoter follows (707), an activity field (708) that displays activities of the event promoter and/or followers or individuals the event promoter follows on the system. Finally, the event promoter-user GUI also includes a selectable menu (709) that allows the event promoter-user to access more information regarding event promoter events, followers, individuals followed by the event promoter ("following"), event promoter statistics on the system, system settings, and a link to logout of the system. In addition, much like the consumer-user GUI, as shown in FIG. 7(b), the event promoter-user GUI also displays more detailed information about individuals following that event promoter (710), as well as individuals the event promoter follows (not shown).

Marketing Analytics

The event promotional system offers the consumer a way to stay abreast of new events and innovations from their favorite event promoters, allowing consumers to form a personal relationship with the event promoters they are passionate about and share the experience with their contacts and other passionate consumer-users that are part of the system community. As described above, the system aggregates new events submitted by numerous event promoters and presents them to consumers in an elegant, organized, and compelling way. Consumer-users do not have to hunt for or accidentally stumble across new events, but rather the new events are pushed to them in a timely manner. Consumer-users are kept up-to-date and informed so that they can make educated decisions about which events to attend. In addition to enabling the user to follow event promoters they like, the system also allows consumers to discover new event promoter and events. Based on what the consumer has viewed or otherwise expressed an interest in, the system makes recommendations for events and event promoters with which the consumer may not have been familiar.

In addition, the system includes a mechanism for event promoters to communicate with existing and potential customers. In one embodiment, the event promoter communicates with consumer-users on the system by modifying event promoter-related data objects as described above, or by sharing information with members via push notifications and/or directly with members of an event promoter club or event club. Alternatively or additionally, the event promoter can inform the system administrator to send directed advertising materials, event or event promoter information, etc. via email through the system to all consumer-users that have expressed an interest in an event promoter or its events via one or more purchasing preferences. The ability to provide event pre-release announcements, special promotions, incentives to participate in event promoter/event surveys and focus groups, etc. to such a targeted group of consumers is extremely valuable to the event promoter.

The system provides interaction data to the event promoter so that an event promoter can optimize its marketing strategy and consumer outreach. The aggregation and analysis of data collected on the shopping and buying habits of the community of consumer-users is a valuable source of market research data. Surveys, reports, analysis, data mining and visualizations of the data collected by the system can be offered to event promoters to enable them to optimize their marketing strategy and consumer outreach. As described above in reference to FIG. 1(h), the system generates interaction data for each data object and stores that interaction data with the data object, as well as in a global interaction data database. The interaction data includes but are not limited to, the number and identity of: consumers of the system, consumers of one or more interest categories, and consumers of one or more interest categories; consumer demographics of: all consumer-users of the system, consumer-users of one or more interest categories, system-consumer clicks, system-consumer clicks per interest category, system-consumer impressions, system-consumer impressions per interest category, average interest category click through rate, interest category seasonal trend data, average conversion rate, and combinations thereof. Consumer demographics includes information related to system-users' gender, ethnicity, age, income, education, home ownership, location, employment status, shopping history, interests, and combinations thereof. In one embodiment, the system provides interaction data including consumer-users' shopping history, e.g., a history of events purchased via the system, events purchased via a third party shopping system, events browsed via the system, event promoters of events purchased via the system, events identified in the consumer purchasing preferences, event promoters of events purchased via a third party shopping system, event promoter browsing history via the system, event promoters identified in the consumer purchasing preferences, or combinations thereof. Shopping history interaction data can be made available to the event promoter if individual consumer-users provide such information and if those consumer-users allow dissemination of that information to an event promoter.

In a further preferred embodiment, the system generates data object-specific interaction data, e.g., for each individual data object or a data object and its derivative data objects the system collects interaction data which is accessible to the event promoter associated with that data object. This data object-specific interaction data includes but is not limited to, the number and identity of: consumers of the system interacting with that data object, consumers of one or more interest categories that interact with that data object, consumer demographics of all consumer-users interacting with that data object; data object clicks, data object impressions, data object click through rate, data object seasonal trend data, average conversion rate for that data object, and combinations thereof. Consumer demographics that can be collected for an individual data object includes information related to system-users' gender, ethnicity, age, income, education, home ownership, location, employment status, shopping history, interests, and combinations thereof. In one embodiment, the system provides data object-specific interaction data including consumer-users' shopping history, e.g., a history of events purchased via the system, events purchased via a third party shopping system, events browsed via the system, event promoters of events purchased via the system, events identified in the consumer purchasing preferences, event promoters of events purchased via a third party shopping system, event promoter browsing history via the system, event promoters identified in the consumer purchasing preferences, or combinations thereof. Shopping history interaction data can be made available to the event promoter if individual consumer-users provide such information and if those consumer-users allow dissemination of that information to an event promoter.

In one embodiment, the processor includes an analysis program configured to generate a comparative analysis for each event promoter on the system based on interaction data over a defined time interval. The comparative analysis includes a comparison of one or more interaction data parameters described above for one event promoter vs. one or more additional event promoters on the system. The comparison can be for all event promoters on the system, and/or for all event promoters within the interest category or subcategory. For example, if an event promoter sells shoes, the system can generate an analysis of interaction data for the event promoter itself, but the system can also provide a comparison of the event promoter and other event promoters on the system that sell shoes. In this regard, the interaction data provided by the system for the event promoter can include the number of consumers on the system with an interest in shopping for shoes, the demographics of those consumers interested in shoes, system-consumer clicks within the shoe interest category, system-consumer impressions within the shoe category, average click through rate for consumers browsing for shoes on the system, seasonal trend data for the shoe interest category, average conversion rate within the shoe interest category, etc. If a sampling of consumer-users have provided shopping history information, the interaction data can include a history of shoe purchases via the system for those consumer-users, shoe purchases via a third party shopping system(s), shoes browsed via the system, shoe event promoters purchased via the system, shoes identified in the consumers' purchasing preferences, shoe event promoters purchased via a third party shopping system, shoe event promoter browsing history via the system, shoe event promoters identified in the consumers' purchasing preferences, and combinations thereof. In a further embodiment, the analysis program can generate a comparative analysis of an event promoter versus one or more event promoters selling events in the same interest category and optionally within the same price point range. In this regard, the event promoter can better understand how it compares to an event promoter with the same customer base. The analysis program can generate a comparative analysis over a defined time interval, e.g., for the entire time the event promoter or an event promoter comparator (an event promoter in the same interest category as another event promoter) has participated in the system (e.g., from the date an event promoter profile was created to the present), over a given range of time the event promoter or an event promoter comparator has participated in the system, a defined number of years, months, or days prior to a consumer login date on the system, e.g., from 1-5 years prior to a consumer login on the system, 1-6 months prior to a consumer login on the system, etc.

The analysis program can also provide an analysis based on event promoter interaction data, including but not limited to event promoter event-consumer clicks, event promoter event-consumer impressions, event promoter event click through rate(s), event promoter event conversion rate, event promoter interest category-consumer clicks, event promoter interest category-consumer impressions, event promoter interest category click through rate(s), event promoter interest category conversion rate, and combinations thereof. In one embodiment, the event promoter interaction data are for (i) consumers that have identified an event promoter in the consumer purchasing preferences; (ii) consumers that have identified an event promoter interest category in the consumer purchasing preferences; (iii) consumers that have identified an event promoter event in the consumer purchasing preferences; (iv) consumers that have identified an event promoter interest category in the consumer purchasing preferences; (v) consumers that have followed an event promoter; (vi) consumers that have followed an event promoter event; (vii) consumers that have liked an event promoter; (viii) consumers that have liked an event promoter event; (ix) consumers that have commented on and/or rated an event promoter; (x) consumers that have comments on and/or rated an event promoter event; (xi) consumers that have added an event promoter event to one or more lists; and (xii) combinations thereof.

The processor can also provide an event promoter ranking data in relation to an additional event promoter in the same event promoter and/or interest category and/or the collective event promoter and/or interest category. Therefore, the processor can generate a ranked ordered list of event promoters in a given event promoter and/or interest category, based on e.g., the number of: event promoter events sold on the system, consumers that have identified that event promoter in their consumer purchasing preferences, etc. For example, the processor can generate a ranked order list of shoe event promoters on the system in descending/ascending order of the number of shoes sold on the system and/or the total shoe sales on the system. Such ranking data can be generated for an event promoter without reference to a time interval or in relation to a specified time interval, e.g., since the event promoter registered on the system, and/or from a defined date to the present.

The processor can generate interaction data for a given location relative to others. For example, if consumer-users have provided their geographic location, the system can generate a map of a country, county, city, etc., that reflects where consumer-users reside that have expressed an interest in that event and/or event promoter. The event promoter can select the geographic location it wants to receive interaction data about or the system can create a map that reflects the location of all consumer-users interested in the event promoter. The map can also reflect the relative interest of consumer-users in that event promoter from one geographic locations or territory to another. For example, the map may highlight a city in red that includes a large number of consumer-users of the system interested in the event promoter, whereas a city in blue indicates a relatively low number of interested consumer-users. The map can further reflect the relative number of interested consumer-users in relation to the overall population of that geographic location. An event promoter can use this information, e.g., to identify those geographic locations that may be well served by a physical event promoter store front because of high demand in a relatively dense population.

Aggregation & Presentation of Selected System Content

In an additional embodiment, the system allows a consumer-user, an event promoter, and/or a group of consumer-users to select and aggregate content available on the system, e.g., videos, slide shows, audio, graphics, print media, etc., and combinations thereof, into a data table on the system and organize, annotate, and present that content in any suitable presentation format or medium and make that presentation available to additional consumer-users of the system. The content can be generally available to all system consumer-users or content or a selection thereof can be made available to a subset of consumer-users, e.g., members of an event or event promoter club. An individual can optionally annotate the presentation, e.g., adding written, audio, and/or video commentary to all or a portion of the presentation, save that presentation to a selected data table on the system, and share that presentation with the community of consumer-users of the system or a selection thereof.

For example, if an event promoter wants to promote events in a particular interest category, it can aggregate event media available on the system for events within that interest category, e.g., print media (e.g., written materials and print advertising), video media (e.g., video advertising (commercials), event demonstrations, video reviews, etc.), audio media (e.g., audio advertising, audio discussion forums, or podcasts), etc., in any suitable presentation format, e.g., in a streaming video that can be viewed on a television and/or on a computer, with or without supplementary written, visual, or auditory commentary, and make that presentation available to consumer-users of the system or a selection thereof. The event promoter can create a collection of such presentation materials, e.g., for events within a selected interest category, across event categories, or for all events, and the event promoter can save the collected presentations in one or more data tables on the system. Each presentation is optionally identified by a name and description, and the presentations can be modified, e.g., new events or content can be added, updated, and/or deleted from the data table, by the creator or a representative thereof. In addition, a consumer-user can aggregate event and/or event promoter media available on the system, e.g., events and/or event promoters in which the consumer-user has expressed an interest, e.g., print media, video media, audio media, etc., in any suitable presentation format, with or without written, visual, or auditory commentary, and make that presentation available to additional consumer-users of the system or a selection thereof. Likewise, a group of consumer-users or a consumer-advocate group or representative thereof can also aggregate event and/or event promoter media available on the system, e.g., events and/or event promoters that have been reviewed by that group, e.g., print media, video media, audio media, etc., in any suitable presentation format, with or without written, visual, or auditory commentary, and make that presentation available to additional consumer-users of the system or a selection thereof.

In yet another embodiment, a channel number or frequency can be associated with the electronic event system on cable, satellite, UHF, VHF, and/or other television delivery mechanisms and a consumer-user can access his/her account on the system, e.g., GUI, channels, feeds, lists, etc., via one or more of these delivery mechanisms. If a consumer-user selects electronic event system frequency, the consumer-user's GUI can be displayed as a default or other channels or feeds from the system can be displayed by default (selectable by the consumer-user). The consumer-user can select and/or navigate between his individual system channels or feeds using a guide-like mechanism on the user's television delivery device, e.g., cable box. In one embodiment, the consumer-user can identify himself or herself through a login mechanism on the channel provided by selecting a control on the user's television delivery mechanism or on a remote control device associated with the delivery mechanism. Once logged into the system through the television delivery mechanism, the consumer-user's login on the electronic event system is associated with the ID of the television delivery mechanism.

Figure 10:
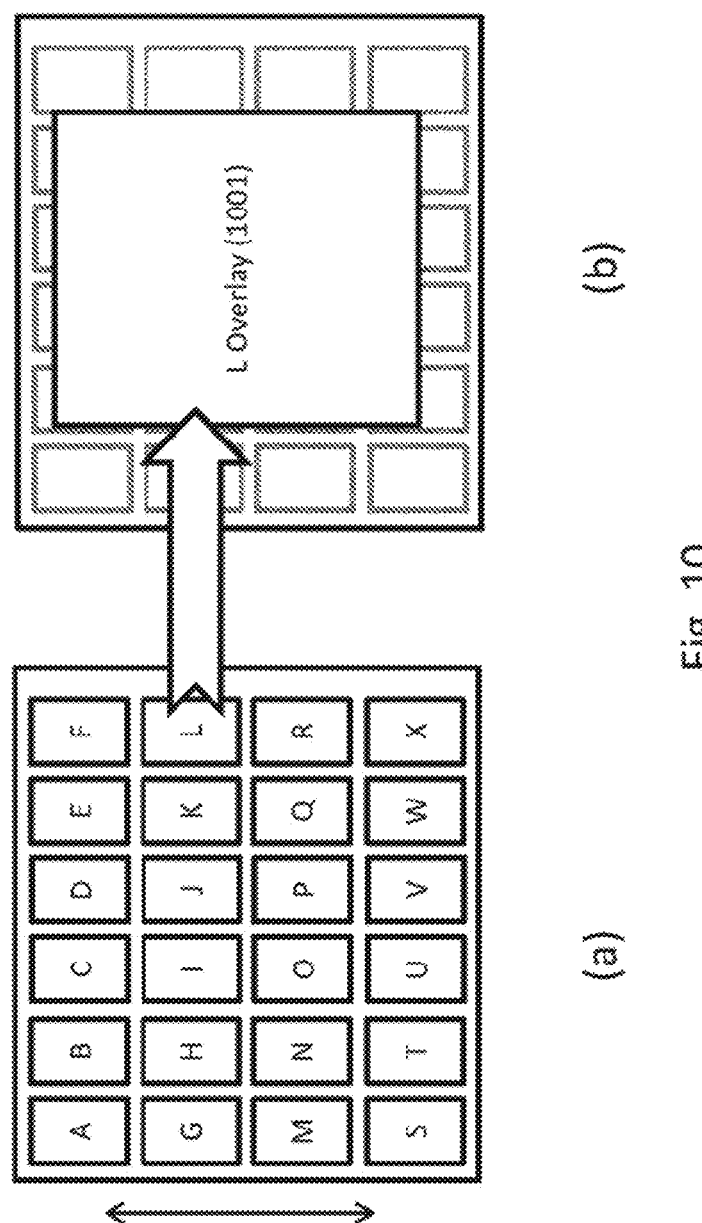
FIGS. 10(a)-(b) illustrate the display of a set of data object representations on a computer screen.

Presentation of data object representations in a desktop and/or mobile computing interface preferentially can be a reverse chronological stream of most recently updated and/or created data object representations. As illustrated in FIG. 10(a), the stream of data object representations, elements A-X in FIG. 10(a), can be presented in a continuous flow, from left to right and down in the GUI. In a specific embodiment, the GUI displays an infinite scroll of data object representations if system activity on those data object representations is continuous. Alternatively, the GUI can display a certain pre-defined number of data object representations per screen of the GUI, depending on GUI size and resolution. The user can scroll down the screen of the browser, if web-based, or application interface, if the application is native to a computing device. In this way the system can batch up the viewable data object representations in sets because the number of data object representations approaches infinity and therefore cannot be displayed on the computing device as one complete set. As the user scrolls down, the interface fetches the next set of data object representations to display. Additionally, as described herein, the user interacts with a specific data object representation by selecting it to open a detailed view of the selected data object. This view can be an overlay view (1001) as illustrated in FIG. 10(b) or it can be a full screen view (not shown).

To present this same set of data object representations on a television, the dataset can be organized into a video stream where each frame is a certain defined set of data object representations viewable in one television screen. This is illustrated in FIGS. (11)(a)-(c), wherein the available set of data object representations are organized, in this case, as six data object representations per frame (e.g., Frame 1 (1101), Frame 2 (1102), Frame 3 (1103), and Frame 4 (1104)), with a potentially infinite set of frames each containing some number of data object representations. It is beneficial that each data object representation viewable in a frame is completely viewable on the television screen to provide an optimal experience for the viewer. The system can provide one or more different streams of data object representations based on system preferences and/or user preferences. Each of these streams can be broadcast to one or more specific frequencies or channels for television viewing as allocated to the system by a governing entity. The system can continuously broadcast the various streams of data object representations as the system is used. The transition from one frame to the next can have a system-provided, pre-programmed delay to provide the user an optimum time to sufficiently view each frame, for example, 3 seconds per frame meaning, each frame is viewed for 3 seconds before transitioning to the next frame. This is merely an example of a representative delay timeframe. The "3 second delay" can also be realized by repeating each frame a prescribed number of times consecutively in the stream to emulate a normal video viewing experience.

In viewing a particular stream of data object representations, the television decoder, referred to as decoder, can dictate how the user can interact with the stream of data object representations. Various decoders support decoding received television broadcast transmissions, namely, Digital Video Broadcasting (DVB) via satellite (DVB-S, DVB-S2, DVB-SH), cable (DVB-C, DVB-C2) and other internationally-recognized mechanisms for transmission, into a form which can be viewed on a television. The stream can also be transmitted over UHF or VHF on a provided frequency (e.g., channel) received over a standard antenna without a decoder meaning the viewer cannot interact with the stream. They can only view content as it streams on their television screen.

If viewing a particular stream on a decoder, for example, Cable Digital Video Recorder (DVR), TiVO, Roku, DirectTV, GoogleTV, Apple TV, gaming systems, including but not limited to, XBOX360, XBOX1, PS3, PS4, and/or WiiU, and others, the system can generate a more interactive experience on the stream of data object representations for the user. These interactive experiences can be realized on a decoder using a development environment, for example, DVB Multimedia Home Platform which provides a platform for developing commercial video applications on decoders. Since the autonomous unit in the stream is the frame of data object representations, using a "select" function of the decoder and/or its remote control can identify the currently viewed frame for detailed viewing. The stream of data object representations can pause for the user when viewing the data object details of a particular frame. The decoder can be enabled to request from the system the data object representations contained in the selected frame. The system can return the full set of data for each data object representation in the frame or a smaller set of one or more data object representations if the data is too large to send in one message to the decoder. In this way, the decoder can request the details of one or more data object representations to present to the user. As illustrated in FIGS. 11(b) and (c), the first data object, data object representation A (1105), can be displayed in full detail (1106) much like the computer orientation view (as shown in FIGS. 10(a)-(b)). Additionally, the user can scroll through the provided set of data object representations using a "left" and "right" control (1107) on the decoder and/or its remote control. An "up" and "down" control (not shown) can be used also to provide the same function. The single-data-object representation-viewing modality is illustrated in FIG. 11 but all of the data object representations can be displayed in summary view much like the frame or as a list, and the user can use the up/down/left/right and select controls to navigate to the desired data object representation for viewing. The user can press the "exit" control on the decoder and/or its remote control to return to the stream which resumes streaming.

Figure 12A:
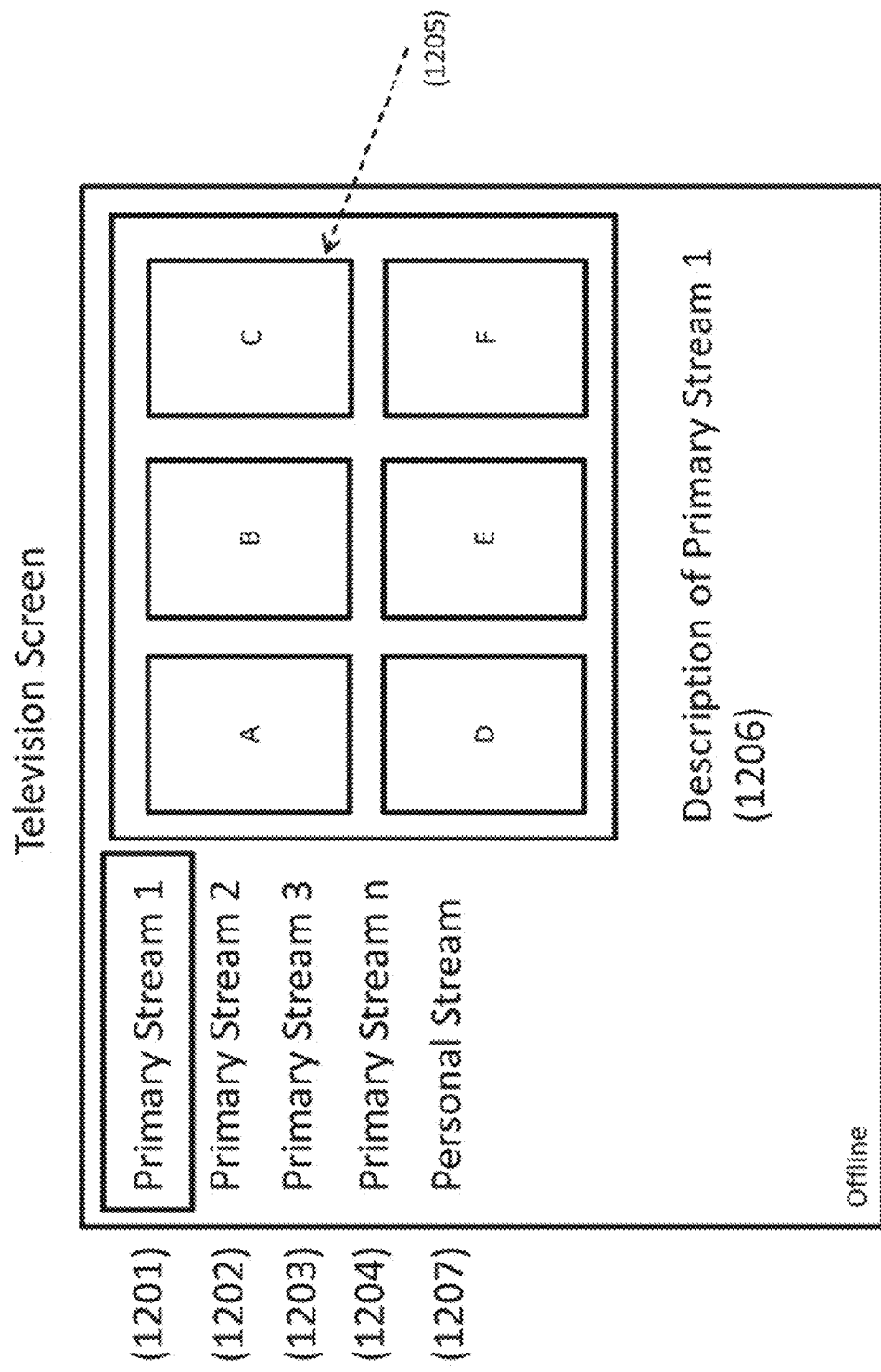
Figure 12B:
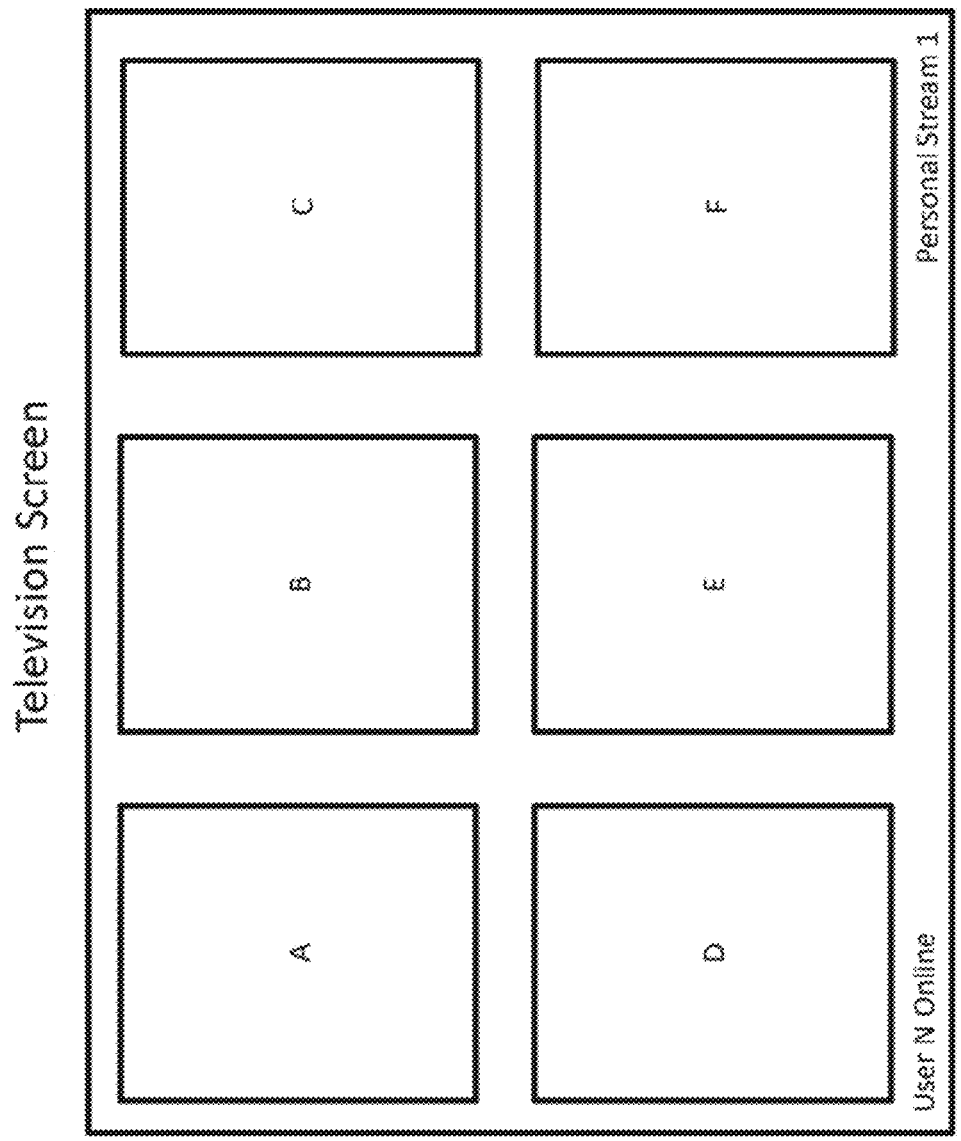

As described above, there can be one or more streams of data object representations. Each stream can be allocated to its own broadcast frequency or the various streams can be provided using an "on demand" modality as illustrated in FIG. 12. The viewer can select a prescribed channel on the decoder which can provide a list of available streams to view (referred to in FIG. 12 as Primary Streams 1-3 and n, (1201-1204, respectively), a summary view of a set of representative data object representations (1205), and a description of the stream (1206). The available streams can be those provided by default by the system. The viewer can choose a stream using the up/down and select control on the decoder and/or its remote control. Once a stream is chosen the user starts viewing as illustrated in FIG. 12(b) with the same interaction as described for FIG. 11.

Figure 12C:
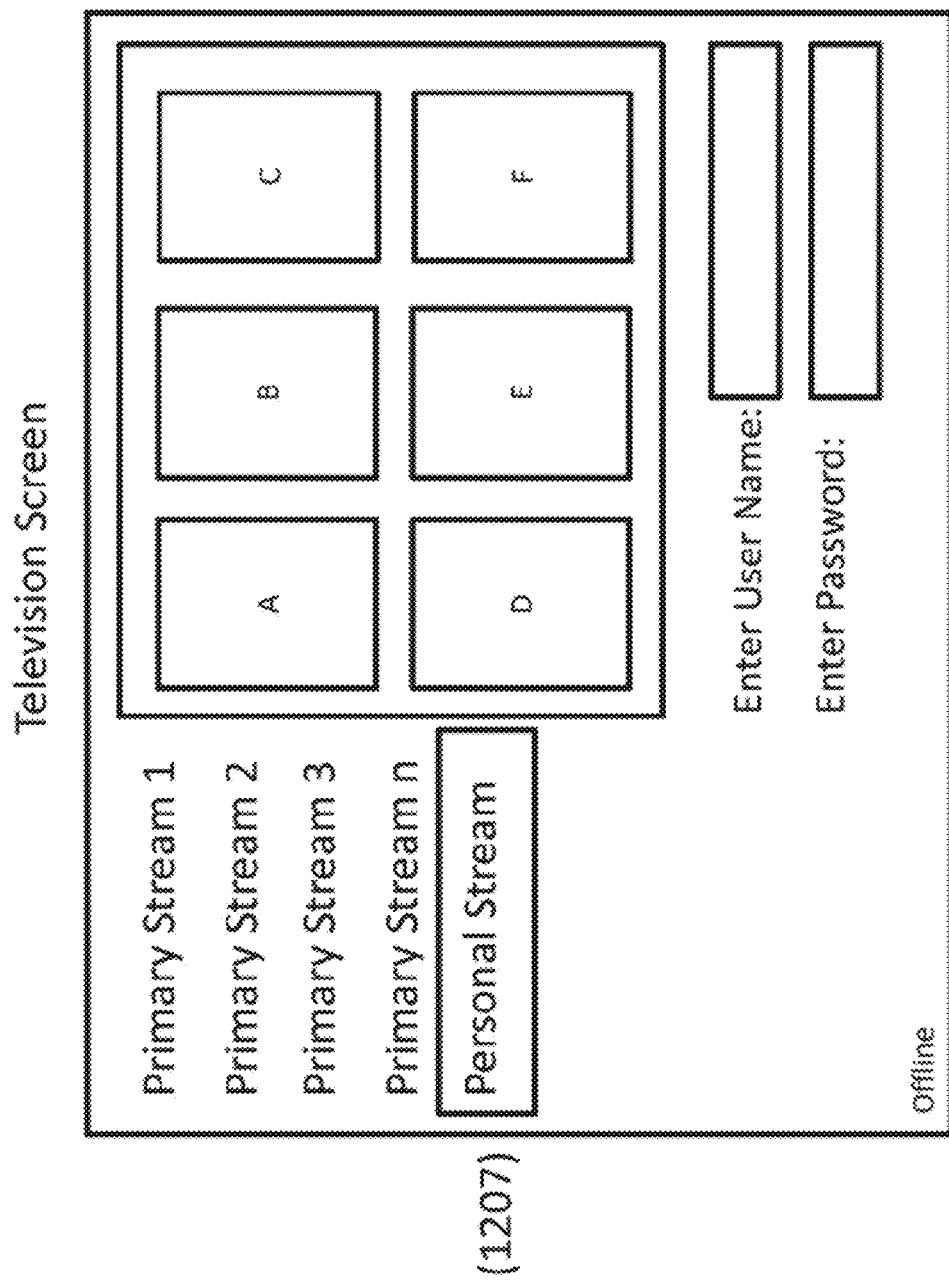
Figure 12D:
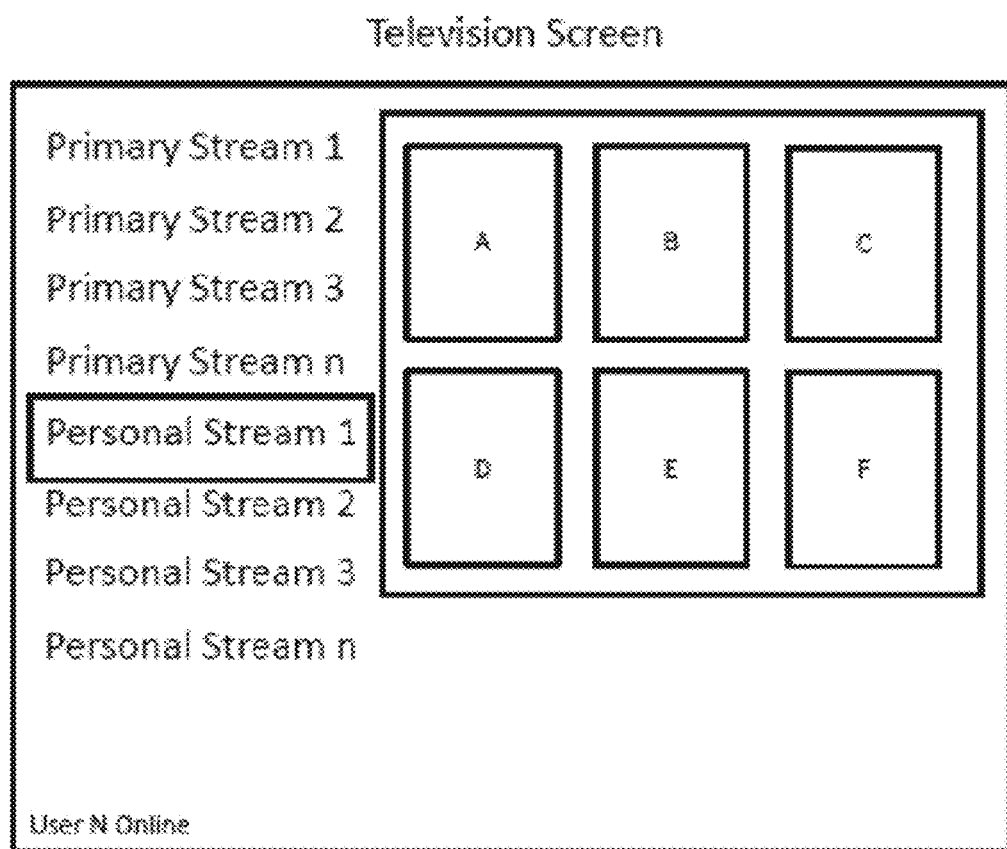
Figure 13A:
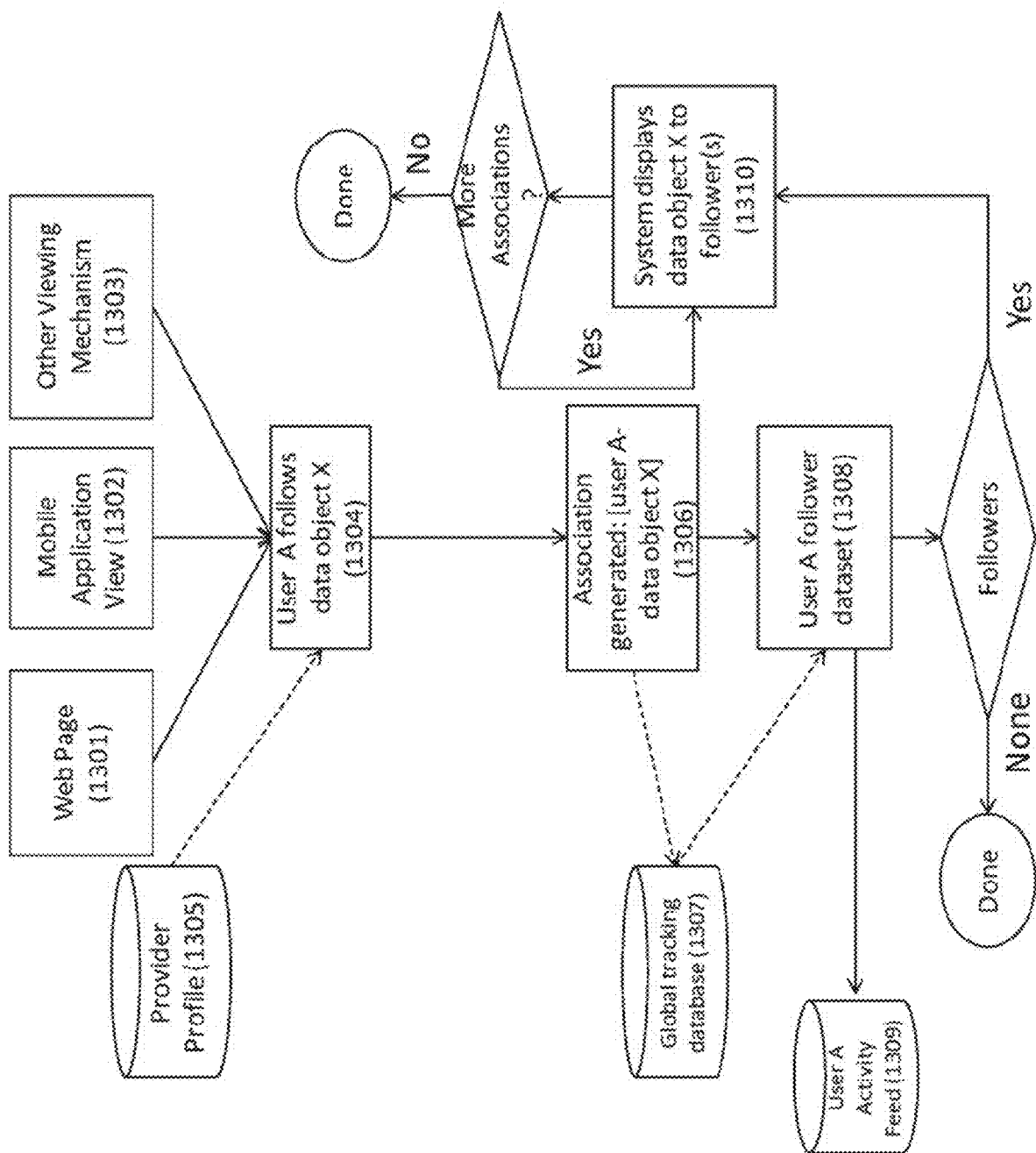
FIGS. 13(a)-(f) illustrate alternative embodiments of system configurations that (i) do not include derivative data object(s), and/or (ii) illustrate conversational data objects on the system.
Figure 13B:
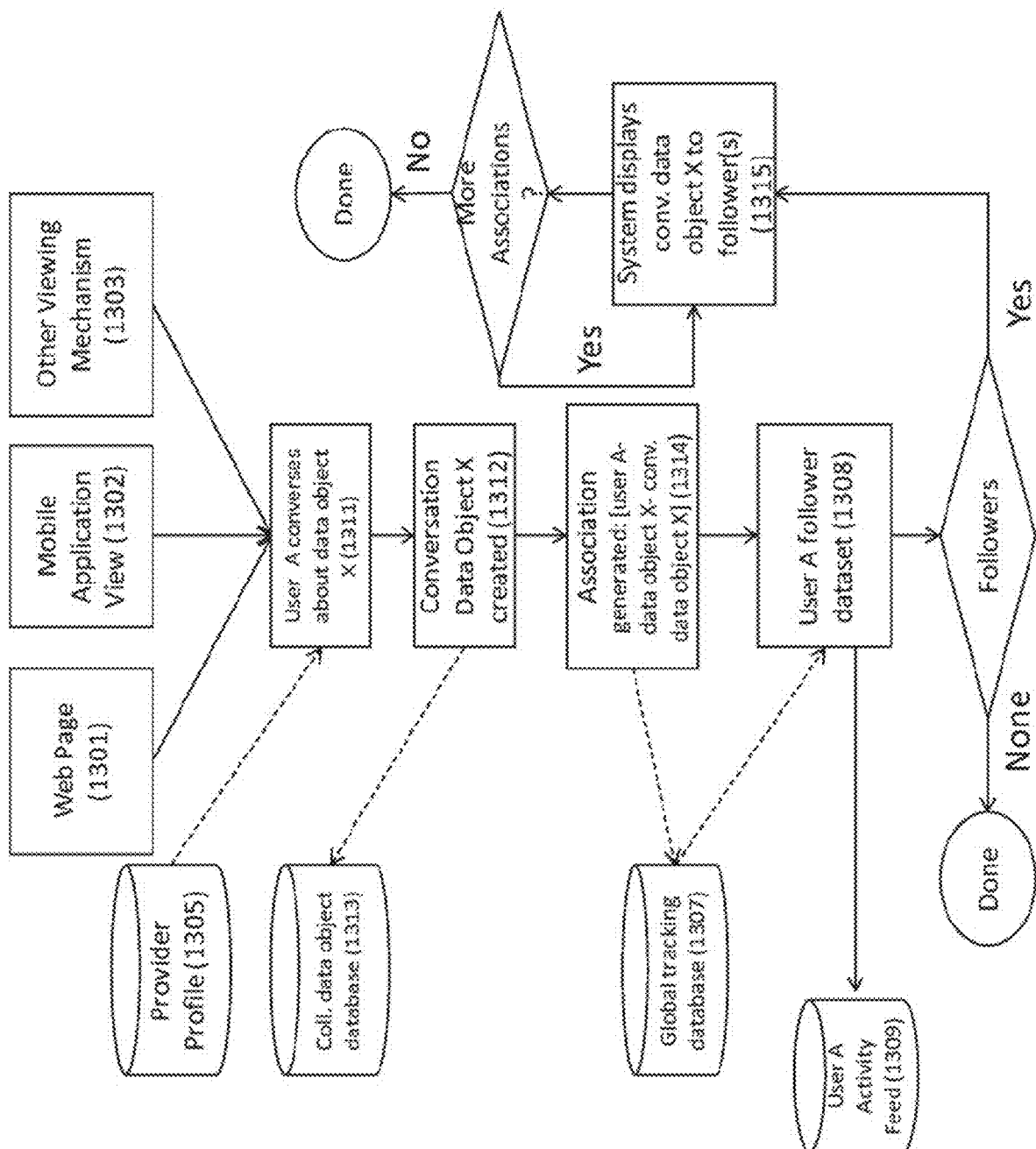
Figure 13C:
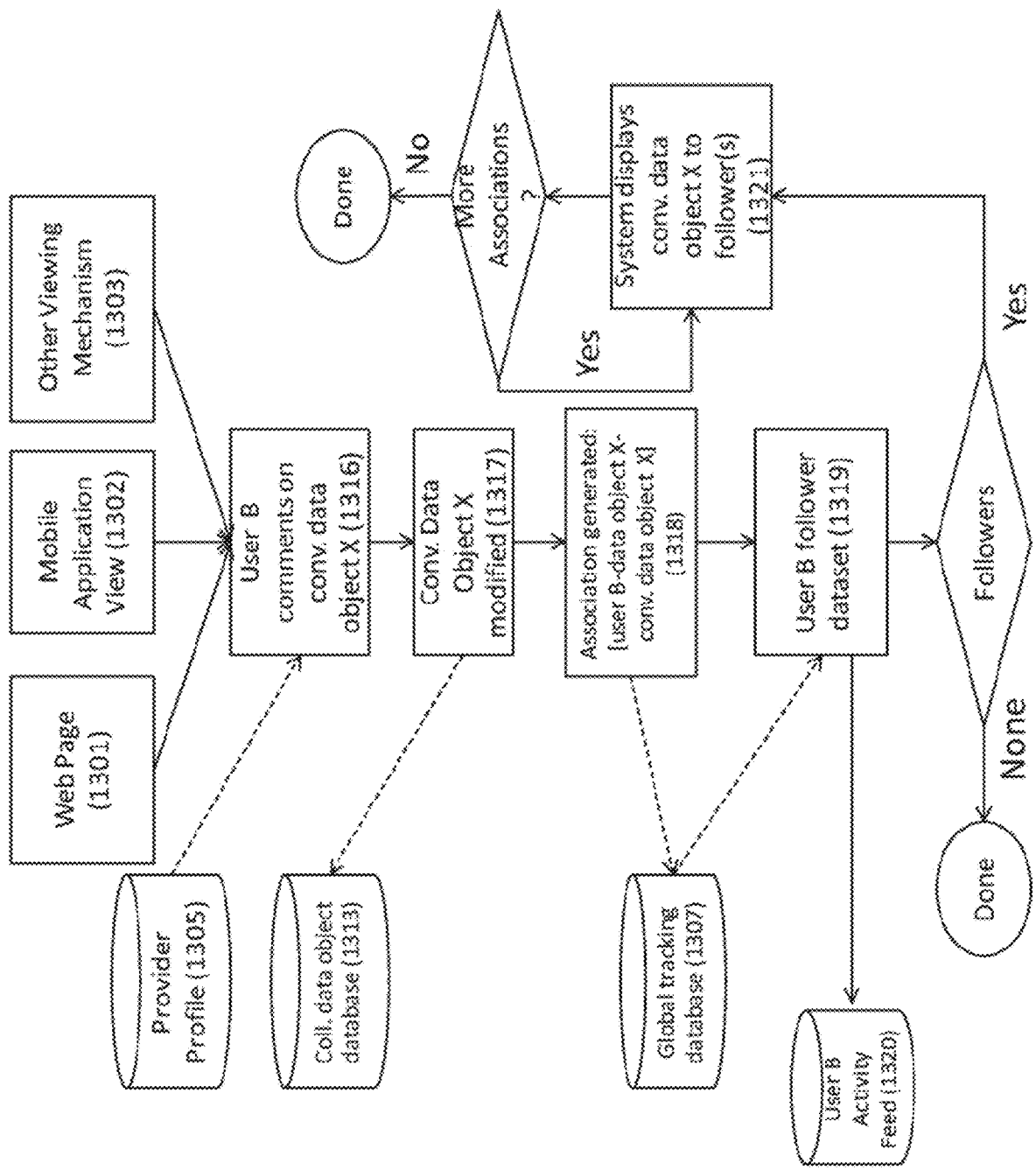
Figure 13D:
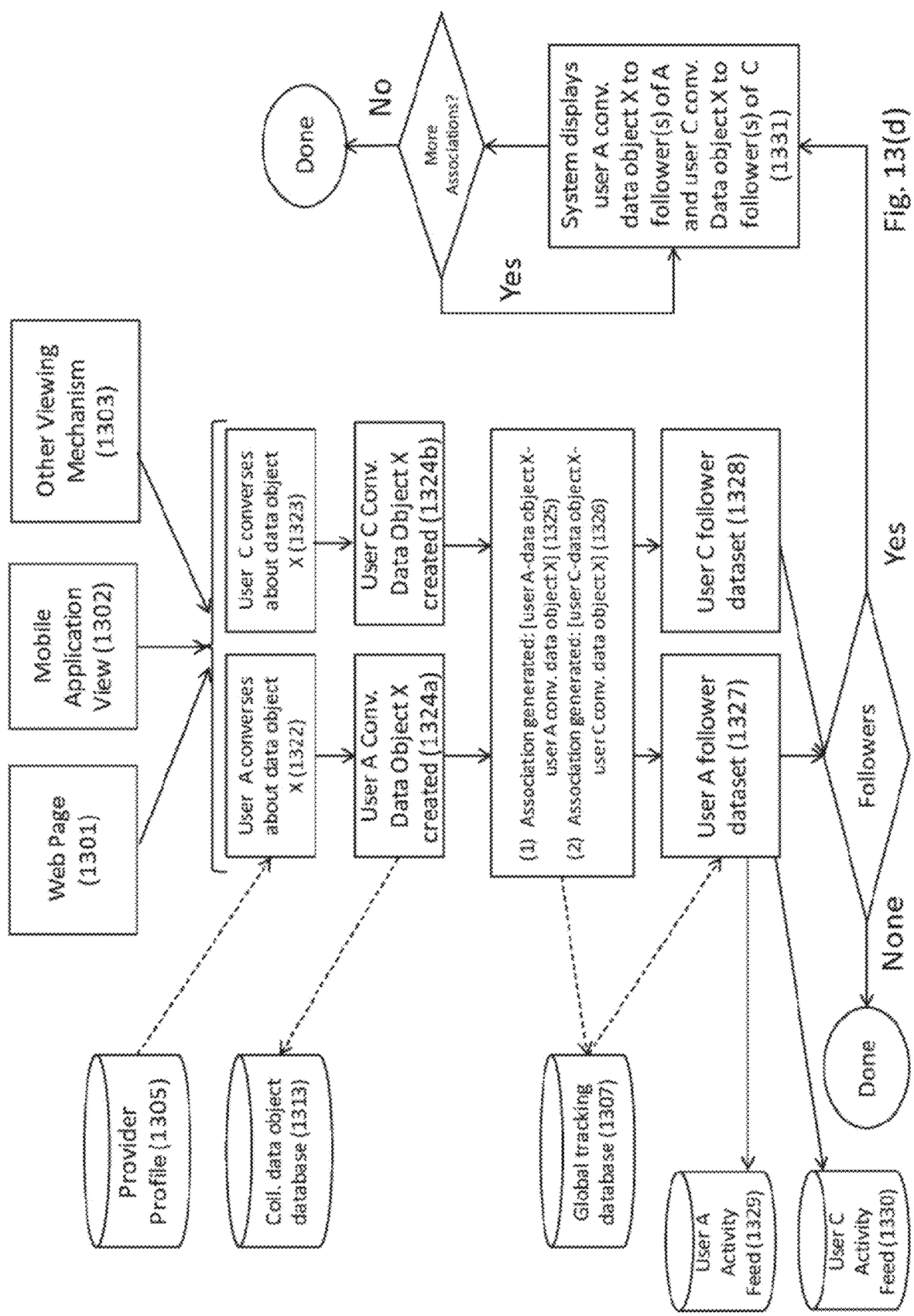
Figure 13E:
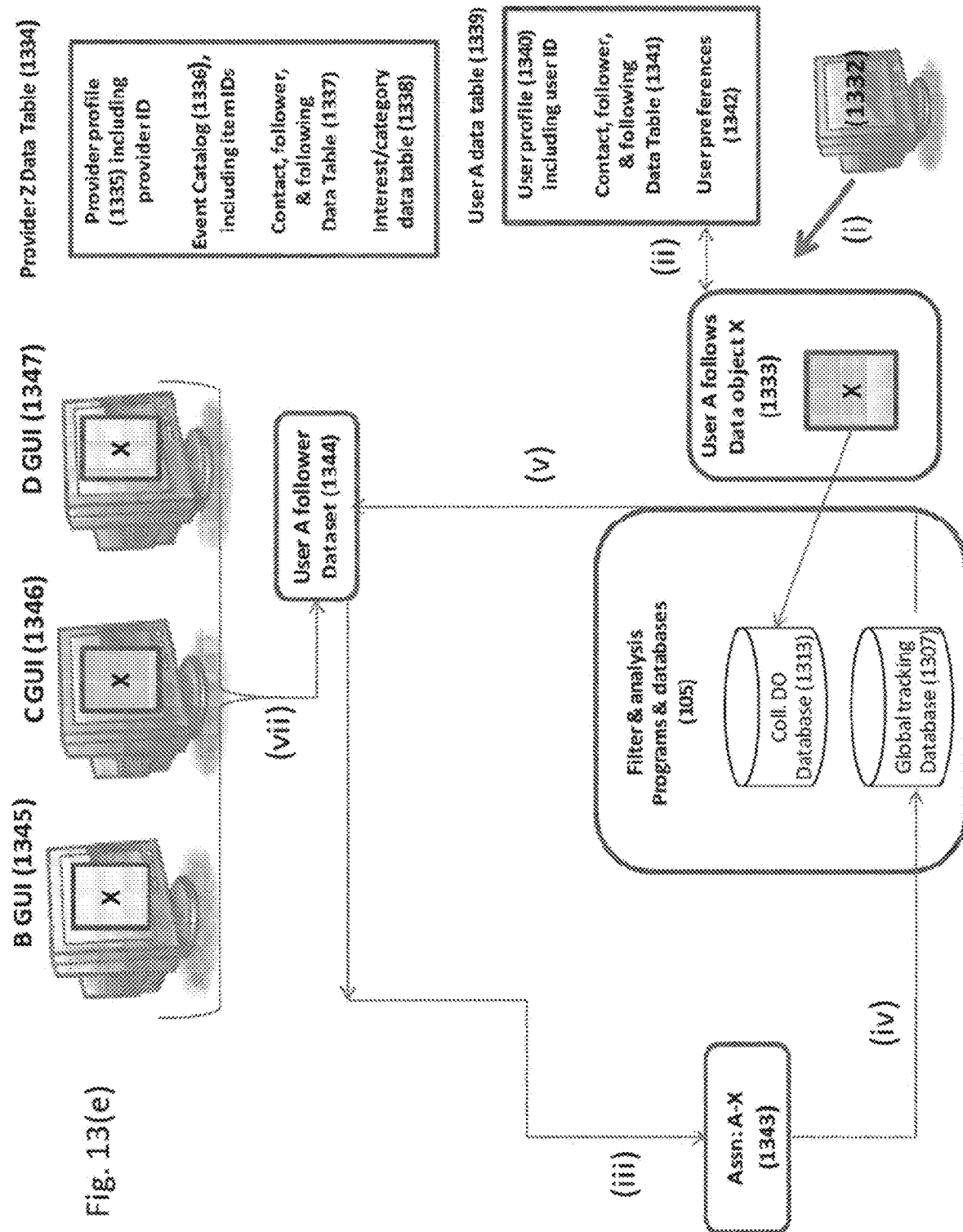
Figure 13F:
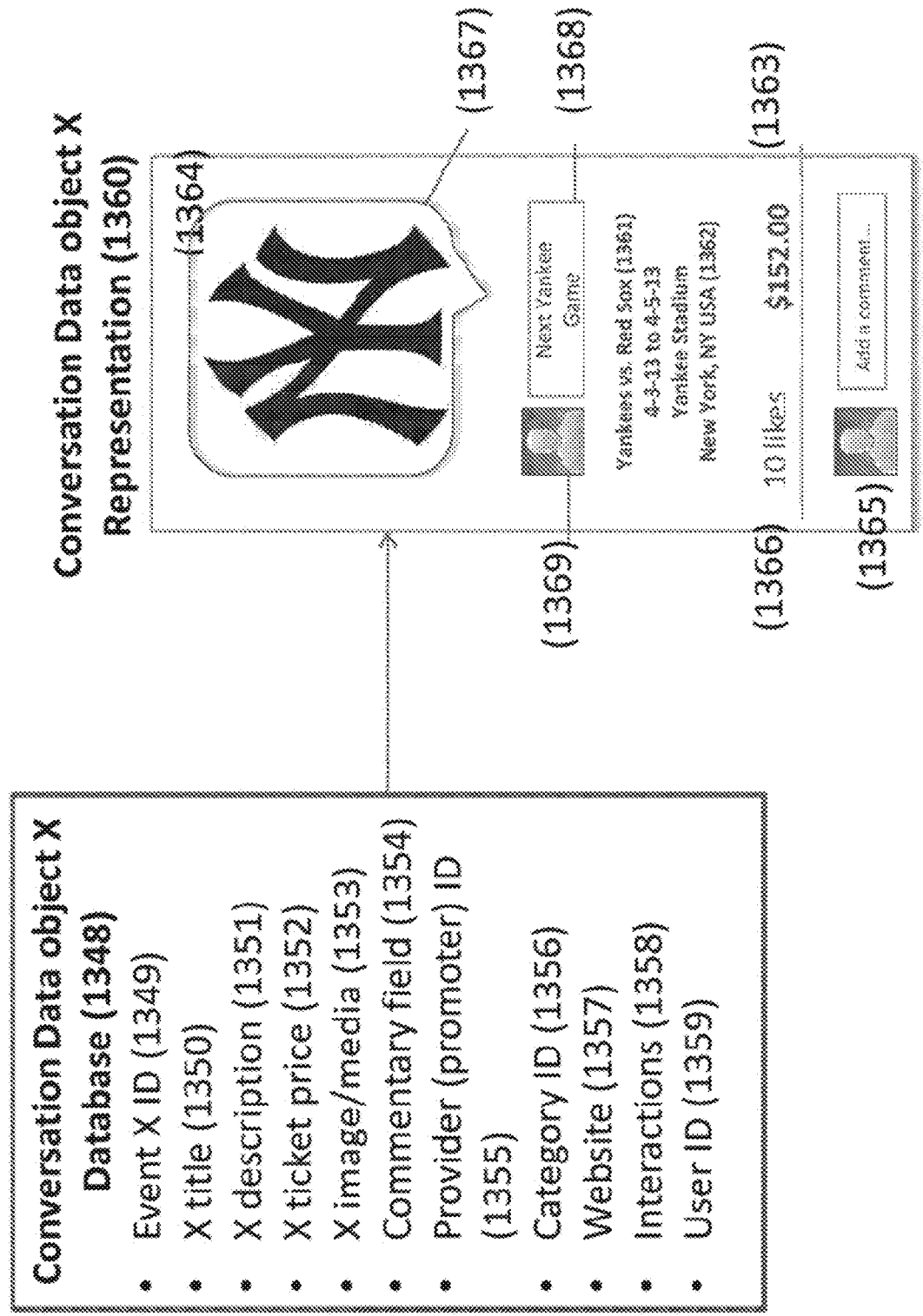

There can also be a "personal" stream (1207) available for the viewer which on selection requires the user to log into the system as illustrated in FIG. 12(c), establishing a user-specific session. The system can provide the information of who is logged in through the decoder, as illustrated in lower left corner as an example, where, no one is logged in or ultimately someone is logged in. The decoder can also provide the user session control and display itself. Once logged in, the user can view the additional set of data object representation streams available just for that user as illustrated in FIG. 12(d). The user can then interact with the list as described for FIG. 12(a).

The mechanism of the viewer logging into the system from their television decoder can be made more efficient by the decoder providing to the user a decoder-specific "key," i.e., an alphanumeric string, for example, and optionally including one or more special characters. The decoder uses one or more art-recognized methods (algorithms) to decode signals (and likewise encode), and suitable methods include but are not limited to QAM for cable, ATSC for over the air transmissions, IP for Internet content, and the like. The key can then be entered into the system by the viewer via the web, mobile or other computer-oriented interface which can associate the user's television decoder with the user's login on the system. In this way, the user can be automatically logged into the system once they turn on the television as the decoder can automatically authenticate itself with the system. The mechanism of getting the decoder's key can be either presented to the user on the television screen for them to manually enter into the system or this can be performed automatically between the decoder and the system without user intervention. The key can also be copied off the decoder to an external storage medium, for example, USB stick, which is then uploaded into the system via a service provided by the system. The key can also be passed to the system by the decoder after a user manually logs into the system from the decoder. Typically it is best practice to inform the user of this kind of interaction between the decoder and system, giving them the option to opt-out of storing the decoder's key on the system. In addition, the system can support the viewer having one or more television decoders in the case of the viewer having multiple decoders.

Monetization

The system can be monetized by any suitable method. In one embodiment, consumer-users can pay for membership on the system or general access membership can be free, but access to certain services or portions of the system can garner a fee. For example, while general access membership can be free of charge, consumer-users can pay a fee to become a member of an event promoter or event club.

In a preferred embodiment, consumer-users are granted full access to the system free of charge, while event promoters pay to access and promote their events on the system as described above. In one embodiment, event promoters will pay a fee to advertise on the system and/or to include a hyperlink of an event promoter website to view an event promoter event on the system. In addition, an event promoter can pay a registration fee, e.g., a one-time flat fee for general access to the site, or a periodic subscription charge, e.g., a flat fee for general access to the site payable e.g., on a monthly, bimonthly, annual, semi-annual, etc. basis. In one embodiment, general access for an event promoter to the system is free, while the creation and display of an event promoter page on the system can be offered for a one time flat fee, a periodic flat fee, a flat fee per impression (known in the art as a cost per impression or CPM), flat fee per click (known as the cost per click or CPC) for a click-through to an event promoter website. Alternatively, the addition of an event listing on the system can be offered for a one time flat fee, a periodic flat fee, a flat fee per impression of the event listing on the system, or a fee based on a percentage of the sales of the event. In one embodiment, the event promoter can list a defined number of events on the system for free and for an additional fee the event promoter can list a number of events above that basic number.

Still further, the inclusion of certain features in the event promoter page can garner an additional fee. In one embodiment, the event promoter can include a defined number of images, video, and other media in the event promoter page, but for an additional fee the event promoter can include additional documents (e.g., event insert, manual, etc.) images, video, and other media. The additional fee can be based on a flat rate per additional image, video, or media, or on the number of impressions that yield a click through to view that image, video, or media. In addition, the inclusion of a website link to the event promoter or to a retailer or distributor of that event promoter can be offered for an additional flat fee, a cost per click through to that website, or a charge based on a percentage of event sales. The event promoter can also include a call button on the event promoter page, e.g., a link to an event promoter phone number (e.g., event promoter customer service, sales representative, etc.) that when clicked by the consumer-user places a call to that phone number. The inclusion of a call button can be offered for a flat fee per call button, a cost per click for each click through to the call button, or a charge calculated based on a percentage of event sales. As discussed above, the addition of an event on a featured event list and/or the addition of an event promoter on a featured event promoter list can also garner an additional fee in terms of a cost per impression for display in a featured list, a cost per click for display in a featured list, an auction among event promoters on the system to compete for display in a featured list (with bids made in terms of a flat price, a cost per impression, or a cost per click).

Monetization can also be based on events purchased via the system. For example, if an event is purchased directly through the system or a third party website, the event promoter will pay a cost per click flat fee for each time the event purchase is initiated on the system (even if the purchase is consummated on a third party website), a cost per click based on event sales, or a percentage of sales for all or some of the events purchased during the session on a third party website initiated on the system.

Still further, advertising events on the system, e.g., prominent advertising placement of a search result screen and/or a recommendations screen. Each of these advertising methods can be offered for a cost per click, cost per impression, or a flat fee, and optionally in an auction among event promoters on the system to compete for advertising space on the system.

Additional methods of monetization are also contemplated. For example, the system can offer the event promoter various types of interaction data free of charge, while certain types of interaction data or presentation of interaction data in different formats or custom formats can be offered for an additional fee. For example, demographic information can be offered for an additional fee, and optionally, the presentation of demographic information in a way that also reflects the relative geographic location of consumer-users with that demographic can also garner an additional fee. Moreover, the system can also offer a companion application that will operate on a smart phone, GPS, tablet, etc., and displays events from the system that are available from a store visited by a consumer-user. The companion application can be offered for a fee to the consumer-user and/or to the event promoter, retailer, etc. The companion application can also be offered for a fee to the consumer-user by the event promoter, retailer, etc. A companion application could also be developed for consumer-users specifically for an event promoter, retailer, etc.

Still further, the version of the system can be offered to an event promoter that allows the event promoter to create a system as described above with a singular focus on that event promoter's events. This tailored version of the system can be offered at an initial price for software customization, a percentage of sales made using the system as an event promoter platform, service charges for running the system servers, etc.

Specific Embodiments (a) Event Promotional System for Children

In a preferred embodiment, a system as described above is designed for use by children. The events included in this type of system are, for example, child safe and preferably include relevant safety information in the data objects, and further include an educational rating and an indication of a suitable age-range and gender. The system preferably requires a child's profile to be linked to a parent profile and the child's profile includes parental control settings that enables the parent to view the child's activities on the system, as well as to customize the fields the child can view of a data object representation, e.g., removing price, advertisements, and age-inappropriate content and commentaries associated with that data object representation. The parent also has the ability to restrict access to the child's activities on the system to a limited set of additional consumer-users and event promoter-users of the system. In addition, the system can include elements that are geared toward children, e.g., age-appropriate jokes, games, etc.

(b) Voting Mechanism

As noted above, a consumer-user can interact with one or more contacts on the system, e.g., by sharing events or event promoters with contacts, by adding to and/or commenting on a data object representation, etc. In one specific embodiment, a consumer-user can use the system to solicit comments from one or more contacts regarding one or more events or event promoter data object representations in which the consumer-user is interested. For example, if a consumer-user is considering a purchase of two or more events, he/she can share those event pages with one or more contacts in his/her contacts network via the system and ask those contacts to vote for or otherwise comment on the event or event promoter he/she should purchase. In one embodiment, the system offers a voting mechanism that can be sent via the system from a consumer-user to one or more contacts, and the voting mechanism enables the one or more contacts to indicate which event or event promoter the consumer-user should purchase. In addition, the voting mechanism also includes a field that enables the one or more contacts to comment on the event offerings. In one embodiment, the consumer-user can request feedback on an event/event promoter comparison such as this of a subset of contacts in his/her network, e.g., only a select group of contacts or family. The contacts or family included in this voting mechanism can add any comments to the commentary field of the data object representation and contacts or family can also suggest other event/event promoter the consumer-user may consider in the alternative. A time limit can optionally be placed by the consumer-user on this voting mechanism or it may be unlimited. If the consumer-user places a time limit on the voting mechanism, the data object representation can be modified to include a countdown that indicates the time remaining in the vote. In one embodiment, voting mechanism dialogs such as this can be monitored by event promoters and event promoters are free to engage in the dialog regarding the event or event promoter. A data object that is the subject of a voting mechanism can also be highlighted in some way to differentiate it from other data object representations in the system, e.g., color-coded to indicate that it is the subject of a voting mechanism.

(c) Charitable Events

The system can also provide an interface that allows a user to follow, like, share, attend, etc., a charitable event and/or participate in a charitable event. A charitable event can be represented by a data object presented on the system and one or more users can interact with that data object representation in much the same way as other data object representations are manipulated on the system. In addition, a user can create one or more charitable event channels or feeds, e.g., "My Charities" as described above. This channel or feed would allow the user to (i) maintain a list of the charities he/she follows or to which he/she contributes, (ii) keep apprised of current fundraising events those charities have organized and/or those the user has elected to attend or to which he/she will contribute, optionally in a calendar view for easy scheduling, and/or (iii) keep apprised of items offered for sale or auction by the fundraiser. For example, if the charity is a school fundraiser, the school fundraising drive can be represented by a first data object and one or more events and/or items offered by the school during that fundraising drive can be accessed through the first data object representation and/or can be associated with the first data object as derivative data objects related to the first data object.

In addition or alternatively, a data object associated with a charitable event can include a selectable donation icon that allows the user to pledge a certain dollar amount to that charity or in connection with that charitable event. In one embodiment, if a user selects the donation icon, the system generates a derivative data object related to that donation item that tracks the donation made to the charity. That donation is recorded in the system as an association between the user, the original event data object, and the derivative data object, and that association is recorded in the global tracking database. In response, the charity can use the system to provide the user with a receipt for his/her donation, e.g., by selecting a "donation confirmed" icon on the data object (selectable only by the charitable organization), thereby creating an additional derivative data object association with the first derivative data object, and as described above, the system pushes that additional derivative data object representation to the user, e.g., in a "My Donations Channel," which the user can draw from to collect charitable receipts for annual tax purposes. Still further, the selectable donation icon can also be used to allow a user to participate in a charitable auction on the site.

(d) Interactive Event Viewing on the System

As described above in reference to FIGS. 10-12, the system also provides a mechanism to view a channel or feed over a television. In one specific embodiment, an event can be broadcast live or on-demand on a computer or television via the system, and optionally, the system can also provide a mechanism to enable the user to engage in a dialog with his followers/followees, for example, while one or more of his community on the system views the event. A portion of the viewing screen on the computer or television can include a window dedicated to comments and dialog between members of the user's community viewing the event. The window can fade from view when the dialog is inactive for a defined period of time, e.g., 1 minute, 5 minutes, 10 minutes, etc., or the user can elect to keep the window in view for the duration of the event.

Likewise, the system can display a live event, e.g., a charity event or other auction setting, and a portion of the screen can display bids made by other users of the system. The screen can display all bids by users participating the event and/or the screen can display bids made by users in the user's network on the system. Bids can be updated continuously during the event and as described above, the system also enables the user to make a bid or otherwise interact with the data object representation related to that event in an overlaid display.

Still further, the system can display live sporting events or other events often associated with gambling, e.g., boxing, horse racing, etc. The system can display a pre-show before the event officially begins, and the data representation associated with the pre-show can include a link to an online gambling site, e.g., that is displayed as an overlay on the representation or as a window within the event screen, which the user can access to place a bet before the event begins. The screen can display bets place and/or odds associated with the event, updated continuously in a window or overlay.

System Architecture

Figure 8:
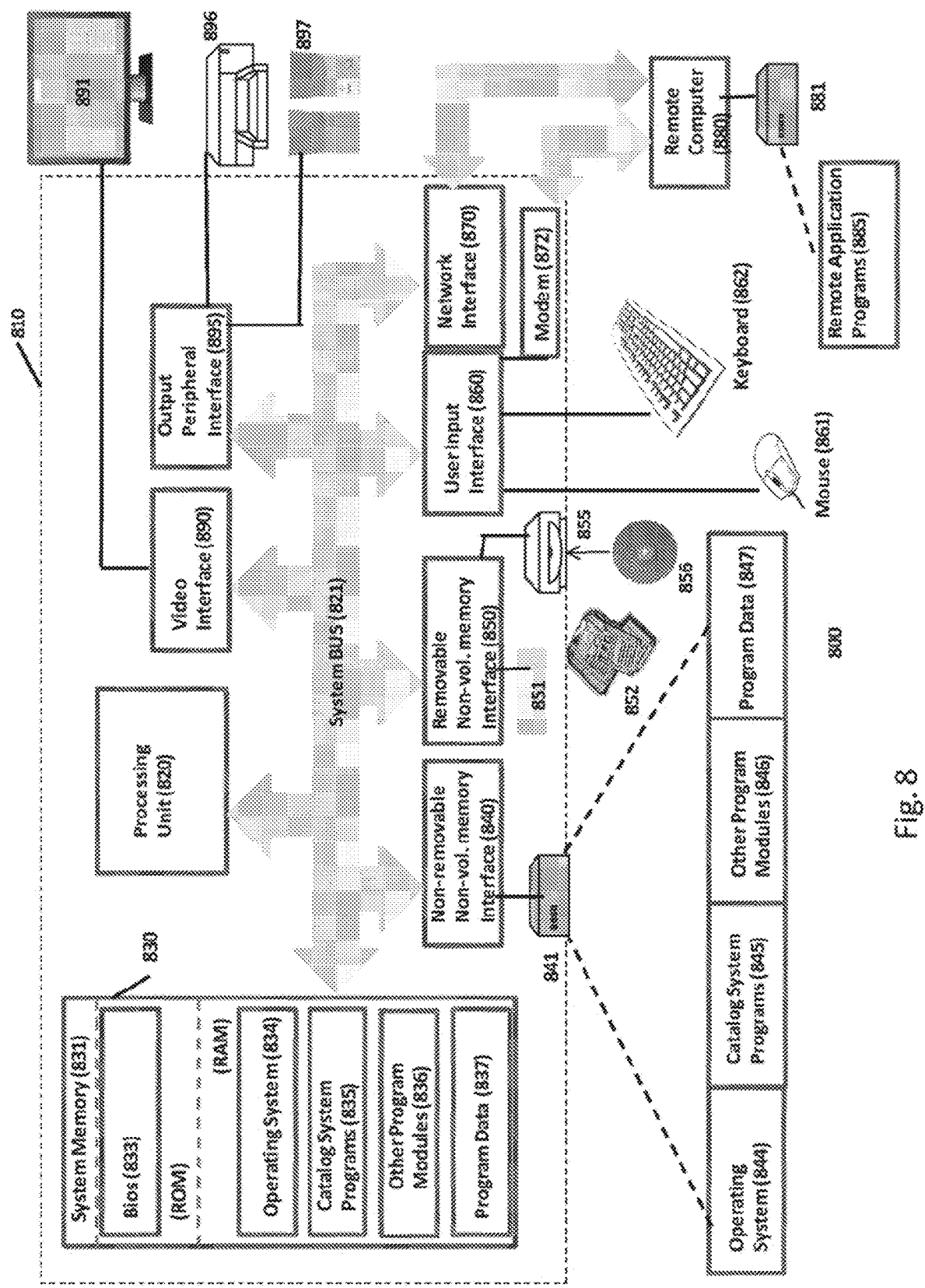
FIGS. 8-9 are graphical representations of the system and its subcomponents.

FIG. 8 shows an example of a suitable computing system environment (800) which may be used to implement various aspects of the invention. This computing system environment is only one example of a suitable computing environment, and is not intended to suggest any limitation as to the scope of use or functionality of the invention. Neither should the computing environment (800) be interpreted as having any dependency or requirement relating to any one or combination of components illustrated in the exemplary operating environment (800). The invention is operational with numerous other general-purpose or special-purpose computing system environments or configurations. Examples of well-known computing systems, environments, and/or configurations that may be suitable for use with the invention include, but are not limited to, personal computers, server computers, hand-held devices (e.g., "smartphones," tablet devices, etc.), laptop devices, multiprocessor systems, microprocessor-based systems, set top boxes, programmable consumer electronics, network PCs, minicomputers, mainframe computers, distributed computing environments that include any of the above systems or devices, or components thereof, and the like.

The computing environment may execute computer-executable instructions, such as one or more program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

FIG. 8 shows an example system for implementing aspects of the invention, which includes computer (810). Components of computer (810) may include, but are not limited to, a processing unit (820), a system memory (830), and a system bus (821) that couples various system components including the system memory to the processing unit (820). The system bus (821) may comprise any suitable bus structure.

Computer (810) typically includes a variety of computer readable media. Computer readable media can be any available media that can be accessed by computer (810) and includes both volatile and nonvolatile, and removable and non-removable media. By way of example, and not limitation, computer readable media may comprise computer storage media and communication media. Computer storage media includes volatile and nonvolatile, removable and non-removable media implemented in any method or technology for storage of information. Information may include, for example, computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer (810). Communication media typically embodies computer readable instructions, data structures, program modules or other data in a modulated data signal, such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory (830) includes computer storage media in the form of volatile and/or nonvolatile memory such as read only memory (ROM) (831) and random access memory (RAM) (832). A basic input/output system (833) (BIOS), containing the basic routines that help to transfer information between elements within computer (810), such as during start-up, is typically stored in ROM (831). RAM (832) typically contains data and/or program modules that are immediately accessible to and/or presently being operated on by processing unit (820). By way of example, and not limitation, FIG. 8 shows operating system (834), application programs (835), other program modules (836), and program data (837).

The computer (810) may also include other removable/non-removable, volatile/nonvolatile computer storage media. For example, FIG. 8 depicts a hard disk drive (841) that reads from or writes to non-removable, nonvolatile magnetic media, a magnetic disk drive (851) that reads from or writes to a removable, nonvolatile magnetic disk (852), and an optical disk drive (855) that reads from or writes to a removable, nonvolatile optical disk (856) such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive (841) is typically connected to the system bus (821) through a non-removable memory interface such as interface (840), and magnetic disk drive (851) and optical disk drive (855) are typically connected to the system bus (821) by a removable memory interface, such as interface (850).

The drives and their associated computer storage media discussed above provide storage of computer readable instructions, data structures, program modules and other data for the computer (810). For example, hard disk drive (841) is shown as storing operating system (844), application programs (845), other program modules (846), and program data (847). These components may either be the same as or different from operating system (834), application programs (835), other program modules (836), and program data (837). Operating system (844), application programs (845), other program modules (846), and program data (847) are given different numbers here to illustrate that at a minimum they are different copies of the same set(s) of instructions.

A user may enter commands and information into the computer (810) through input devices such as a keyboard (862) and pointing device (861), which may include a touch screen, mouse, trackball, etc. Other input devices (not shown) may include a microphone, joystick, game pad, satellite dish, scanner, etc. These and other input devices are often connected to the processing unit (820) through a user input interface (860) that is often coupled to the system bus, but may alternatively be connected by other interface and bus structures, such as a parallel port, game port or a universal serial bus (USB). A monitor (891) or other type of display device is also connected to the system bus (821) via an interface, such as a video interface (890). In addition to the monitor, computers may also include other peripheral output devices such as speakers (897) and printer (896), which may be connected through a output peripheral interface (895).

The computer (810) may operate in a networked environment using logical connections to one or more remote computers, such as a remote computer (880) in the example configuration shown. The remote computer (880) may be a server, personal computer, router, network PC, peer device or other common network node, and typically includes many or all of the elements described above in relation to the computer (810), although only a memory storage device (881) is shown. The logical connections depicted include a local area network (LAN) (871) and a wide area network (WAN) (873), but may also include other networks. Such networking environments are commonplace in offices, enterprise-wide computer networks, intranets and the Internet.

When used in a LAN networking environment, the computer (810) is connected to the LAN (871) through a network interface or adapter (870). When used in a WAN networking environment, the computer (810) typically includes a modem (872) or other means for establishing communications over the WAN (873), such as the Internet. The modem (872), which may be internal or external, may be connected to the system bus (821) via the user input interface (860), or other appropriate mechanism. In a networked environment, program modules depicted relative to the computer (810), or portions thereof, may be stored in the remote memory storage device. By way of example, remote application programs (885) are shown residing on memory device (881). It will be appreciated that the network connections shown are merely examples and other means of establishing a communications link between computers may be used.

Figure 9:
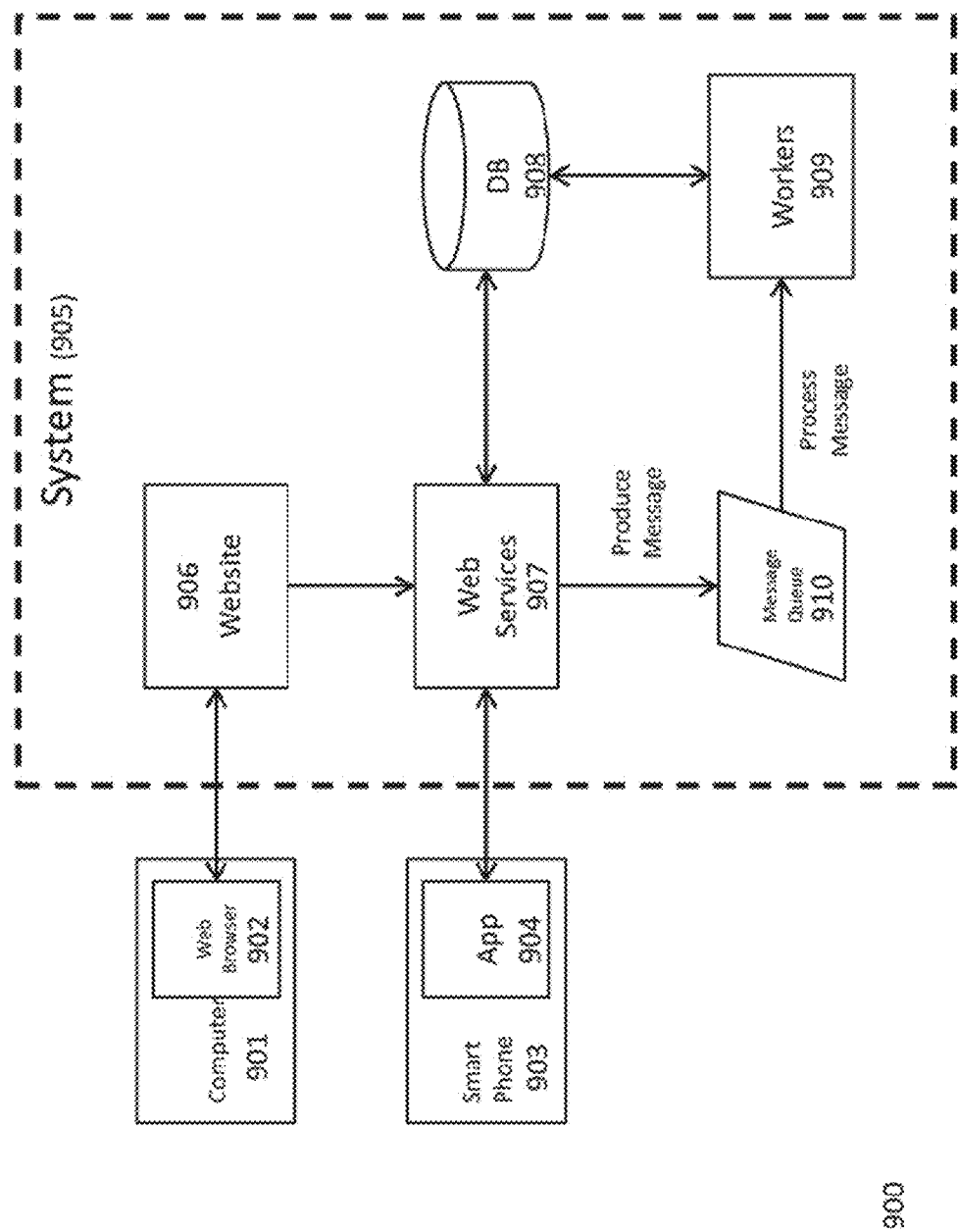

FIG. 9 illustrates one embodiment in which invention can also be practiced in a distributed computing environment (900) where tasks are performed by remote processing devices that are linked through a communications network. In the distributed environment depicted in FIG. 9, a user input interface is provided on a local computer (901) that includes a web browser (902) and/or a user input interface is provided on a smart phone (903) that includes an application (904) that can access the system (905). The system (905) comprises one or more remote processing devices that are linked through a communications network, where each remote processing device performs one or more tasks or routines by executing and/or interfacing with one or more programs, objects, components, data structures, etc. In the system depicted in FIG. 9, a website operated by module (906) interfaces with web browser (902) and that website interfaces with a web services device (907). Alternatively, application (904) can interface directly with the web services device (907). The web services device collects and/or sends interaction data from a database (908). In one embodiment, the system further includes one or more worker modules (909) configured to receive messages and process those messages in the message queue (910) to efficiently manage data traffic on the system. For example, if the system receives information from a consumer-user to modify a data object, the worker module can process that message, e.g., to create a derivative data object and display that derivative data object representation to a subset of consumer-users and/or event promoter-users in the system.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Further, though some advantages of the present invention are indicated, it should be appreciated that not every embodiment of the invention will include every described advantage, and other advantages not described may be realized. Further, some embodiments may not implement features described as advantageous herein. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format. Further, it should be appreciated that a computer may be embodied in any of a number of forms, some of which are described above.

As noted, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufactured (e.g., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

The present invention is not to be limited in scope by the specific embodiments described herein. Indeed, various modifications of the method in addition to those described herein will become apparent to those skilled in the art from the foregoing description and accompanying figures. Such modifications are intended to fall within the scope of the claims. Various publications are cited herein, the disclosures of which are incorporated by reference in their entireties.

What is claimed:

1. A computer implemented method comprising acts of:
processing, using at least one processing unit, event data received via at least one communications network, the event data concerning a plurality of events, each of the plurality of events involving a performing artist or sports team;
generating, using the at least one processing unit, for each one of the plurality of events, an event data object comprising an event identifier identifying the one event;
storing the event data object for each of the plurality of events in at least one repository, the at least one repository also storing consumer-user data comprising a consumer-user data object for each of a plurality of consumer-users, each consumer-user data object comprising a consumer-user identifier identifying a consumer-user of the plurality of consumer-users, at least some of the plurality of consumer-users being target consumer-users who are followed by one or more follower consumer-users;
transmitting, using the at least one processing unit, a representation of the event data associated with one or more of the plurality of events via the at least one communications network, to devices coupled to the at least one communications network, each of the devices being associated with one of the plurality of consumer-users and comprising a screen interface, the transmitting comprising transmitting a representation of event data for a first event to a first device associated with the first consumer-user;
detecting, using the at least one processing unit, input received via a screen interface of the first device in relation to the representation of the event data for the first event, the input indicating intent to initiate a conversation regarding the first event;
responsive to the detecting, generating a conversation data object comprising a conversation identifier, and storing, in the at least one repository, the conversation data object and an association between the consumer-user identifier of the first user, the event identifier of the first event, and the conversation identifier of the conversation data object;

retrieving, by the at least one processing unit from the at least one repository, a consumer-user identifier for a second consumer-user who follows the first consumer-user;

transmitting a representation of the conversation data object, via the at least one communications network, to a second device coupled to the at least one communications network, the second device being associated with the second consumer-user;

identifying a subset of the plurality of events for which a representation of event data has not previously been displayed via the screen interface of the first device associated with the first consumer-user;

transmitting a representation of event data for each event in the identified subset via the at least one communications network to the first device for display via the screen interface of the first device, on a new channel designed to display event data representations not previously displayed to the first consumer-user without the first consumer-user having to search for such event data representations, wherein the new channel is accessible via input to the screen interface of the first device selecting the new channel option and choosing to view the new channel; and responsive to determining that one or more event data representations have been previously displayed on the new channel via the screen interface of the first device, removing the event to which each previously displayed event data representation relates from the identified subset, such that each previously displayed event data representation is no longer displayed via the screen interface of the first device on the new channel;

wherein the act of retrieving comprises retrieving a plurality of consumer-user identifiers respectively associated with a group of consumer-users who follow the first consumer-user, and the act of transmitting the representation of the conversation data object comprises transmitting the representation of the conversation data object to devices respectively associated with each of the group of consumer-users.

2. The computer implemented method of claim 1, wherein:

each of the plurality of events has a promoter;

the act of generating comprises generating an event data object, for each one of the plurality of events, comprising a promoter identifier identifying a promoter of the one event; and the second consumer-user is a promoter of one or more of the plurality of events not including the first event.

3. The computer implemented method of claim 1, comprising acts of:

detecting input, provided via a screen interface of a second device associated with a second consumer-user, comprising a comment on the conversation, in response to the detecting, modifying the conversation data object to include the comment;

storing an association in the at least one repository between the consumer-user identifier of the second consumer-user, the event identifier of the event, and the conversation identifier of the conversation data object; and transmitting a representation of the modified conversation data object to a third device associated with a third consumer-user who follows the second consumer-user.

4. The computer implemented method of claim 1, wherein transmitting the representation of the event data to a first device associated with the first consumer-user comprises transmitting the representation of the event data for the first event for display on a graphical user interface (GUI) that is customized for the first consumer-user.

5. The computer implemented method of claim 1, wherein the act of detecting input provided via the screen interface of the first device in relation to the representation of the event data for the first event comprises detecting that the input indicates a preference for the first event.

6. The computer implemented method of claim 5, wherein the detected input indicates a preference via at least one of following, listing, friending, attending, and liking the first event.

7. The computer implemented method of claim 5, comprising an act, in response to detecting the input indicating the preference for the first event, of generating a derivative data object comprising a derivative data object identifier, and storing in the at least one repository an association between the derivative data object identifier, the event identifier of the first event, and the consumer-user identifier of the first consumer-user.

8. The computer implemented method of claim 5, comprising acts of:

in response to detecting the input indicating the preference for the first event, generating information usable by a device associated with a certain consumer-user who follows the first consumer-user to render a GUI that is customized for the certain consumer-user; and transmitting the information to the device associated with the certain consumer-user.

9. The computer implemented method of claim 8, wherein generating the information usable by the device associated with the certain consumer-user comprises generating information usable to render a GUI comprising a channel or feed for the certain consumer-user.

10. The computer implemented method of claim 1, wherein the act of detecting comprises detecting input in relation to a representation of a performing artist, and wherein the method comprises acts of:

generating information, usable by the device associated with the second consumer-user, to render a GUI comprising data relating to the performing artist; and transmitting the information to the device associated with the second consumer-user.

11. The computer implemented method of claim 1, wherein the act of detecting comprises detecting input in relation to a representation of a first performing artist, and wherein the method comprises acts of:

generating information, usable by the device associated with the second consumer-user, to render a GUI comprising data relating to a second performing artist different than the first performing artist; and transmitting the information to the device associated with the second consumer-user.

12. An apparatus, comprising:

at last one computer processor, programmed to:

process event data received via at least one communications network, the event data concerning a plurality of events, each of the plurality of events involving a performing artist or sports team;

generate, for each one of the plurality of events, an event data object comprising an event identifier identifying the one event;

store the event data object for each of the plurality of events in at least one repository, the at least one repository also storing consumer-user data comprising a consumer-user data object for each of a plurality of consumer-users, each consumer-user data object comprising a consumer-user identifier identifying a consumer-user of the plurality of consumer-users, at least some of the plurality of consumer-users being target consumer-users who are followed by one or more follower consumer-users;

transmit a representation of the event data associated with one or more of the plurality of events, via the at least one communications network, to devices coupled to the at least one communications network, each of the devices being associated with one of the plurality of consumer-users and comprising a screen interface, the transmitting comprising transmitting a representation of event data for a first event to a first device associated with the first consumer-user;

detect input received via a screen interface of the first device in relation to the representation of the event data for the first event, the input indicating intent to initiate a conversation regarding the first event;

responsive to the detecting, generate a conversation data object comprising a conversation identifier, and store, in the at least one repository, the conversation data object and an association between the consumer-user identifier of the first user, the event identifier of the first event, and the conversation identifier of the conversation data object;

retrieve from the at least one repository a consumer-user identifier for a second consumer-user who follows the first consumer-user;

transmit a representation of the conversation data object, via the at least one communications network, to a second device coupled to the at least one communications network, the second device being associated with the second consumer-user;

identify a subset of the plurality of events for which a representation of event data has not previously been displayed via the screen interface of the first device associated with the first consumer-user;

transmit a representation of event data for each event in the identified subset via the at least one communications network to the first device for display via the screen interface of the first device, on a new channel designed to display event data representations not previously displayed to the first consumer-user without the first consumer-user having to search for such event data representations, wherein the new channel is accessible via input to the screen interface of the first device selecting the new channel option and choosing to view the new channel; and responsive to determining that the one or more event data representations have been previously displayed on the new channel via the screen interface of the first device, remove the event to which each previously displayed event data representation relates from the identified subset, such that each previously displayed event data representation is no longer displayed via the screen interface of the first device on the new channel;

wherein the retrieving comprises retrieving a plurality of consumer-user identifiers respectively associated with a group of consumer-users who follow the first consumer-user, and wherein transmitting the representation of the conversation data object comprises transmitting the representation of the conversation data object to devices respectively associated with each of the group of consumer-users.

13. At least one computer-readable storage medium having instructions recorded therein which, when executed in a computing system, cause the computing system to perform a method comprising acts of:

processing event data received via at least one communications network, the event data concerning a plurality of events, each of the plurality of events involving a performing artist or sports team;

generating, for each one of the plurality of events, an event data object comprising an event identifier identifying the one event;

storing the event data object for each of the plurality of events in at least one repository, the at least one repository also storing consumer-user data comprising a consumer-user data object for each of a plurality of consumer-users, each consumer-user data object comprising a consumer-user identifier identifying a consumer-user of the plurality of consumer-users, at least some of the plurality of consumer-users being target consumer-users who are followed by one or more follower consumer-users;

transmitting a representation of the event data associated with one or more of the plurality of events via the at least one communications network, to devices coupled to the at least one communications network, each of the devices being associated with one of the plurality of consumer-users and comprising a screen interface, the transmitting comprising transmitting a representation of event data for a first event to a first device associated with the first consumer-user;

detecting input received via a screen interface of the first device in relation to the representation of the event data for the first event, the input indicating intent to initiate a conversation regarding the first event;

responsive to the detecting, generating a conversation data object comprising a conversation identifier, and storing, in the at least one repository, the conversation data object and an association between the consumer-user identifier of the first user, the event identifier of the first event, and the conversation identifier of the conversation data object;

retrieving from the at least one repository a consumer-user identifier for a second consumer-user who follows the first consumer-user;

transmitting a representation of the conversation data object, via the at least one communications network, to a second device coupled to the at least one communications network, the second device being associated with the second consumer-user;

identifying a subset of the plurality of events for which a representation of event data has not previously been displayed via the screen interface of the first device associated with the first consumer-user;

transmitting a representation of event data for each event in the identified subset via the at least one communications network to the first device for display via the screen interface of the first device, on a new channel designed to display event data representations not previously displayed to the first consumer-user without the first consumer-user having to search for such event data representations, wherein the new channel is accessible via input to the screen interface of the first device selecting the new channel option and choosing to view the new channel; and responsive to determining that one or more event data representations have been previously displayed on the new channel via the screen interface of the first device, removing the event to which each previously displayed event data representation relates from the identified subset, such that each previously displayed event data representation is no longer displayed via the screen interface of the first device on the new channel;

wherein the retrieving comprises retrieving a plurality of consumer-user identifiers respectively associated with a group of consumer-users who follow the first consumer-user, and wherein transmitting the representation of the conversation data object comprises transmitting the representation of the conversation data object to devices respectively associated with each of the group of consumer-users.

* * * * *

UNITED STATES PATENT AND TRADEMARK OFFICE
CERTIFICATE OF CORRECTION

PATENT NO. : 11,907,966 B2
APPLICATION NO. : 17/319977
DATED : February 20, 2024
INVENTOR(S) : Michael Vock et al.

It is certified that error appears in the above-identified patent and that said Letters Patent is hereby corrected as shown below:

On the Title Page

At item (71), the city of Applicant Thermodynamic Design, LLC, "Potomac, MD (US)" should be replaced with --Rockville, MD (US)--.

At item (72), the place of residence of Inventor Michael Vock, "Loveland, OH (US)" should be replaced with --Wilmington, DE (US)--.

In the Claims

At Column 93, Line 57 "responsive to determining that the one or more event" should read --responsive to determining that one or more event--

Signed and Sealed this
Thirtieth Day of April, 2024

Katherine Kelly Vidal
*Director of the United States Patent and Trademark Office*